(12) United States Patent
Fukuda et al.

(10) Patent No.: US 7,962,936 B2
(45) Date of Patent: Jun. 14, 2011

(54) PROGRAM GUIDE DISPLAYING METHOD, APPARATUS AND COMPUTER PROGRAM

(75) Inventors: Kazuhiro Fukuda, Kanagawa (JP); Tetsuo Maruyama, Tokyo (JP); Kiyohiro Takenaka, Saitama (JP)

(73) Assignees: Sony Corporation, Tokyo (JP); SKY Perfect JSAT Corporation, Tokyo (JP)

( * ) Notice: Subject to any disclaimer, the term of this patent is extended or adjusted under 35 U.S.C. 154(b) by 1094 days.

(21) Appl. No.: 11/039,999

(22) Filed: Jan. 24, 2005

(65) Prior Publication Data

US 2005/0251825 A1   Nov. 10, 2005

(30) Foreign Application Priority Data

Feb. 27, 2004   (JP) .................................. 2004-055164

(51) Int. Cl.
*H04N 5/445* (2011.01)
(52) U.S. Cl. ................. 725/43; 725/46; 725/58; 725/44
(58) Field of Classification Search ............... 725/37–61
See application file for complete search history.

(56) References Cited

U.S. PATENT DOCUMENTS

| | | | | |
|---|---|---|---|---|
| 6,002,394 | A * | 12/1999 | Schein et al. .................... | 725/39 |
| 6,172,677 | B1 * | 1/2001 | Stautner et al. ................ | 715/716 |
| 7,047,550 | B1 * | 5/2006 | Yasukawa et al. .............. | 725/44 |
| 2002/0035727 | A1 | 3/2002 | Numata et al. | |
| 2004/0203639 | A1 * | 10/2004 | Ozer et al. ................. | 455/414.1 |

FOREIGN PATENT DOCUMENTS

| | | |
|---|---|---|
| JP | 11-25541 | 1/1999 |
| JP | 11-187324 | 7/1999 |
| JP | 11-284929 | 10/1999 |
| JP | 2000-341596 | 12/2000 |
| JP | 2001-211401 | 8/2001 |
| JP | 2001-313878 | 11/2001 |
| JP | 2002-84469 | 3/2002 |
| JP | 2002-94893 | 3/2002 |
| JP | 2002-262191 | 9/2002 |
| JP | 2003-37791 | 2/2003 |
| JP | 2003-189267 | 7/2003 |
| JP | 2003-348477 | 12/2003 |
| JP | 2004-7822 | 1/2004 |

* cited by examiner

*Primary Examiner* — Scott Beliveau
*Assistant Examiner* — Nicholas T Corbo
(74) *Attorney, Agent, or Firm* — Oblon, Spivak, McCelland, Maier & Neustadt, L.L.P.

(57) ABSTRACT

To display a program guide for making an efficient search for a desired program, there are provided a program guide displaying method and apparatus, and a computer program which controls a computer to carry out the program guide displaying method. The program guide displaying method includes the steps of receiving information on programs to be broadcast on at least one day from a plurality of stations; and placing a plurality of cells in which pieces of the program information are to be displayed, respectively, in a two-dimensional program guide having time and date axes and displaying, in the cells, program information pieces whose airtimes overlap each other on the same airdate, in such a manner that they will not overlap each other.

44 Claims, 32 Drawing Sheets

FIG. 4

| A STATION | 1/12 Mon. | 1/13 Tue. | 1/14 Wed. | 1/15 Thu. | 1/16 Fri. | 1/17 Sat. | 1/18 Sun. | DATE AXIS |
|---|---|---|---|---|---|---|---|---|
| 16:00 | ... | PROGRAM "BBB" | PROGRAM "TTT" | PROGRAM "baz" | PROGRAM "BBQ" | PROGRAM "TTQ" | PROGRAM "TTT" | |
| 18:00 | PROGRAM "BBB" | PROGRAM "ABZ" | PROGRAM "CAB" | PROGRAM "aaa" | PROGRAM "BBB" | PROGRAM "ABC" | PROGRAM "NEW" | |
| 20:00 | PROGRAM "bca" | PROGRAM "TTT" | PROGRAM "bca" | PROGRAM "ABZ" | PROGRAM "TTT" | PROGRAM "NEW" | PROGRAM "YYY" | |
| 22:00 | PROGRAM "TBA" | PROGRAM "TBA" | PROGRAM "XXX" | PROGRAM "TYZ" | PROGRAM "XBT" | PROGRAM "ABZ" | PROGRAM "ZZZ" | |
| 24:00 | | | | | | | | |

TIME AXIS

FIG. 6

| STATION GROUP A | 1/12 Mon. | 1/13 Tue. | 1/14 Wed. | 1/15 Thu. | 1/16 Fri. | 1/17 Sat. | 1/18 Sun. | DATE AXIS |
|---|---|---|---|---|---|---|---|---|
| 16:00 | ... | CCC STATION PROGRAM "TTT" | BBB STATION PROGRAM "BBB" | CCC STATION PROGRAM "TTT" | APC STATION PROGRAM "baz" | BBQ STATION PROGRAM "BBQ" | BBQ STATION PROGRAM "TTQ" | CCC STATION PROGRAM "TTT" |
| 18:00 | ... | BBB STATION PROGRAM "BBB" | RRR STATION PROGRAM "ABZ" | CAB STATION PROGRAM "CAB" | BBB STATION PROGRAM "aaa" | BBB STATION PROGRAM "BBB" | GGG STATION PROGRAM "ABC" | BBB STATION PROGRAM "NEW" |
| 20:00 | ... | BBB STATION PROGRAM "bca" | CCC STATION PROGRAM "TTT" | RRR STATION PROGRAM "bca" | RRR STATION PROGRAM "ABZ" | CCC STATION PROGRAM "TTT" | AAA STATION PROGRAM "TTT" | YYY STATION PROGRAM "YYY" |
| 22:00 | ... | AXZ STATION PROGRAM "TBA" | AXZ STATION PROGRAM "TBA" | AAA STATION PROGRAM "XXX" | AQB STATION PROGRAM "TYZ" | SBX STATION PROGRAM "XBT" | RRR STATION PROGRAM "ABZ" | ZZZ STATION PROGRAM "ZZZ" |
| 24:00 | STATION A | STATION B | STATION C | STATION D | STATION GROUP A | STATION GROUP B 280a | | |
| TIME AXIS | | | | | | | | |

| RISA | 1/12 Mon. | 1/13 Tue. | 1/14 Wed. | 1/15 Thu. | 1/16 Fri. | 1/17 Sat. | 1/18 Sun. |
|---|---|---|---|---|---|---|---|
| 16:00 | CCC STATION PROGRAM "ttt" | BBB STATION PROGRAM "BBB" | CCC STATION PROGRAM "ttt" | APC STATION PROGRAM "baz" | BBQ STATION PROGRAM "BBQ" | BBQ STATION PROGRAM "TTQ" | CCC STATION PROGRAM "ttt" |
| 18:00 | BBB STATION PROGRAM "BBB" | RRR STATION PROGRAM "ABZ" | CAB STATION PROGRAM "CAB" | BBB STATION PROGRAM "aaa" | BBB STATION PROGRAM "BBB" | GGG STATION PROGRAM "BBB" | BBB STATION PROGRAM "NEW" |
| 20:00 | BBB STATION PROGRAM "bca" | CCC STATION PROGRAM "ttt" | RRR STATION PROGRAM "ABZ" | RRR STATION PROGRAM "bca" | CCC STATION PROGRAM "ttt" | AAA STATION PROGRAM "ABC" | YYY STATION PROGRAM "YYY" |
| 22:00 | AXZ STATION PROGRAM "TBA" | AXZ STATION PROGRAM "TBA" | AAA STATION PROGRAM "XXX" | AQB STATION PROGRAM "TYZ" | SBX STATION PROGRAM "XBT" | RRR STATION PROGRAM "ABZ" | ZZZ STATION PROGRAM "ZZZ" |
| 24:00 | TAKASHI | RISA | HITOMI ← 280b | | | | |

TIME AXIS

| MY-PROGRAM GUIDE | 1/12 Mon. | 1/13 Tue. | 1/14 Wed. | 1/15 Thu. | 1/16 Fri. | ... | 1/17 Sat. | 1/18 Sun. | DATE AXIS |
|---|---|---|---|---|---|---|---|---|---|
| 16:00 | | | | | | ... | | | |
| 18:00 | | | | | | ... | BBQ STATION PROGRAM "TTQ" | CCC STATION(C) PROGRAM "TTT" | |
| 20:00 | BBB STATION PROGRAM "bca" | CCC STATION PROGRAM "TTT" | RRR STATION PROGRAM "bca" | RRR STATION PROGRAM "ABZ" | CCC STATION(A) PROGRAM "TTT" | ... | GGG STATION(A) PROGRAM "ABC" | BBB STATION PROGRAM "NEW" | |
| 22:00 | AXZ STATION PROGRAM "TBA" | AXZ STATION(B) PROGRAM "TBA" | AAA STATION(C) PROGRAM "XXX" | AQB STATION(B) PROGRAM "TYZ" | SBX STATION PROGRAM "XBT" | ... | AAA STATION(A) PROGRAM "NEW" | YYY STATION(B) PROGRAM "YYY" | |
| 24:00 | | | | | | ... | RRR STATION(A) PROGRAM "ABZ" | ZZZ STATION PROGRAM "ZZZ" | |

TIME AXIS

| Time | | | |
|---|---|---|---|
| 12:00 | 00 "News 7" [bilingual] [captioned] Hiromi Fuji [PROGRAM] | 00 "Sublime performance in memory" "Piano recital by Frederick Giuda, Exceptional pianist" [S] "Piano sonata No. A-flat major op. 110" etc. 600 [PROGRAM] AAA STATION | 58 "Research 200X-II" "Wonderful dieting with cooling sheet" ▽Dieting just by attaching ▽"Murder by Kindhearted Nurse" 600 [PROGRAM] BBB STATION | 25 "Hyokkari-Hyotan-Hanabusajima" "Pirate" [bilingual] [captioned] [rebroadcast] [PROGRAM] DDD STATION |
| 13:00 | 20 "Quiz - Valuable Videos" [s] [captioned] "Memorial Stamps Issued in 1965" 600 [PROGRAM] | 00 "Musashi" "Invitation by Yagyu" [S] [captioned] Sinnosuke Kawa, Sinnichi 600 [PROGRAM] CCC STATION | | 00 "Thunder" "Kishiro in Danger" [captioned] [rebroadcast] [PROGRAM] EEE STATION |
| 14:00 | 45 "News/Weathercast" [PROGRAM] 00 "Special program" "India and Africa - Human Resources" [S] [captioned] Global Market - Battles for Fortune 600 [PROGRAM] 50 "Sunday Sports" [PROGRAM] | | | |

3301

PROGRAM GUIDE DISPLAYING METHOD, APPARATUS AND COMPUTER PROGRAM

BACKGROUND OF THE INVENTION

1. Field of the Invention

The present invention generally relates to a program guide displaying method, apparatus and computer program, and more particularly to a program guide displaying method, apparatus and computer program for electric program guidance.

This application claims the priority of the Japanese Patent Application No. 2004-055164 filed on Feb. 27, 2004, the entirety of which is incorporated by reference herein.

2. Description of the Related Art

These days, program guides are provided to viewers and listeners via various media. The program guides include a today's program guide, weekly program guide, monthly program guide, and also a program guide for each of categories such as sports, music, movie, etc.

In many of program guide layouts, there are combined at least two or three of a time axis along which airtimes are indicated, a date axis along which airdates are indicated and a station axis along which stations that broadcast the programs are indicated (cf. the Japanese Patent Application Laid Open No. 2001, 169197).

In the case of a program guide consisting of time and date axes, for example, however, many programs in the program guides to be broadcast from broadcasting stations have to be checked for searching the program guide for a desired program. In this case, no efficient search can be made for such a desired program, and no efficient selection can be made between the broadcasting stations.

To improve the efficiency of such searching and eliminate the necessity of selection between the broadcasting stations, program guides may be aggregated into a single program guide. In this case, however, if there exist programs which are due on the same date and whose airtimes overlap each other, there remains a plurality of program information. Therefore, it is not possible to search for a desired program with any improved efficiency even with the plurality of program information being indicated in cells of the program guide. Also, when only one piece of program information is displayed, the entire amount of information is smaller but another program information cannot be checked.

OBJECT AND SUMMARY OF THE INVENTION

It is therefore an object of the present invention to overcome the above-mentioned drawbacks of the related art by providing a novel and improved program guide displaying method, apparatus and computer program, capable of displaying a program guide intended for efficient search for at least a desired program.

It is another object of the present invention to provide a novel and improved program guide displaying method, apparatus and computer program, capable of displaying a program guide intended for efficient selection of program information even if there exist a plurality of program information whose airtimes overlap each other.

According to one aspect of the present invention, there is provided a program guide displaying method of displaying, in a program guide, program information having contents of programs to be broadcast from more than at least one or two broadcasting stations. According to the present invention, the program guide displaying method includes the steps of:

receiving information on programs to be broadcast on at least one day from a plurality of broadcasting stations; and placing a plurality of cells in which pieces of the program information are to be displayed, respectively, in a two-dimensional program guide having time and date axes and displaying, in the cells, program information pieces whose airtimes overlap each other on the same airdate, in such a manner that they will not overlap each other.

According to the present invention, when the information on the programs to be broadcast from the plurality of broadcasting stations is displayed in the program guide having the time and date axes, pieces of the program information are displayed in the program guide cells, respectively, in such a manner that they will not overlap each other. Because of this program guide configuration, information on the programs to be broadcast from the plurality of broadcasting stations can be displayed in a single program guide. Thus, it is not necessary to create a plurality of program guides, which will lead to an improved efficiency of program guide creation. Also, since the pieces of information on programs to be broadcast from the plurality of broadcasting stations are aggregated in the single program guide, it is not necessary to make a selection between the broadcasting stations which broadcast the programs in the guides, which permits the user to search for a desired program with an improved efficiency, and a program guide display unit to search for that program in a shorter time.

The program guide displaying method may further include the step of at least accepting more than one or two designated dates on which a program guide is to be displayed.

The program guide displaying method may further include the step of acquiring program information to be broadcast on a designated date from a plurality of broadcasting stations on a broadcast wave or via a network. With this arrangement, the program information for the designated date can be received on the broadcast wave or via the network from the broadcasting stations independently of a medium.

An airdate may be designated in units of a week or month. Also, the cell may be formed to display any one of the plurality of program information pieces.

With this arrangement, it suffices to display one of program information pieces whose airtimes overlap each other on the same airdate on which all the programs are to be broadcast. Namely, the selected one piece of program information can be processed more quickly for display than all the program information pieces.

The cell may be formed to display only a piece of program information whose display rank is highest. With this arrangement, the user will see the program information more often and thus will be able to find a desired program before switching the program information to any other one or to program information for any other broadcasting station.

The cells of the program guide may be formed to automatically display program information acquired based on the result of analysis of user's personal preference. With this arrangement, program information the user is most likely to be interested in can be displayed. So, since the user can find a desired program efficiently from among programs initially displayed in the program guide, program search can be made more efficiently.

The preference analysis information may be generated from at least user operation record or personal history.

The display rank of program information, displayed in the program guide cell, may be set at either the broadcasting station or program guide display unit or at both.

One cell may be formed to display one piece of program information. Also, the cell may be formed to display information tied to a program.

The cell may be formed to display an index for starting designating programming of program recording. The index may be a button marked with "Program".

The acceptance of a designation may be arranged to accept an airdate designated on a setting window for setting information on a request for display of a program guide.

On the data axis of the program guide, there may be assigned dates in at least units of a day or a week. Thus, a list of programs can be displayed in units of one or more days or in units of one or more weeks in the program guide and the number of days can freely be changed depending upon the display screen size or the amount of information of the programs.

The program information may be EPG or ECG information, not including, in the form of a list, all program information pieces whose airtimes overlap each other.

Also, according to another aspect of the present invention, there is provided a program guide displaying apparatus for displaying, in a program guide, program information having contents of programs to be broadcast from more than at least one or two broadcasting stations. According to the present invention, the program guide displaying apparatus includes:

a receiver to receive information on programs to be broadcast on at least one day from a plurality of broadcasting stations; and a display controller to place a plurality of cells in which pieces of the program information are to be displayed, respectively, in a two-dimensional program guide having time and date axes and display, in the cells, program information pieces whose airtimes overlap each other on the same airdate, in such a manner that they will not overlap each other.

Also, according to the present invention, when the information on the programs to be broadcast is received from the plurality of broadcasting stations and displayed in the program guide having the time and date axes, the display controller displays program information pieces in the program guide cells, respectively, in such a manner that they will not overlap each other. Because of this program guide configuration, information on the programs to be broadcast from the plurality of broadcasting stations can be displayed in a single program guide. Thus, it is not necessary to create a plurality of program guides, which will lead to an improved efficiency of program guide creation. Also, since the pieces of information on programs to be broadcast from the plurality of broadcasting stations are aggregated in the single program guide, it is not necessary to make a selection between the broadcasting stations which broadcast the programs in the guides, which permits the user to search for a desired program with an improved efficiency, and a program guide display unit to search for that program in a shorter time.

The program guide displaying apparatus may further include a designation acceptance unit for at least accepting more than one or two designated dates on which a program guide is to be displayed.

The program guide displaying apparatus may be formed to acquire program information to be broadcast on a designated date from a plurality of broadcasting stations on a broadcast wave or via a network. An airdate may be designated in units of a week or month.

The program guide cell may be formed to display only a piece of program information whose display rank is highest. With this arrangement, program information the user is highly likely to be interested in is displayed on the display screen, whereby the user can efficiently find a desired program from among programs initially displayed in the program guide. The program guide displaying apparatus permits an improved efficiency of search and thus will not be applied with any large load.

The cells of the program guide may be formed to automatically display program information acquired based on the result of analysis of user's personal preference. With this arrangement, at least the hardware resources of the program guide displaying apparatus can be used to generate a program guide in which program information the user is most likely to be interested in can be displayed in a cell. So, the user can find a desired program with an improved efficiency.

The preference analysis information may be generated from at least user operation record or personal history. With this arrangement, it is possible to clearly determine the user's peculiarity and preference. By reflecting the result of preference analysis, it is possible generate a program guide easier to view and which can be searched more efficiently.

The display rank of program information, displayed in the program guide cell, may be set at either the broadcasting station or program guide display unit or at both.

One cell may be formed to display one piece of program information. Also, the cell may be formed to display information tied to a program.

The cell may be formed to display an index for starting designating programming of program recording.

The display unit of the program guide displaying apparatus may be formed to display a setting window for setting information on a request for display of a program guide.

Also, according to another aspect of the present invention, there is provided a computer program which is used to control a computer to carry out a program guide displaying method including the steps of:

receiving information on programs to be broadcast on at least one day from a plurality of broadcasting stations; and placing a plurality of cells in which pieces of the program information are to be displayed, respectively, in a two-dimensional program guide having time and date axes and displaying, in the cells, program information pieces whose airtimes overlap each other on the same airdate, in such a manner that they will not overlap each other.

Also, according to another aspect of the present invention, there is provided a program guide displaying method of displaying, in a program guide, program information having contents of programs to be broadcast from more than at least one or two broadcasting stations. According to the present invention, the program guide displaying method includes the steps of:

receiving information on programs to be broadcast on at least one day from a plurality of broadcasting stations;

placing a plurality of cells in which pieces of the program information are to be displayed, respectively, in a two-dimensional program guide having time and date axes and displaying, in the cells, program information pieces; and changing at least the cell display in case there exists a plurality of program information pieces whose airtimes overlap each other on at least the same date.

According to the present invention, program information is received from a plurality of broadcasting stations, and displayed in a cell of a program guide having airtime and airdate axes. In case there exists in the program guide cell a plurality of program information pieces whose airtimes overlap each other on at least the same date, the display of the program guide cell is changed. With this arrangement, the program information pieces from the plurality of broadcasting stations are aggregated in one program guide, and thus the amount of information of all the program information pieces displayed in the program guide can be reduced. Also, with an indication that there exists the plurality of program information pieces whose airtimes overlap each other, it is possible to detect a place where the plurality of program information pieces exists and efficiently change the program information to any other one.

The cell display may be changed by changing at least one of saturation, brightness and chromaticity. With this arrangement, the user can easily know the existence of the plurality of program information pieces whose airtimes overlap each other on the same date. By changing the cell display to an appropriate presentation of program information, the program information can be displayed efficiently. Therefore, the search at the user terminal can be effected in a reduced time.

Also the cell display may be changed by additionally displaying, in a cell, an index showing the number of program information pieces whose airtimes overlap each other. With this arrangement, the user can know the number of program information pieces easily and efficiently, and select program information on the basis of the number of program information pieces.

Also, the presentation of program information in the cell may be changed. With this arrangement, the style of at least the characters used to indicate program information may be changed to a thicker, thinner or italic one. Thus, the plurality of program information pieces whose airtimes overlap each other on the same date can be displayed for easier reading and more effectively.

Also, the presentation of program information in the cell may be changed. For example, only one program information is displayed in a cell.

The program guide displaying method may further include the step of displaying a plurality of program information pieces whose airtimes overlap each other on at least the same airdate in the form of a list.

The display controlling step may be arranged to select any one of a plurality of program information pieces whose airtimes overlap each other on at least the same airdate.

Also the display controlling step may be arranged to display all of a plurality of program information pieces whose airtimes overlap each other on at least the same airdate in a line in at least one of vertical and horizontal directions.

The program selecting step may be arranged to select program information displayed in a cell to which at least the cursor is moved.

A piece of program information may be displayed in a cell. Also, in a cell, there may be displayed information tied to a program. The program information may be EPG or ECG information.

Also, according to another aspect of the present invention, there is provided a program guide displaying apparatus for displaying, in a program guide, program information having contents of programs to be broadcast from more than at least one or two broadcasting stations. According to the present invention, the program guide displaying apparatus includes:

a receiver to receive information on programs to be broadcast on at least one day from a plurality of broadcasting stations;

a display controller to place a plurality of cells in which pieces of the program information are to be displayed, respectively, in a two-dimensional program guide having time and date axes and display, in the cells, program information pieces; and a display changing unit to change at least the cell display in case there exists a plurality of program information pieces whose airtimes overlap each other on at least the same date.

In the program guide displaying apparatus according to the present invention, program information is received from a plurality of broadcasting stations, and displayed in a cell of a program guide having airtime and airdate axes. In case there exists in the program guide cell a plurality of program information pieces whose airtimes overlap each other on at least the same date, the display changing unit changes the display of the program guide cell. With this arrangement, since it is not necessary to generate a plurality of program guides, the program guide can be generated with an improved efficiency. Also, with an indication that there exists the plurality of program information pieces whose airtimes overlap each other, the user can easily know a place where the plurality of program information pieces exists overlapping each other. Therefore, the program guide displaying apparatus can switch one of the plurality of program information pieces whose airtimes overlap each other to any other program information piece, which will lead to a reduced load to the apparatus.

The display changing unit may be formed to change the cell display by changing at least one of saturation, brightness and chromaticity. Also, the display changing unit may be formed to change the cell display by additionally displaying, in a cell, an index showing the number of program information pieces whose airtimes overlap each other.

The display changing unit may be formed to change the presentation of program information in the cell, and turn on and off the program information being displayed. Also, the cell may be formed to display only one program information piece therein.

The program guide displaying method may further include a display controller to display a plurality of program information pieces whose airtimes overlap each other on at least the same airdate in the form of a list.

The program guide displaying apparatus may further includes a display controller to select any one of a plurality of program information pieces whose airtimes overlap each other on at least the same airdate.

Also the display controller may be arranged to display all of a plurality of program information pieces whose airtimes overlap each other on at least the same airdate in a line in at least one of vertical and horizontal directions.

The program selecting unit may be arranged to select program information displayed in a cell to which at least the cursor is moved.

Also, according to another aspect of the present invention, there is provided a computer program which controls a computer to carry out a program guide displaying method including the steps of:

receiving information on programs to be broadcast on at least one day from a plurality of broadcasting stations;

placing a plurality of cells in which pieces of the program information are to be displayed, respectively, in a two-dimensional program guide having time and date axes and displaying, in the cells, program information pieces; and changing at least the cell display in case there exists a plurality of program information pieces whose airtimes overlap each other on at least the same date.

As having been described in the foregoing, according to the present invention, program information for display in a program guide is determined on the basis of the result of preference analysis of at least each user, a program guide is generated for at least each user and display, whereby a user-desired program can be searched with a higher efficiency.

Also, according to the present invention, visual indication that there exists a plurality of program information pieces whose airtimes overlap each other makes it unnecessary to generate a plurality of program guides, which will lead to a reduced load to the system. Also, when a cell in which there exists a plurality of program information pieces is selected, the plurality of program information pieces can be displayed in a list. Thus, the user can select an appropriate program information from the list and easily change the program information displayed in the program guide.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 4 schematically illustrates a sheet-form program guide displayed on a display unit incorporated in this embodiment;

FIG. 6 schematically illustrates a sheet-form program guide displayed at the display unit incorporated in this embodiment;

FIG. 8 schematically illustrates a recommendable-program guide displayed at the display unit incorporated in this embodiment;

FIG. 10 schematically illustrates a My-program guide displayed at the display unit incorporated in this embodiment;

FIG. 32 explains the configuration of an ECG-type program guide incorporated in this embodiment; and FIG. 33 schematically illustrates an ECG (electric content guide) program select window when there exists a plurality of programs to be broadcast for the same time of day in the present invention.

DETAILED DESCRIPTION OF THE PREFERRED EMBODIMENTS

The present invention will be illustrated and described below concerning the preferred embodiments thereof with reference to the accompanying drawings. It should be noted that elements once illustrated and explained below with certain references will be referred to with the same references and will not be described in detail in the subsequent illustrations and description.

1. Program Information Providing System

Figure 1:
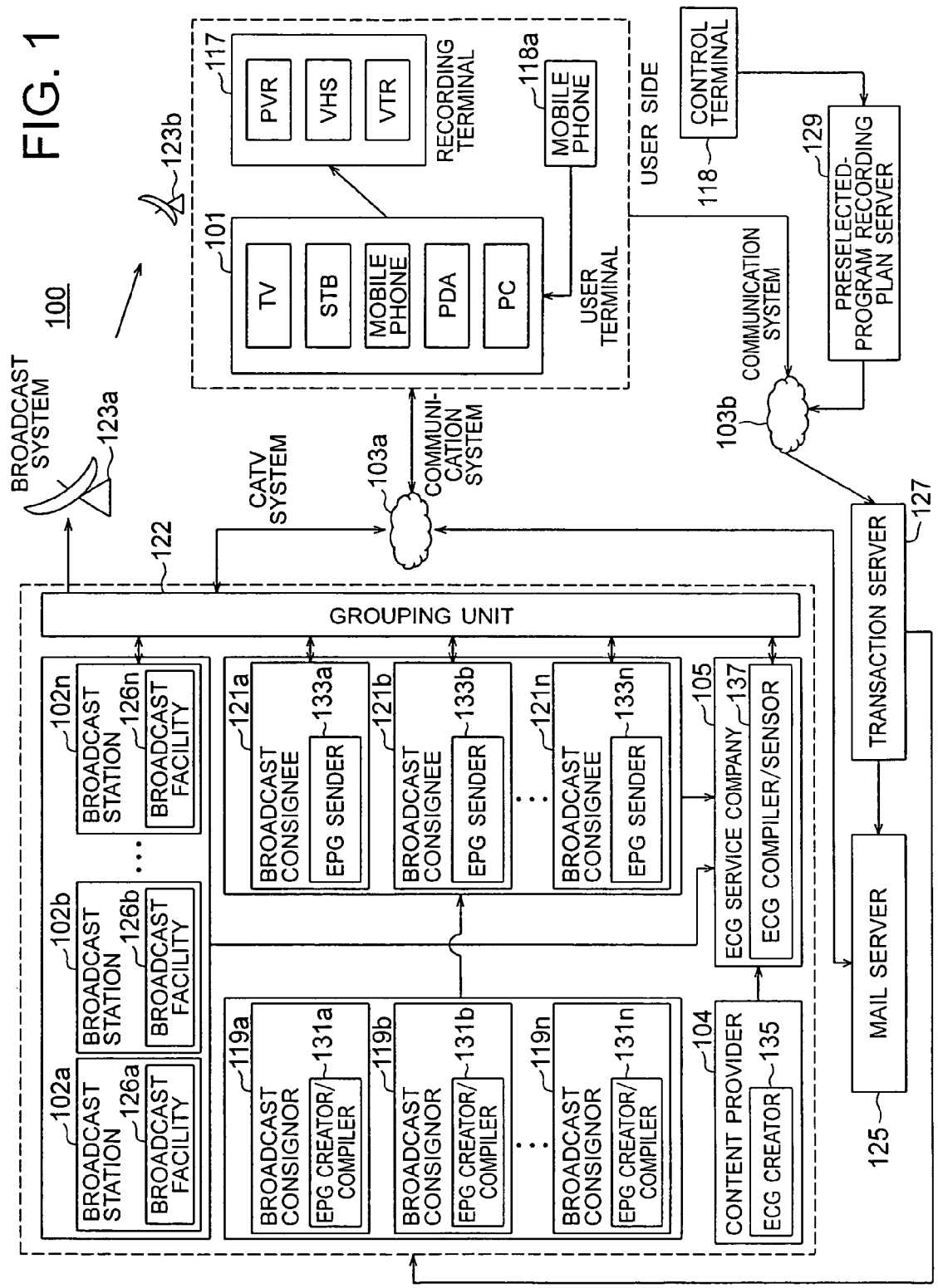
FIG. 1 is a schematic block diagram of a program information providing system according to an embodiment of the present invention.

Referring now to FIG. 1, there is schematically illustrated in the form of a block diagram a program guide providing system according to an embodiment of the present invention. In FIG. 1, the program guide providing system is generally indicated with a reference 100.

As shown in FIG. 1, the program guide providing system 100 incorporated in this embodiment includes mainly two divisions, namely, a service user and a service provider. The service user includes at least a user terminal (program guide display unit) 101, recording terminal 117 and a control terminal 118. In this embodiment, the user terminal 101, recording terminal 117 and control terminal 118 count one each in number. However, it should be noted that in this embodiment, these components may be used more than one each in number.

The user terminal 101 has a function to receive EPG (electric program guide) information or program meta information as a part of the program information via a broadcast wave or network 103 or a function to receive program video and similar information, a function to display the received information on the display screen, and other functions. It should be noted that for receiving program meta information or the like via the broadcast wave, it is necessary to receive identification information such as meta information reference ID or the like to make reference to the program meta information in advance.

As shown in FIG. 1, the network 103 includes at least networks 103a and 103b. The network 103a distributes programs to the user side for CATV (cable TV), and connects the user terminal 101 and a mail service 125 to each other to make two-way data communications. The network 103b connects the user terminal 101 or preselected-program recording plan server 129 and a transaction server 127, for example, to each other to make two-way data communications.

As shown in FIG. 1, the user terminal 101 may be a TV (television), STB (set-top box), mobile phone, PDA (personal digital assistant) or a PC (personal computer), for example. However, the user terminal 101 may be any other than such apparatus.

The recording terminal 117 has a function to record a program on the basis of a preselected-program recording plan or program information supplied from the user terminal 101, and other functions. Also, the recording terminal 117 maybe a PVR (personal video recorder), VTR (video tape recorder) which records data by the VHS or a similar system. However, the recording terminal 117 may be any other than such apparatus.

Note that the control terminal 118 to give a command to the user terminal 101 etc. may be a mobile phone 118a, for example. However, it may be a remote commander or the like which can give a command to the user terminal 110 by infrared radiation or the like.

As shown, the service provider includes at least broadcasting stations 102 (102a, 102b, . . . , 1-2n), broadcasting consignors 119 (119a, 119b, . . . , 119n), broadcasting consignees 121 (121a, 121b, . . . , 121n), ECG (electric content guide) service company 105, and a content provider 104. It should be noted that the "broadcasting station" will be referred to simply as "station" hereunder.

The above stations 102 may be grouped mainly in a broadcasting system, CATV system and communication system, for example. The broadcasting system may be a ground-base analog broadcasting system, ground-based digital broadcasting system, BS analog broadcasting system, BS digital broadcasting system, 124-deg./128-deg. CS (communication satellite) broadcasting system or a 110-deg. CS broadcasting system, for example. For example, the station 102a may be the 124-deg./128-deg. CS broadcasting system, CS digital broadcasting system or the like.

Also, the CATV system may be the CATV digital broadcasting system, CATV analog broadcasting system or the like, for example. The communication system may be a broadband broadcasting system (BB broadcasting system) using an optical fiber, ADSL, telephone modem, mobile phone video service or the like, for example. It should be noted that the mobile phone video service is such that contents such as a moving picture, still picture, music, etc. are distributed by a packet communication, for example.

The station 102 sends a program to the user by up-linking or down-linking of a radio wave such as broadcast wave. Also, it collects, from the user, a charge or the like for viewing of or listening to a program distributed to the user.

Also, the station 102 broadcasts a variety of broadcast programs to the user terminal 101 while managing or sending EPG (electric program guide) information, program meta information, etc. as broadcast data to the user terminal 101. Receiving the EPG information, the user terminal 101 can display a program guide of the EPG type.

Note that the program guide incorporated in this embodiment will be explained taking a program guide to be broadcast from the station 102 or broadcasting consignee 121 as an example. However, the present invention is not limited to such an example. The program guide may be a radio program guide or the like, for example.

The broadcasting consignee 121 broadcasts a program similarly to the station 102 while managing program information containing the content of a program to be broadcast and content information such as a book related with the program or the like for EPG and ECG services. It should be noted that the EPG and ECG services will be described in detail later and also the program information will be explained in detail later. Pieces of information on a program, such as EPG information, ECG information, etc., are generically called "program information" herein.

The content provider (content holder) 104 creates, manages and provides substance of various contents. The content provider 104 also generates content meta information on contents. The content meta information thus generated is provided to the ECG service company 105.

The broadcasting consignor 119 provides a channel, and also creates, complies and sends a program. For example, the broadcasting consignor 119 is a program provider or the like.

At a request from the station 102 or broadcasting consignee 121, the ECG service company 105 ties program meta information sent from the station 102 or broadcasting consignee 121 to content metal information provided from the content provider 104 for the purpose of using the ECG service.

As shown in FIG. 1, the station 102 further includes a broadcasting facility 126 to compile and create a program, generate EPG information, send the program and operate otherwise. The broadcasting facility 126 generates and compiles program information as EPG, and manages the program information and content information to provide an EPG or ECG service.

The broadcasting consignor 119 has an EPG creator/compiler 131. The EPG creator/compiler 131 creates program information, compiles the program information and manages or sends the compiled program information periodically to the broadcasting consignee 121. It should be noted that the EPG creator/compiler 131 may create/compile content information.

The broadcasting consignee 121 has an EPG sender 133 to manage or send program information and/or content information received from the broadcasting consignor 119 for making an EPG or ECG service. Also, the EPG sender 133 may generate content meta information on the basis of the content information.

Note that the EPG sender 133 may functionally be designed to send program information and/or content information separately on a broadcast wave and via the network 103, respectively, to a grouping unit 122. Namely, the EPG sender 133 may be designed to select a broadcast wave or network as a broadcasting medium for each of two types of information.

Also, the EPG sender 133 is supplied with compilation information from each of the stations 102 and generates program information of the EPG type and the like It should be noted that the EPG sender 133 may be supplied with externally generated program information. The compilation information is intended for broadcasting and having a program proceed as scheduled.

The EPG information is collectively distributed from the EPG sender 133, broadcasting facility 126 or the like to the user terminal 101. Other additional ECG (electric content guide) information such as content meta information and the like on detailed information can uniquely be managed in each station 102 which is a service provider.

In the above, the EPG sender 133 equipped at the broadcasting consignee 121 sends EPG information etc. Note however that for example, an EPG service server (not shown) that creates and distributes program information for each of the stations 102 may provide EPG by the EPG service server to the user terminal 101.

The content provider 104 is equipped with an ECG creator 135. When the station 102 makes ECG service, the ECG creator 135 creates meta information on the content meta information or the like which is to be related with the program information, for example. The content meta information thus created is provided to the ECG service company 105.

The ECG service company 105 is equipped with an ECG compiler/sender 137 that ties the program meta information to the content meta information. The program meta information and content meta information, thus tied together, are provided to the user on a broadcast wave or via the network 103. Therefore, when the program meta information is designated, the user can acquire the content meta information related with the program meta information and buy content information such as a book or the like.

When a plurality of stations 102 forms a group, for example, the grouping unit 122 functions to group pieces of program information sent from the stations 102 into a single piece of program information. Owing to this grouping, the plurality of program information from the stations 102 becomes a single piece of data.

Note that in case it has been preset that designated pieces of information to be managed by the broadcasting facility 126 at the station 102, the grouping unit 122 groups pieces of program information or the like sent from the stations 102 belonging to a designated station group into a single piece of program information. Also, the grouping unit 122 is equipped with apparatuses generally similar to those included in the broadcasting facility 126.

Note also that one ECG compiler/sender 137 at the ECG service company 105 incorporated in this embodiment may be equipped in each of the stations 102 (102a, 102b, 102c, 102d, . . . , 120n) or may be shared by all these stations 102 (102a, 102b, 102c, 102d, . . . , 120n).

The grouping by the grouping unit 122 incorporated in this embodiment has been explained as grouping of pieces of program information sent from the plurality of stations 102 in the foregoing. According to the present invention, however, the grouping may be done of pieces of program information sent from a station group including more than one or two stations 102 and more than one or two broadcasting consignees 121, for example.

The networks 103 (103a and 103b) connect the grouping unit 122, mail server 125 to receive and send an electronic mail, transaction server 127 and user terminals 101(101a, 101b, . . . , 101n) to each other for mutual two-communications. Typically, each of the networks 103 is a public line network such as the Internet or the like using ADSL (asymmetric digital subscriber line), FTTH (fiber to the home) or the like. It also includes a closed line network such as WAN, LAN, IP-VPN or the like. Also, the connecting media includes a coaxial or twisted-pair cable using FDDI (fiber distributed data interface) or the like or a satellite communication network, whether it is a cable or radio network, such as a radio network using IEEE 802.11b or the like.

There are also equipped antennas 123 (123a and 123b). The antenna is to send or receive a broadcast wave. Video signals of a program, program information or the like sent from the stations 102 are sent via the antenna 123a, and received by the antenna 123b. The video signals, program information or the like, thus received, are displayed on a display screen at the user terminal 101.

The transaction server 127 appropriately sends various kinds of information from the user to a destination apparatus for two-way service between the user terminals 101 belonging to the user and stations 102 belonging to the provider. When the transaction server 127 receives preselected-program recording plan from the user terminal 101, for example, it will send the information to the mail server 125.

Note that an electronic mail sent from the user terminal 101 as a source is sent to the mail server 125 once, and managed and held by the latter. The user terminal 101 abides by SMTP (simple mail transfer protocol) to send the electronic mail to the mail server 125, but it should be noted that the present invention is not limited to this embodiment.

The mail server 125 stores the electronic mail sent as above into a mail box assigned to each mail address included in the electronic mail as a destination. It should be noted that in case no mail box is included in the mail address, the mail server 125 may transfer that electronic mail to any other mail server included in a protocol such as SMTP or the like, for example.

The mail server 125 is requested by the user terminal 101 at every predetermined time to send an electronic mail stored in a mail box corresponding to its own mail address according to a protocol such as POP3 (post office protocol version 3).

Note that since the mail server 125 has to hold an electronic mail intended to inform a preselected-program recording plan up to a predetermined time a length of time short of a due airtime of a program preselected for recording, for example, it will refuse to send the electronic mail existing in its own mail box, even if the mail sending is requested by the user terminal 101, until the predetermined time is reached, or will delete the electronic mail stored in the mail box once or saves it in another storage location and generates an electronic mail which is to inform the preselected-program recording plan again before the predetermined time is reached.

Next, the program guide providing system 100 incorporated in this embodiment will be illustrated and illustrated. In this program guide providing system, the broadcasting facility 126, EPG sender 133, etc. provide the user terminal 101 with a program guide of the EPG (electric program guide) type or the like, for example.

Further, in the ECG service, the ECG compiler/sender 105 equipment at the ECG service company 105 performs an ECG service function to provide a program guide as well as detailed information related with a program, book such as an electronic book and content such as a movie to the user via the program guide.

The broadcasting facility 126, EPG sender 133 or ECG compiler/sender 137 incorporated in this embodiment has been illustrated and explained which are used to provide program information included in a program guide. However, it should be noted that according to this embodiment, the system components may be used to provide a books list, radio program guide or the like in place of the program guide. In the following description, the program guide providing system 100 incorporated in this embodiment will be illustrated and explained concerning a program guide of the EPG type or the like, which is displayed at the user terminal 101.

The user terminal 101 receives EPG information or program meta information in units of a station 102 or a station group, and displays a program guide on the basis of such information. Especially, in the case of the ECG service, when an appropriate program is selected from the program guide, contents related to the program are searched and contents of detailed information on the program can be acquired. It should be noted that a program guide displayed in units of a station group will be described later.

Also, more than one or two contents exist in the program guide. It should be noted here that a content in the program guide corresponds to a "program" including program information or the like and a plurality of such programs forms one program guide.

Also, the program guide providing system 100 incorporated in this embodiment may further include an account aggregation server (not shown). The account aggregation server functions to make authentication to be made when the user uses the program guide providing system 100, or accounting and payment to be made when the user using the program guide providing system 100 buys a content or the like, aggregately without depending upon the stations 102, broadcasting consignee, program or the like.

That is, because of the account aggregation server included in the program guide providing system 100, it is possible to aggregate user authentication information for making aggregated authentication (single-sign on) and also aggregate accounting and payment information for each user. It should be noted that the aggregation is effected based on an aggregated user ID resulted from aggregation of a plurality of user IDs.

The aggregation is implemented by a dedicated server, for example, that functions to aggregate all services including accounting and payment and make alternate authentication for access to all services on the basis of one aggregated user ID.

Note that the term "access" generically refers to information processing via a network, such as use of the program guide providing system, connection to the server, reference to a file, storage of a file, deletion of a file, modification of a file or the like.

Also, when it is necessary to disclose customer information for the purpose of a marketing by a content holder who holds a copyright on a work such as video, music, software game or the like, it is possible to effectively utilize the user information. In the above case, the account aggregation server is informed of an electronic certificate including a user name, user ID, etc. for example in order to authenticate the user terminal 101.

Note that when the user is going to buy various contents from content meta information displayed in a program guide, such contents may have their substance managed by various content holders and distributors.

The content meta information is stored/held in the ECG compiler/sender 105. Also, the content meta information may be generated by the ECG creator 135 equipped at the content provider 104 such as a content holder, ad agency or the like.

When sending content meta information or program meta information via the network 103, the ECG compiler/sender 137 may convert the information into BML (broadcast markup language), HTML (hyper text markup language), C-HTML (contpact-Hyper text markup language) or the like before the sending.

2.1 Broadcast equipment 126

Figure 2:
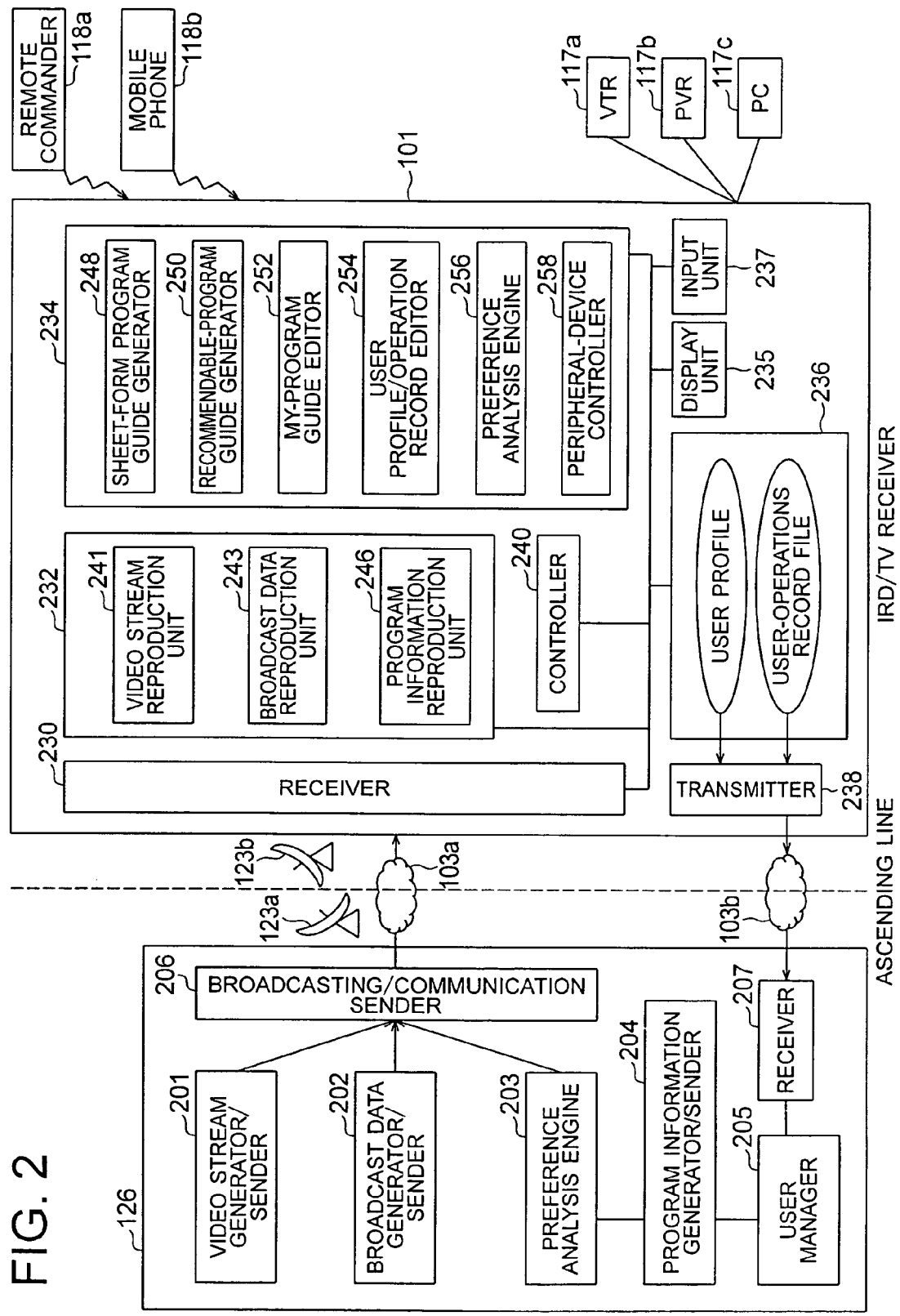
FIG. 2 is also a schematic block diagram of a broadcasting station and user terminal incorporated in this embodiment.

Referring now to FIG. 2, there will be described the broadcasting facility 126 equipped at the station 102 and the user terminal 101, both included in the program guide providing system 100 incorporated in this embodiment. FIG. 2 schematically illustrates, in the form of a block diagram, the station 102 and user terminal 101 incorporated in this embodiment.

The station 102 incorporated in this embodiment is equipped with the broadcasting facility 126 as having been described in the foregoing. As shown in FIG. 2, the broadcasting facility 126 includes a video stream generator/sender 201, broadcast-data generator/sender 202, preference analysis engine 203, program information generator/sender 204, user manager 205, broadcasting/communication sender 206 and a receiver 207.

The video stream generator/sender 201 includes at least a central processing unit (CPU), input unit, display unit, etc. The video stream generator/sender 201 generates a video stream intended for broadcasting a program, and sends the video stream to the broadcasting/communication sender 206. It should be noted that a video stream is composed of a moving picture and audio data.

The broadcast-data generator/sender 202 includes at least a CPU, input unit, display unit, etc. The broadcast data generator/sender 202 generates additional data intended for broadcasting data, and sends the data to the broadcasting/communication sender 206.

The above additional data are intended for broadcasting weather forecast, traffic information, results of sports, etc. The additional data is in the BML form, for example. The additional data is sent along with the video stream to the user terminal 101, so that the user can check a weather forecast made for a desired site while viewing and listening to a program.

The preference analysis engine 203 is a computer or the like including at least a CPU, input unit, display unit, etc. The preference analysis engine 203 receives information on the preference of each user from the user manager 205 while receiving EPG information from the program information generator/sender 204.

Receiving the preference information, EPG information, etc., the preference analysis engine 203 analyzes a program suiting the preference of each use to extract EPG information suiting the preference of each user. The extracted EPG information is used to generate a program guide (will be referred to as "My-program guide" hereunder) in which the user is most likely to be interested. The My-program guide will be explained in detail later.

Note that the EPG information included in the My-program guide is extracted for each user. Since it is necessary to receive the My-program guide for a user of the user terminal 101 when the user terminal 101 receives a My-program guide on a broadcast wave, ID information such as a user ID or the like is pre-appended to the EPG information when the My-program is generated.

In addition to the extraction of EPG information on the basis of the information on a user's preference, the preference analysis engine 203 may extract EPG information on the basis of priority information on programs to be broadcast within a preset station group (display-rank information). Because of the preset display-rank information, in case programs to be broadcast at the same airtimes are included in a program guide received by the user terminal 101 and displayed on the display screen at the latter, information on higher-ranked programs will be displayed. It should be noted that the display-rank information is tabulated for each of the program used in a station group and stored in the user manager 205.

Also, when receiving the My-program guide via the network 103, the user terminal 101 accesses the broadcasting facility 126 and sends a request for a My-program guide including the ID information such as a user ID or the like. The My-program guide will be sent to the broadcasting/communication sender 206 via the receiver 207. Therefore, the broadcasting/communication sender 206 can send a My-program guide corresponding to the user ID to the user terminal 101. Thus, the user terminal 101 can receive the My-program guide corresponding to its user ID.

Note that the broadcasting/communication sender 206 may functionally be designed to send program information and/or content information separately on a broadcast wave and via the network 103, respectively, to the grouping unit 122. Namely, the broadcasting/communication sender 206 may be designed to select a broadcast wave or network as a broadcasting medium for each of two types of information.

The program information generator/sender 204 is a computer or the like including at least a CPU, input unit, display unit, etc. The program information generator/sender 204 generates more than one or two pieces of EPG information and sends it or them to the preference analysis engine 203.

Note that the program information generator/sender 204 may also include an EPG information database (EPG information DB) in which a plurality of EPG information and the like are stored. Upon reception of a command from a compilation terminal (not shown) included in the station 102, the program information generator/sender 204 can call and send EPG information or the like stored in the EPG information DB.

The EPG information includes a variety of information such as program titles and compositions, sponsors, etc. The EPG information is generated in the step of program compilation, for example. It should be noted that the program meta information is also in compliance with the EPG information.

The EPG information or program meta information are generated under a command from a program information creation terminal (not shown) connected to the program information generator/sender 204. The program information creation terminal may be equipped either at the broadcasting consignor or in the station 102.

The user manager 205 is a computer including at least a CPU, input unit, display unit, etc. The user manager 205 manages information on a record of program viewing/listening by the user of the user terminal 101, preference information on the user or the like. Also, upon reception of a desired to buy a content or contents from the user terminal 101, the user manager 205 will request the account aggregation server (not shown) for payment.

The broadcasting/communication sender 206 sends streams of EPG information and program video stream, and data such as data broadcasting additional data and EPG information via the network 103 or antenna 123*a*. It should be noted that the additional data and EPG information may be sent after they are converted into BML, HTML or C-HTML. Also, the video stream, additional data and EPG information may be sent after coded into a TS (transport stream) form.

2.2 User terminal 101

The components of the user terminal 101 incorporated in this embodiment will be described herebelow with reference to FIG. 2. As shown, the user terminal 101 includes a receiver 230, reproduction block 232, data processing block 234, display unit 235, storage unit 236, input unit 237, transmitter 238 and a controller 240.

Note that the input unit 237 incorporated in this embodiment or an input unit (not shown) such as input buttons provided on the control terminal 118 corresponds to a designation reception unit or the like to receive a designation of an airdate or the like. Also, when a designation is sent from the control terminal 118 to the user terminal 101, it is considered that the designation reception unit has received a designation.

The reproduction block 232 includes a video stream reproduction unit 241 to receive, from the receiver 230, a video stream sent from the station 102 and reproduce it, a broadcast data reproduction unit 243 to receive and reproduce additional data, and a program information reproduction unit 246 to reproduce a sheet-form program guide or the like, for example, resulted from manipulation of program information such as EPG information into an appropriate program guide. It should be noted that the controller 240 or program information reproduction unit 246 incorporated in this embodiment corresponds to a display controller to display program information not to overlap in a cell of the program guide and a changer to change the mode of cell display.

The data processing block 234 includes at least a sheet-form program guide generator 248 to generate a sheet-form program guide from the EPG information, a recommendable-program guide generator 250 to generate a recommendable-program guide from the EPG information, a My-program guide editor 252 to edit/generate a My-program guide for each user from the sheet-form program guide, a user profile/operation record editor 254, a preference analysis engine 256, and a peripheral-device controller 258. It should be noted that the preference analysis engine 256 is constructed generally similarly to the preference analysis engine 203 having previously been described and so will not be described in detail.

Under a command from the controller 240, the display unit 235 processes to-be-reproduced data so that the video stream reproduction unit 241, broadcast data reproduction unit 243 or program information reproduction unit 246 can display the data, and display the processed data on the display screen. It should be noted that the display unit 209 may be a TV unit, liquid crystal display unit or the like, for example and can also output a still picture, sound, moving picture or the like.

The storage unit 236 can store and manage user various kinds of data such as profile information, user-operations record file, etc. It should be noted that the terms "storage and management" generically refers to general information management such as call of desired information, fetch of information, storage of new information in an appropriate location, deletion of unnecessary information, etc.

The input unit 237 includes a pointing device such as a mouse, trackball, track pad, stylus pen or joystick or a keyboard, operable by the user, but in this embodiment, the input unit 237 may be any other than these devices. Since the control terminal 118 is not connected to the user terminal 101, it is not included in the input unit 237. However, the control terminal 118 is generally similar in function to the input unit 237.

The transmitter 238 transmits designated data to the station 102 via the network 103*b*.

With a command from the control terminal 118 such as a remote commander 118*a*, mobile phone 118*b* or the like or with a command from the input unit 237, the user terminal 101 can set a preselected-program recording plan for a VTR 117*a*, and record the preselected program to the VTR 117*a*. It should be noted that the user terminal 101 includes a control terminal receiver (not shown) to receive a command from the control terminal 118 by radio or infrared rays.

3.1 EPG Service-Based Program Guide

Figure 3:
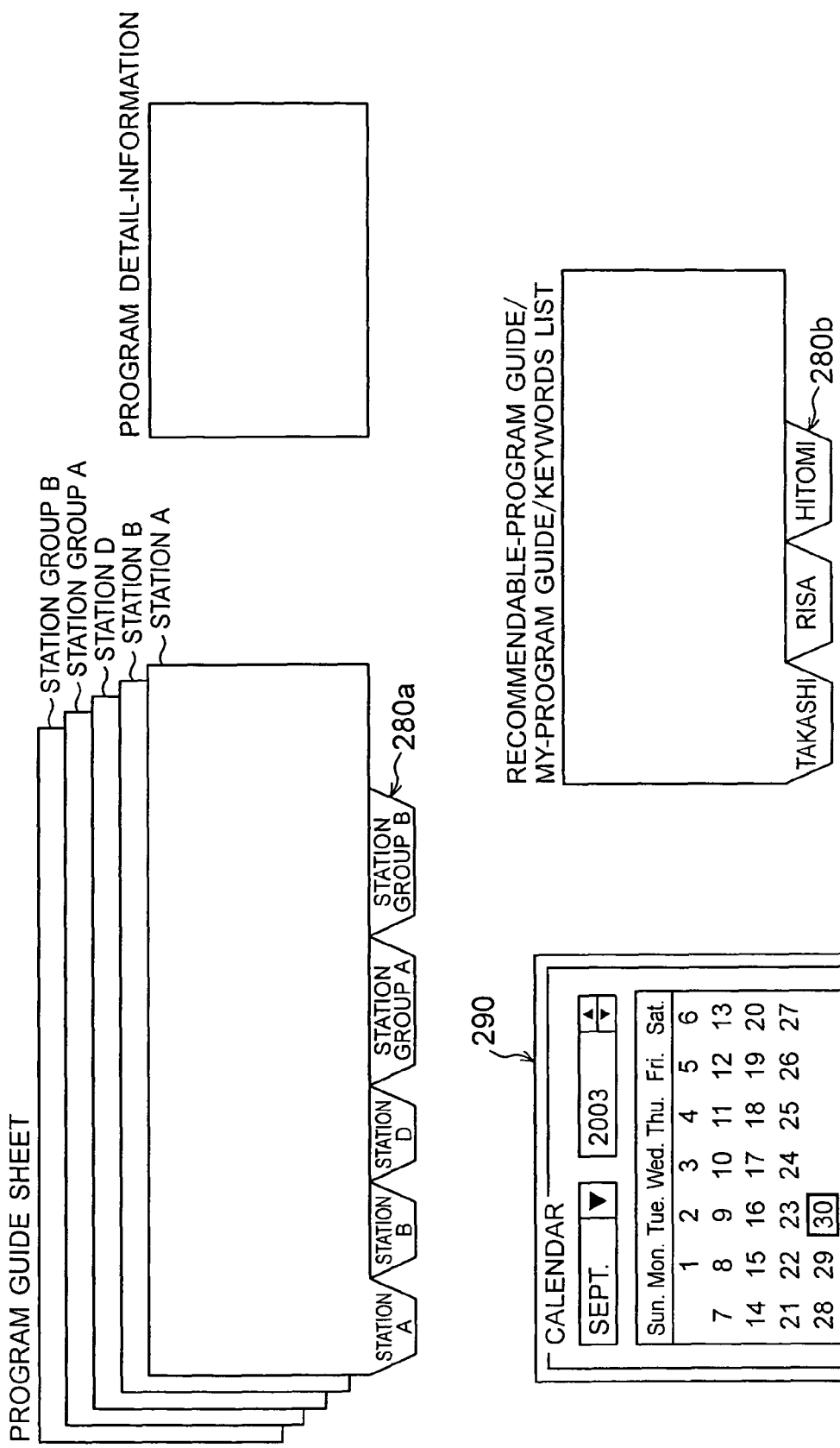
FIG. 3 schematically illustrates a program guide displayed on the display screen at the user terminal incorporated in this embodiment.

An EPG service-based program guide displayed on the display screen at the user terminal 101 will be explained herebelow with reference to FIG. 3. FIG. 3 schematically illustrates a program guide displayed on the display screen at the user terminal 101 incorporated in this embodiment.

As shown in FIG. 3, program guides such as more than one or two sheet-form program guides, recommendable-program guide, My-program guide, keywords list, etc. are displayed on the display screen at the user terminal 101. There are also displayed detailed information on a plurality of programs included in the program guide, request table for a guide of programs to be broadcast on set desired airdates, etc. as necessary. It should be noted that the request table incorporated in this embodiment corresponds to a setting window or the like intended for designating an airdate of a program guide in order to request display of a program guide, for example.

As shown in FIG. 3, the "sheet-form program guide" has provided at the bottom thereof tabs 280a for changing a program guide to another for display for each of stations such as "A station", "B station", "D station". Also, the sheet-form program guide shows a list of programs (program guides) of each of the stations such as "A station", for example, along date and time axes, for example. It should be noted that the tubs 280a may be provided in any other positions than the bottom of the sheet-form program guide.

Further, the sheet-form program guide may have a list of programs to be broadcast from a station group (such as "Station group A") of a plurality of stations, for example, displayed therein by selecting one of tabs 280a with a mark "Station group B" or the like at the input unit 237, control terminal 118 or the like.

A sheet-form program guide is generated by the sheet-form program guide generator 248 on the basis of EPG information related with a program to be broadcast by the station 102, broadcasting consignee 121 or the like on a designated date.

When the sheet-form program guide is thus generated, only programs suiting the preference of the user are extracted from the program guide and aggregated into a list, thereby generating a recommendable-program guide. The preference analysis engine 256 analyzes user's preference, and the recommendable-program guide generator 250 generates a recommendable-program guide on the basis of the analysis result.

The recommendable-program guide includes programs to be broadcast from a station group as well as from a plurality of stations in a list categorized according to each airdate and airtime, for example. The recommendable-program guide will be described in detail later.

The recommendable-program guide is directly edited by the user or the like operating the user terminal 101 into a My-program guide. Receiving a command from the input unit 237, the My-program guide editor 252 manipulates a recommendable-program guide into a My-program guide.

As will be known from the above, the major difference between the My-program guide and recommendable-program guide is the edition made by the user. Namely, a recommendable-program guide is automatically generated by the preference analysis engine 256 and recommendable-program generator 250 without any manipulation and edition by the user, while the My-program guide is generated by the user manipulating and editing a program guide such as a recommendable-program guide as a base for himself or herself.

Each of the recommendable-program guide, My-program guide and keywords list has tabs 280b provided at the bottom thereof similarly to the sheet-form program guide. By selecting any of the tabs 280b, a display can be selected for each user of the user terminal 101, for example. In case there exist three users having the same user ID, for example, the tabs 280b are marked with user names such as "Takashi", "Risa" and "Hitomi" as shown in FIG. 3.

By selecting any of the user names on the tabs 280b at the input unit 237 or the like, a recommendable-program guide, My-program guide or keywords list for the selected user can be displayed on the display screen. For example, when the tab 280b with a mark "Takashi" is selected, a recommendable-program guide for "Takashi" will be displayed.

Also, a request table 290 for a guide of programs to be broadcast on desired dates or in a desired week is displayed on the display screen. By designating a year, month and days as shown in FIG. 3, a sheet-form program guide, recommendable-program guide or the like is generated and displayed. In the example shown in FIG. 3, a program guide is selected only for one day "30", but in this embodiment, program guides may be selected for a plurality of days of week, respectively.

Also, as the "program detail-information" shown in FIG. 3, detailed information such as profiles of performers in a program, plots of previous and next programs, etc. are displayed on the display screen of the user terminal 101.

3.2 Sheet-Form Program Guide for Single Station

Next, display of a sheet-form program guide at the display unit 235 will be explained with reference to FIG. 4. FIG. 4 schematically illustrates a sheet-form program guide displayed at the display unit incorporated in this embodiment.

As shown in FIG. 4, the sheet-form program guide is a spread sheet including a horizontal axis as a date axis along which there are indicated a plurality of airdates and a plurality of days of week are indicated, a vertical axis as a time axis along which times are indicated at every two hours, and a plurality of cells at intersections between the date and time axes and in which program information is displayed. It should be noted that the time axis incorporated in this embodiment is any of the horizontal or vertical axis of the program guide and may be any other than such a horizontal or vertical axis.

An example of a sheet-form program guide having a date axis along which a month, days and days of week are indicated will be explained below, but it should be noted that the date axis may be any other than that in this example. The date axis may have a year, month, days and days of week indicated along it, for example. Also, this example has a time axis along which airtimes are indicated at every two hours but it should be noted that the time axis may be any other than this airtime example. The time axis may have airtimes indicated at every one hour along it, for example.

In each of the above cells, there are displayed a content of program information such as EPG information or program meta information sent from the station 102. For example, information such as program titles or the like are displayed in each cell. Also, in addition to the EPG information and the like, there will be displayed "icons" indicating whether there exists content meta information and information such as "preselected-program recording planning" buttons and the like for planning to record a preselected program or programs. It should be noted that data for the icons, buttons and the like are generated at the station 102 or user terminal 101. It should also be noted that information on one program is displayed in one cell. That is, information on more than one program will not be displayed in one cell.

Each of the icons incorporated in this embodiment is a command for supply to an information processing unit such as the user terminal, for example, in the form of a mark displayed on the display screen, such as a symbol, figure or the like. By pointing and manipulating an icon displayed on the display screen at the input unit 237 or the like, a command corresponding to the icon, such as a request for display of program information or the like, is executed.

Times indicated along the time axis shown in FIG. 4 are 16:00 to 24:00. In case any other airtimes (06:00 to 10:00, for example) are to be indicated along the time axis in a program guide, however, information on programs on the other airtimes can be displayed in the cell by the use of a window moving means such as a scroll bar (not shown) displayed on the display screen.

Note that the sheet-form program guide shown in FIG. 4 provides a program guide from a single station "A station", not any group station, but has no table for selection of a program from any other station. Also, the data axis incorporated in this embodiment indicates dates of one week, by way of example. However, the data axis may be any other one indicating dates of two weeks, ten dates of week or the like.

The sheet-form program guide shown in FIG. 4 lists only all programs to be broadcast by the station on the display screen. However, the user can select programs in which he or she is interested or programs he or she is going to view and listen to from the sheet-form program guide, and customize the sheet-form program guide into a his or her own program guide (My-program guide). The My-program guide will be described in detail later.

A variant of the sheet-form program guide shown in FIG. 4 will be explained herebelow with reference to FIG. 5. It should be noted that since the sheet-form program guide shown in FIG. 5 is formed generally identical to the one shown in FIG. 4, only the differences between the variant and the sheet-form program guide in FIG. 4 will be described below.

Figure 5A:
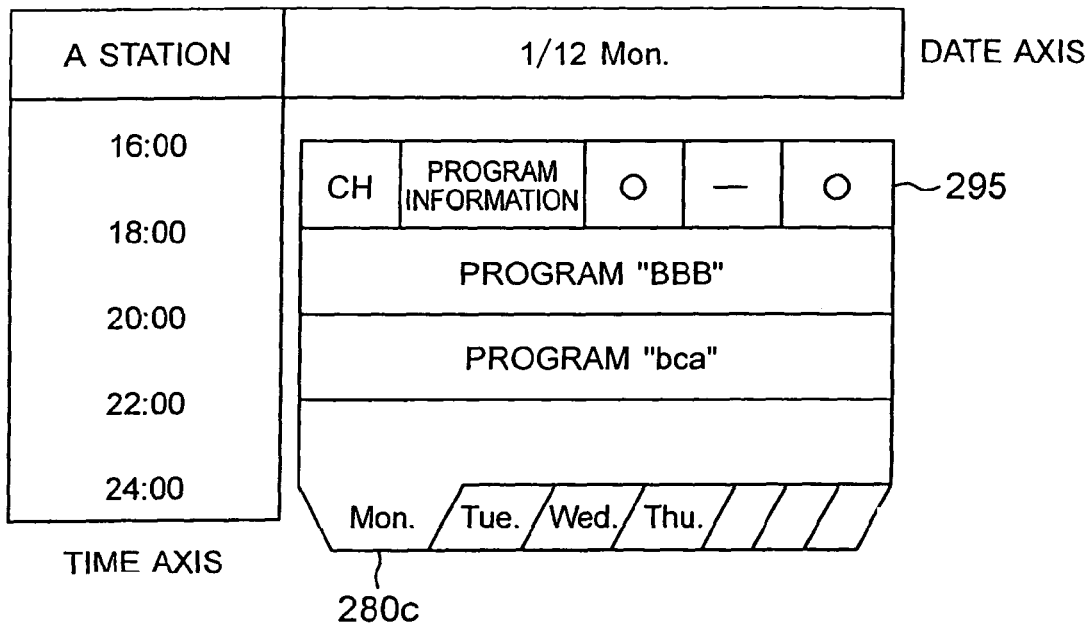
FIG. 5 explains a variant of the sheet-form program guide shown in FIG. 4.

The sheet-form program guide shown in FIG. 5A is identical to the one shown in FIG. 4 in that it has a horizontal axis as a date axis and a vertical axis as a time axis, but different from the latter in that only one date is indicated along the horizontal axis.

Since it is not necessary to display a program guide for a plurality of dates on the display screen, the area of the latter may be smaller. Especially, the sheet-form program guide shown in FIG. 5 is more suitable for a user terminal 101 whose display screen cannot be designed to have a large area for any reasons, such as a PDA, mobile phone or the like.

Figure 5B:
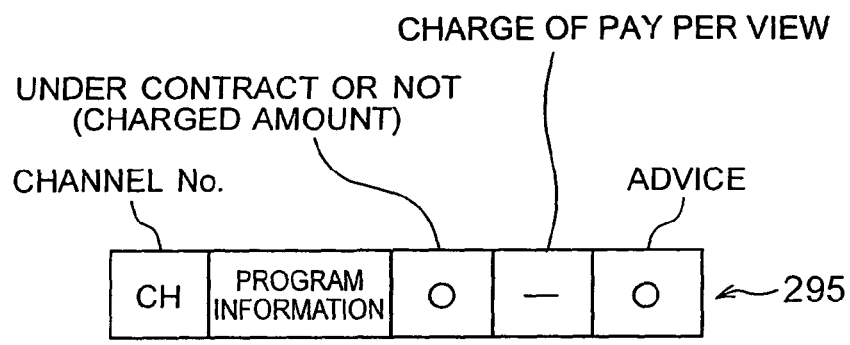

Also, the cells forming the sheet-form program guide in FIG. 5 are displayed in a different manner from that for the sheet-form program guide in FIG. 4. As shown in FIG. 5B, a number for a channel over which the program is to be broadcast, program information such as a program title, "under contract or not", charge for pay per view(PPV), and advice by electronic mail of preselected-program recording programming (done or not) are displayed in corresponding categorized areas in a cell 295.

The cell 295 may display icons, buttons, etc. As mentioned above, a minimum amount of information is displayed in each display area defined by categorizing the cell 295 to make the most of the display screen.

By selecting more than one or two of tabs 280*c* "Mon.", "Tue.", "Wed.", "Thu.", . . . shown in FIG. 5A at the input unit 237 or control terminal 118 such as a remote commander or the like, the airdate in the program guide can be changed from one to another. It should be noted tat the tabs 280*c* are used for selection of a day of week as above.

As shown in FIGS. 4 and 5, the program guide has ruled lines displayed therein to categorize the cells incorporated in this embodiment. However, it is should be noted that no such ruled lines may be used so long as cells are displayed in the form of a categorized form. Broken lines may be used in place of such ruled lines.

3.3 Sheet-Form Program Guide for a Plurality of Stations

Display of a sheet-form guide of programs to be broadcast from a plurality of stations on the display unit 235 will be described below with reference to FIG. 6. FIG. 6 schematically illustrates a sheet-form program guide displayed at the display unit incorporated in this embodiment.

As shown in FIG. 6, the sheet-form program guide is a spread sheet including a horizontal axis as a date axis along which there are indicated a plurality of airdates and a plurality of days of week, a vertical axis as a time axis along which times are indicated at every two hours, and a plurality of cells at intersections between the date and time axes and in which program information is displayed. It should be noted that since this sheet-form program guide is formed generally identical to the one shown in FIG. 4, only the differences between this sheet-form program guide and the one in FIG. 4 will be described below.

As shown in FIG. 6, the sheet-form program guide has, at the bottom thereof, tabs 280*a* marked with "A station", "B station", "C station", "D station", "Station group A" and "Station group B" used for selection of a sheet-form program guide for a desired one of the plurality of stations.

When one of the tabs 280*a* is selected at the input unit 237 or the like, it becomes active being changed in presentation and appears different from the other tabs 280*a*. Thus, there will be displayed a sheet-form program guide corresponding to an appropriate station.

On the display screen shown in FIG. 6, the tab 280*a* with a mark "Station group A" is selected, and a sheet-form program guide for the station group A is displayed. Also, the name of the selected station is displayed as "Station group A" or the like at an intersection between the date and time axes. However, the present invention is not limited to this example.

Also, the station group A incorporated in this embodiment is a group of local stations and a nationwide station, a group of local stations or the like. However, it may be any other one. The station group A may include the AAA, BBB, CCC, RRR, YYY, ZZZ and AXZ stations etc., for example.

Figure 7:
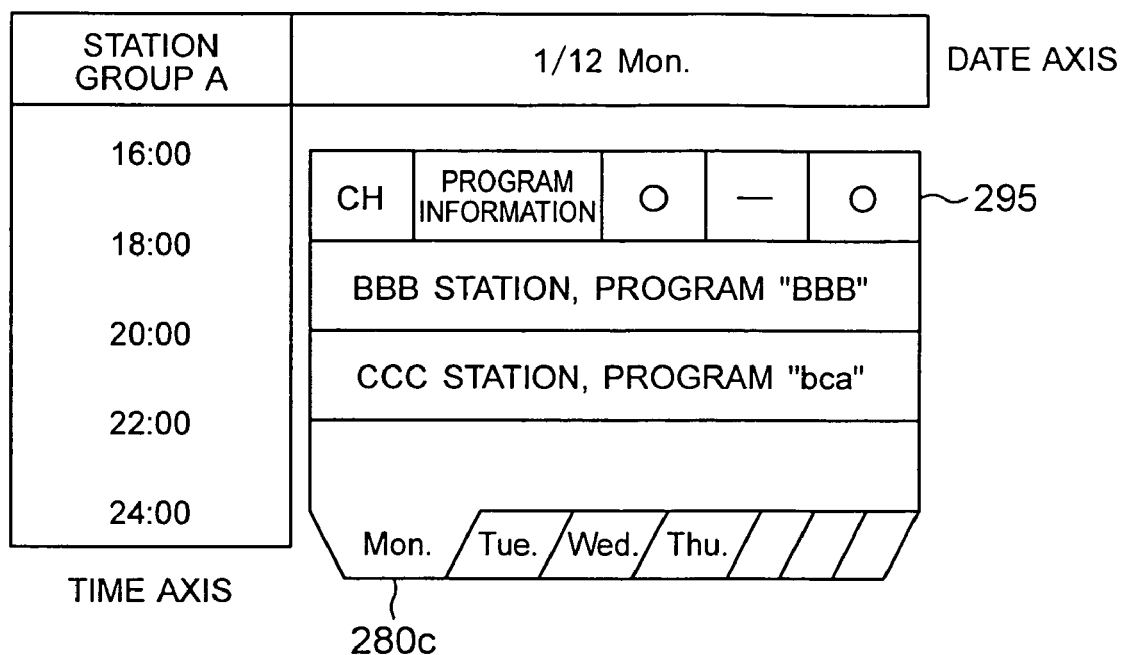
FIG. 7 explains a variant of the sheet-form program guide shown in FIG. 6.

A variant of the sheet-form program guide shown in FIG. 6 will be explained herebelow with reference to FIG. 7. It should be noted that since the sheet-form program guide in FIG. 7 is formed generally identical to the one shown in FIG. 5 except for the display of the A station at the intersection of the date and time axes because the selected station is the station group A, it will not be described in detail.

3.4 Recommendable Program Guide

Display of a recommendable one of the program guides on the display unit 235 will be described below with reference to FIG. 8. FIG. 8 schematically illustrates a recommendable-program guide displayed at the display unit incorporated in this embodiment.

As shown in FIG. 8, the recommendable-program guide is a spread sheet including a horizontal axis as a date axis along which there are indicated a plurality of airdates and a plurality of days of week, a vertical axis as a time axis along which times are indicated at every two hours, and a plurality of cells at intersections between the date and time axes and in which program information is displayed. It should be noted that since the recommendable program guide in FIG. 8 is formed generally identical to the sheet-form program guide shown in FIG. 4 or 6, only the differences between this recommendable program guide and sheet-form program guide in FIG. 4 or 6 will be described below.

An example of a recommendable program guide having a date axis along which a month, days and days of week are indicated will be explained below, but it should be noted that the date axis may be any other than that in this example. The date axis may have a year, month, days and days of week indicated along it, for example. Also, this example having a time axis along which airtimes are indicated at every two hours but it should be noted that the time axis may be any other than this airtime example. The time axis may have airtimes indicated at every one hour along it, for example.

The recommendable-program guide is a user-oriented one generated by manipulating, at the user terminal 101 on the basis of the information on the preference of each user, a sheet-form program guide generated on the basis of EPG information and the like from the station 101.

Therefore, there will be displayed in the cells information such as titles or the like of programs in which the user is most likely to be interested. The information is extracted by the preference analysis engine 256 equipped at the user terminal 101. It should be noted that the source of information such as EPG information or the like for display in the cells is generally the same as that having previously been described with reference to FIG. 4.

The preference incorporated in this embodiment includes, for example, a user's name, birthdate, address, taste, genre of a program of interest, etc. The preference information may be user's operation record or the like, such as profile information to be registered by the user going to use an EPG service, type of program information the user has accessed or the like, for example.

The above recommendable-program guide incorporated in this embodiment is one generated at the user terminal 101 and displayed on the display screen. However, the recommendable-program guide may be any other one, and the station 102 may generate a recommendable-program guide. In addition, at the user terminal 101, a recommendable-program guide once generated at the station 102 may automatically be manipulated with the preference analysis engine 256.

As shown in FIG. 8, the recommendable-program guide has also tabs 280b marked with user's names "Takashi", "Risa" and "Hitomi" provided for selection a recommendable-program guide for an appropriate one of a plurality of users using the same user terminal 101.

When one of the tabs 280b is selected at the input unit 237 or the like, it becomes active being changed in presentation and appears different from the other tabs 280b. Thus, there will be displayed a recommendable-program guide for an appropriate user.

When the user's name is "Risa", for example, and the tab 280b with "Risa" is selected at the input unit 237 or the like, the tab 280b with the mark "Risa" becomes active and a recommendable-program guide will appear on the display screen.

A variant of the sheet-form program guide shown in FIG. 8 will be explained herebelow with reference to FIG. 9. It should be noted that since the recommendable-program guide in FIG. 9 is formed generally identical to the one shown in FIG. 5 or 7, only the differences between the variant and the recommendable-program guide in FIG. 5 or 7 will be described below.

Figure 9:
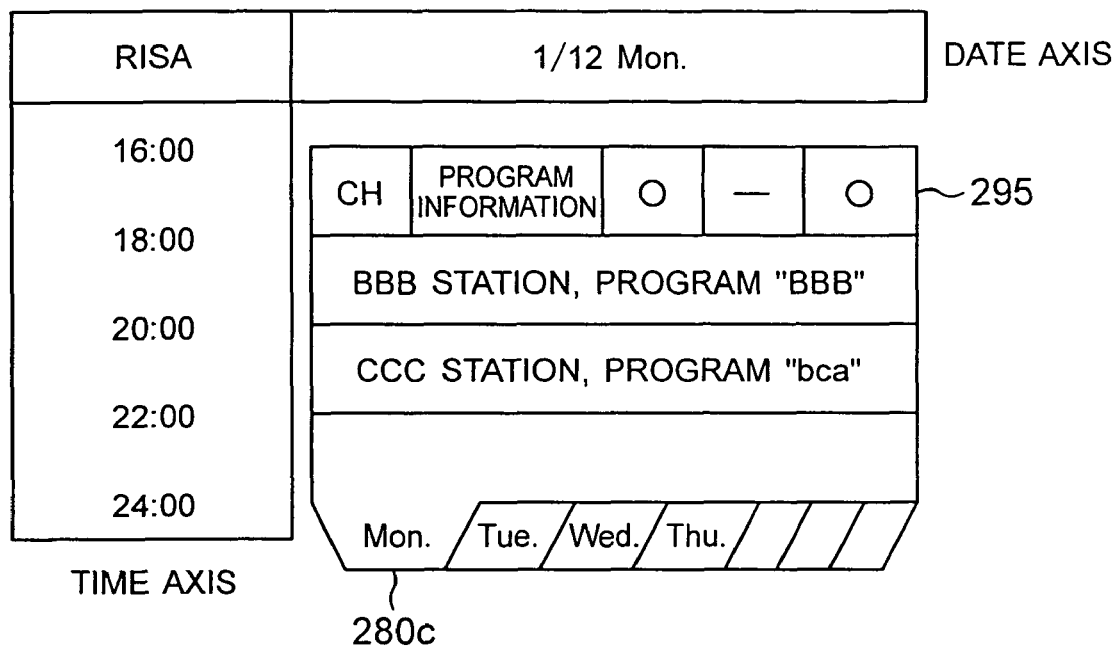
FIG. 9 explains a variant of the recommendable-program guide shown in FIG. 8.

Since the recommendable-program guide shown in FIG. 9 is generated for each user, it is formed generally identical to the sheet-form program guide shown in FIG. 5 or 7 except for display of "Risa" at an intersection between the date and time axes for the displayed and selected user has the name "Risa".

Note that tabs 280c shown in FIG. 9 selects a day of week in a recommendable-program guide displayed for "Risa", not any tabs for selection of a user as shown in FIG. 8. By selecting a menu button (not shown) for display of the menu window, provided at the user terminal 101, for example, a user can be selected from a user select window displayed in the menu window.

3.5 My-Program Guide

Display of a My-program guide among the program guides on the display unit 235 will be described herebelow with reference to FIG. 10. FIG. 10 schematically illustrates the My-program guide displayed at the display unit incorporated in this embodiment.

As shown in FIG. 10, the My-program guide is a spread sheet including a horizontal axis as a date axis along which a plurality of dates and a plurality of days of week are indicated, a vertical axis as a time axis along which airtimes are indicated at every two hours, and a plurality of cells at intersections between the date and time axes. It should be noted that since the My-program guide shown in FIG. 10 is formed generally identical to the sheet-form program guide shown in FIG. 4, 6 or 8 as well as to the recommendable-program guide, there will be described only the differences between the My-program guide and the sheet-form program guides and recommendable-program guide.

An example of a recommendable program guide having a date axis along which a month, days and days of week are indicated will be explained below, but it should be noted that the date axis may be any other than that in this example. The date axis may have a year, month, days and days of week indicated along it, for example. Also, this example having a time axis along which airtimes are indicated at every two hours but it should be noted that the time axis may be any other than this airtime example. The time axis may have airtimes indicated at every one hour along it, for example.

The My-program guide as a user's own program guide can be generated by the user operating the user terminal 101 to manipulate, according to a user's schedule and demand, a sheet-form program guide or recommendable-program guide on the basis of EPG information or the like from the station 102. Since the My-program guide is more customized for personal use than the EPG-form program guide for all audiences, it is easier to view and the user can find his desired program with a minimum search.

When the user terminal 101 is operated by the user, the title of a selected program and information on performers in the program are displayed in each of a plurality of cells at every airdate and airtime on the display screen. It should be noted that information sources such as EPG information and the like for display in cells are generally similar to those having previously been described with reference to FIG. 4.

As shown in FIG. 10, "My-program guide" is displayed at an intersection between the date and time axes in order to indicate that a program being displayed in the window is a My-program guide. However, the present invention is not limited to this example.

Also, when a plurality of programs is selected by the user from a sheet-form program guide, information on the programs is displayed in cells in the My-program guide, corresponding to the airdates and airtimes in the sheet-form program guide from which the programs have been selected.

As shown in FIG. 10, when the program is displayed in a cell of the My-program guide, the cell will change in color to gray, for example, indicating that the program is exactly selected. However, the present invention is not limited to this example, but program information may simply be displayed in the cell without such color change.

Also in the My-program guide in FIG. 10, nothing is displayed in cells from which no program will be selected. However, the present invention is not limited to this example, but a program or the like given a higher ranking of recommendation by the station 102, for example, may be displayed in such a cell.

In the cell in which the program information is displayed, recommendation ranking such as "(A)", "(B)" or "(C)" will be displayed in addition to the title of program, performers' names as shown in FIG. 10.

The recommendation ranking is displayed in the cell in the My-program guide when it is set for a program selected from a program guide such as a keywords list. Of the recommendation ranks, "(A)" indicates a highest rank, and a program to which (A) is appended is a one to be viewed and listened to most preferentially. The keywords list will be described in detail later.

There has been explained above an example in which the recommendation ranking information incorporated in this embodiment is set for one selected among programs included in the keywords list by the user. It should be noted however that the present invention is not limited to this example but recommendation ranking information may be set at the station 102, for example. Also, recommendation ranking information may be set for user (such as user-oriented recommendation ranking information).

Also, the My-program guide in FIG. 10 has no tabs 280*b* marked with users' names for selection of a recommendable-program guide for an appropriate one of a plurality of users of the same user terminal 101 as in the recommendable-program guide shown in FIG. 8. However, the My-program guide may have tabs 280*b* marked with users' names provided therefor.

A variant of the My-program guide shown in FIG. 10 will be explained herebelow with reference to FIG. 11. It should be noted that since the My-program guide in FIG. 11 is formed generally identical to the sheet-form program guides and recommendable-program guide shown in FIGS. 5, 7 and 9, respectively, only the differences between the variant and the sheet-form program guides and recommendable-program guide in FIGS. 5, 7 and 9 will be described below.

Figure 11:
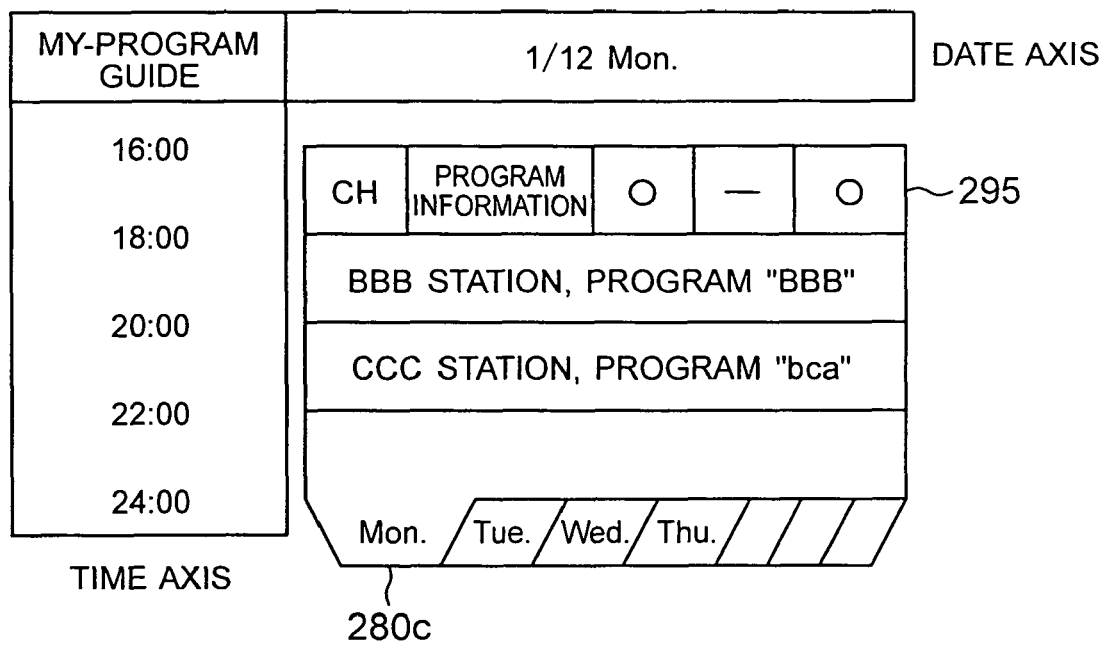
FIG. 11 explains a variant of the My-program guide shown in FIG. 10.

Since the My-program guide shown in FIG. 11 is formed generally identical to the sheet-form program guides and recommendable-program guide in FIGS. 5, 7 and 9, only the differences between them will be described below.

Also, the My-program guide is different from the sheet-form program guides and recommendable-program guide, automatically generated at the user terminal 101 or station 102, in that a plurality of desired programs is to be selected by the user.

Note that tabs 280*c* shown in FIG. 11 selects a day of week in a displayed recommendable-program guide, not any tabs for selection of a user as shown in FIG. 8. By selecting a menu button (not shown) for display of the menu window, provided at the user terminal 101, for example, a user can be selected from a user select window displayed in the menu window.

4.1 Program Information

Program information incorporation in this embodiment will be explained below. The program information may be program meta information or EPG information, for example. It should be noted that the program meta information is information compliant with EPG information.

The EPG service for distribution of an EPG-form program uses program information as the EPG information. The ECG service uses program meta information as program information, and also uses "tying meta information" or the like, which ties a program and content of the latter to each other, through tying content meta information and program meta information to each other.

Note that although the tying meta information incorporated in this embodiment is taken as ECG information unless otherwise specified herein, the present invention is not limited to this example but the ECG information may include program meta information, content meta information and tying meta information or the like.

The EPG information is electronic program guide data intended for searching a TV program. EPG information is distributed to the user terminal 101 by an EPG service server or the like (partially varies in content from one EPG service to another) which distributes SI (system information) on a current broadcast wave and EPG information on the Internet.

The EPG service can be expanded to the ECG service, and using the ECG service, it is possible to search TV programs as well as various contents available via the network 103 and obtain the search various contents.

The program meta information is meta information related to a program, among meta information provided as an ECG service. The program meta information may be the title and genre of a program and performers in the program, for example.

As mentioned above, the program meta information is information compliant to EPG information, and similar to SI on a current broadcast wave and information distributed by an EPG service server 108 (partially varies in content from one EPG service to another). The program meta information is different in data structure from EPG information but substantially same in content as one which is expressed as EPG information.

The content meta information is meta information included in the ECG service. Also, the content meta information is tied to program meta information by tying meta information. By accessing program meta information, it is possible to obtain necessary content meta information appropriately. It should be noted that further accessing the program meta information on the basis of the content meta information will permit to buy or access a content substance of a book or a CD related to a program.

The content meta information may be, for example, information on a location (site information), name and category of a content substance which is URI (universal resource identifier), name of an author, name of a creator of the content substance, a term of validity of a service which provides the content substance or the like. It should be noted that URL is included in the above-mentioned URI system.

The EPG information includes, for example, the title and genre of a program and names of performers in the program. The program genre indicates the genre of a program to be broadcast and may be a drama, music or variety show, for example. The performer's name indicates a window or stage name or its abbreviation. However, it may be any other than the window or stage name or its abbreviation.

The program meta information is formed generally identical to the EPG information but it may be formed otherwise. It may be, for example, the attribute of a performer (such as "actor or actress", "singer", "athlete", "comedian" or "painter").

In case the content relates to music, for example, the content meta information includes information on music such as "title of music", "artist's name", "music label" or "URL of music purchase site".

Also, the content meta information may be information on a shop selling contents, such as "name", "address" or the like, information on article of trade, such as "name of article", "URL of article purchase site" or the like, or information on sales campaign such as "URL of site needing promotion for users' access".

The content meta information incorporated in this embodiment has been explained above taking the meta information on music, shop, article of trade or sales campaign as an example. It should be noted however that the present invention is not limited to this example if the content meta information relates to a program, for example.

Also, the content meta information has stated therein information on music or information on shop or information on sales campaign as in the foregoing. In case the content meta information relates to a movie DVD, for example, it will have stated therein the name and address of a shop selling the DVD, article name of the DVD, URL of accessible site of the shop, etc.

5.1 Generation of Program Guide

Next, how to generate a program guide incorporated in this embodiment will be described with reference to FIG. 12. FIG.

12 schematically illustrates the generation of a program guide incorporated in this embodiment.

Figure 12:
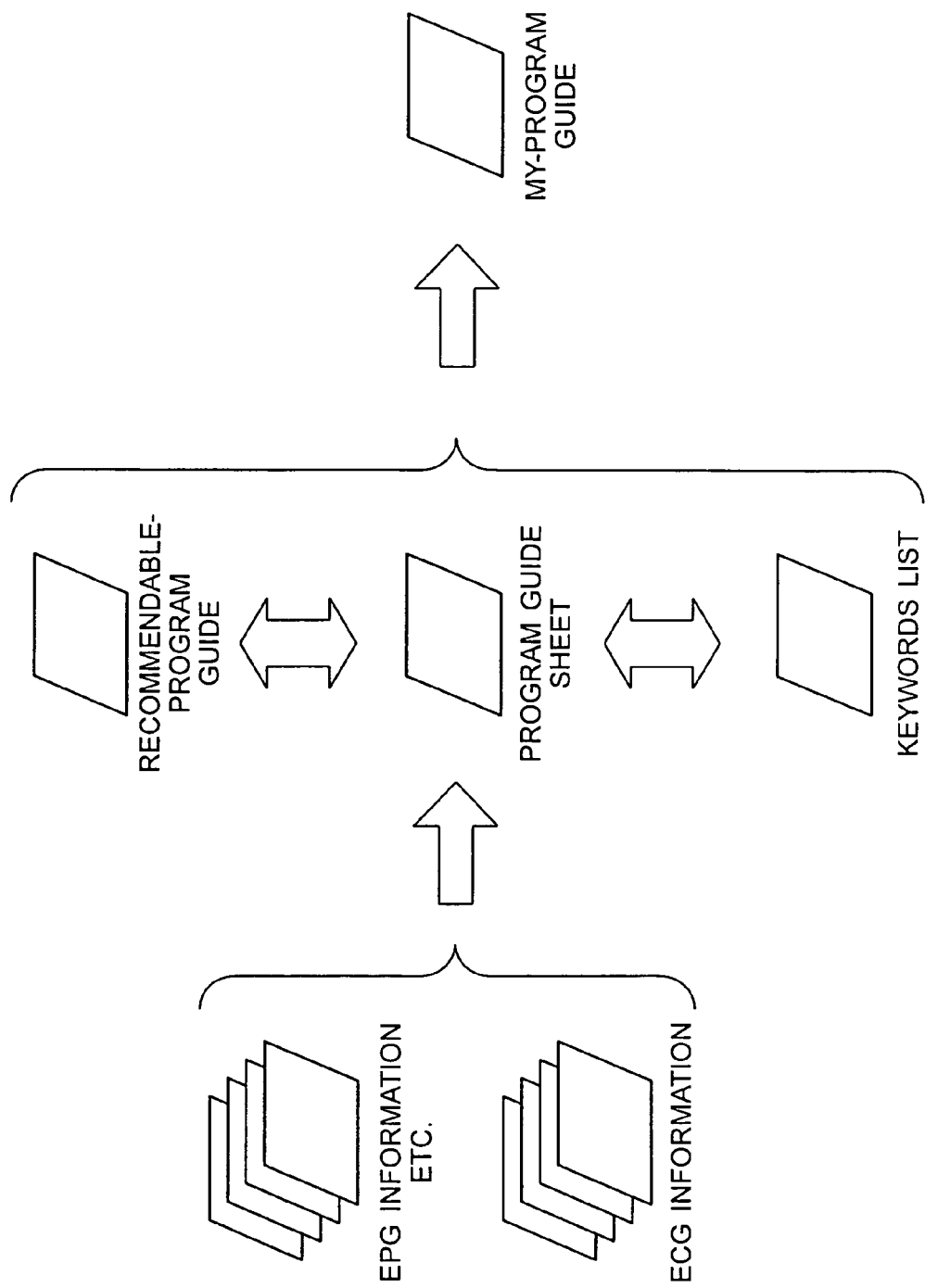
FIG. 12 schematically illustrates a procedure of creating a program guide incorporated in this embodiment.

As shown in FIG. 12, a program guide such as a sheet-form program guide, recommendable-program guide, keywords list or a My-program guide is generated based on EPG information, program meta information, ECG information or content meta information.

First, a sheet-form program guide is generated from EPG information, program meta information, content meta information or ECG information, and then a recommendable-program guide or keywords list is generated by the preference analysis engine 256 or the like from the sheet-form program guide.

A My-program guide is generated by manipulating each of the sheet-form program guide, recommendable-program guide or keywords list at the user terminal 101.

Note that the user may preset a program guide which will be displayed on the display screen when the user terminal 101 is turned on. By setting a My-program guide as a program guide which will initially appear on the display screen when the user terminal 101 is turned on, the My-program guide will be displayed each time the initial window is displayed.

Here will be described each of the steps of operation made in the program guide providing system 100 incorporated in this embodiment. First, the pre-registration incorporated in this embodiment will be described with reference to FIG. 13 being a schematic flow diagram showing operations made in the pre-registration incorporated in this embodiment.

5.2 Pre-Processing

Figure 13:
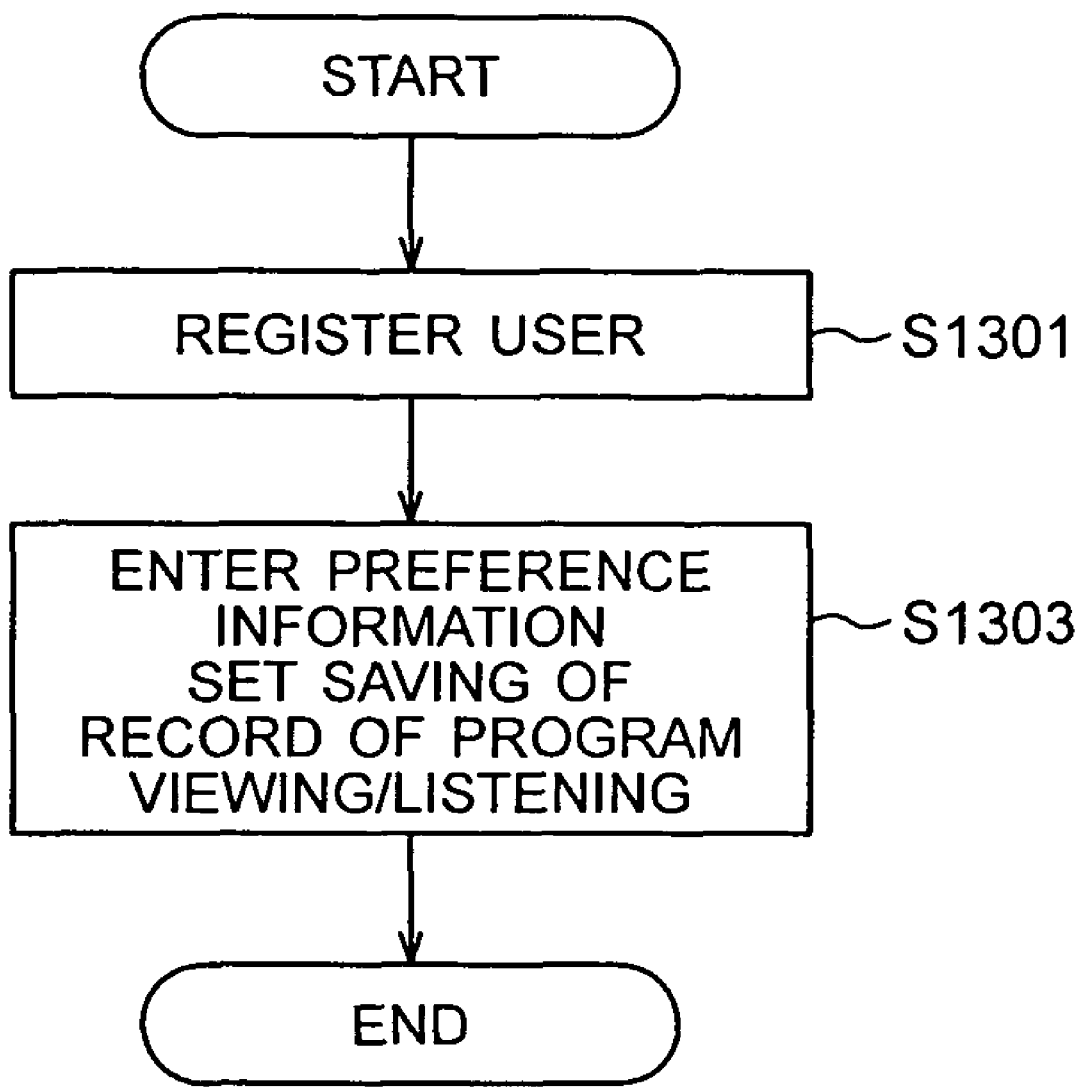
FIG. 13 is a schematic flow diagram showing operations made in pre-registration incorporated in this embodiment.

To use the program guide providing system 100, the user operates the input unit 237 or control terminal 118 equipped at the user terminal 101 to access the broadcasting/communication sender 206 equipped in the broadcasting facility 126 via the network 103 as shown in FIG. 13. It should be noted that the broadcasting/communication sender 206 has also a server function to make a response to a request from the user terminal 101 as a client.

Next, the broadcasting/communication sender 206 thus accessed will send registration window information intended for registration of a user to the user terminal 101, and a user registration window (not shown) will be displayed on the display screen at the user terminal 101.

By operating the input unit 237, the user writes necessary information such as his or her name, address, birthdate and the like to corresponding places in the user registration window on the display screen. When an "register button" displayed on the display screen is pressed, the user profile/operation record editor 254 will generate user registration information and send it to the station 102 via the transmitter 238. It should be noted that the user registration information thus generated will be stored as user profile information in the storage unit 236.

When the station 102 or broadcasting consignee 121 receives the user registration information, user profile information included in the user registration information will be stored for each user into the user manager 205 in the broadcasting facility 126.

When the user registration information arrives at the station 102 via the user registration window, the broadcasting/communication sender 206 or EPG sender 133 will register the user (in step S1301). Identification (ID) information such as a password or user ID may be issued to the user at the time of user registration or mailed to the user later, for example.

Next, the user writes the genre of a program in which he is interested, his taste and the like to corresponding places in a preference information input window (not shown) displayed at the display unit 235 of the user terminal 101 (in step S1303).

The preference information thus entered is added by the user profile/operation record editor 254 to the user profile information on the user preregistered in the storage unit 236 and stored into the storage unit 236.

Also, to save the record of program viewing/listening, the user preselects an environment setting window (not shown) from the menu window (not shown) and makes a setting for saving of the record of program viewing/listening. When this setting is made for saving the record of program viewing/listening, the user profile/operation record editor 254 will generate a user operation record file. It should be noted that the user operation record file is initially an empty file including no information. Also, when the user registration is made, saving of the record of program viewing/listening may be automatically set or the environment setting window be automatically displayed on the screen to prompt the user to set the saving of the record of program viewing/listening.

Note that the user registration incorporated in this embodiment is done to the station 102 as above by way of example but the present invention is not limited to this example. The user registration may be done to the broadcasting consignee 121 in the same manner. Also, the log-in service to be done after completion of the user registration can be effected via a single-sign on or the like to the station 102 as an registration destination as well as any other station group, station or the like.

5.3 Grouping of Stations

Next, the stations are grouped into a station group incorporated in this embodiment as will be described with reference to FIG. 14 which is a schematic flow diagram showing operations made in the grouping.

The grouping into the station group incorporated in this embodiment may be a daily grouping (once a day) or a monthly grouping (once a month). Also, the stations are grouped mainly by the batch processing.

Figure 14:
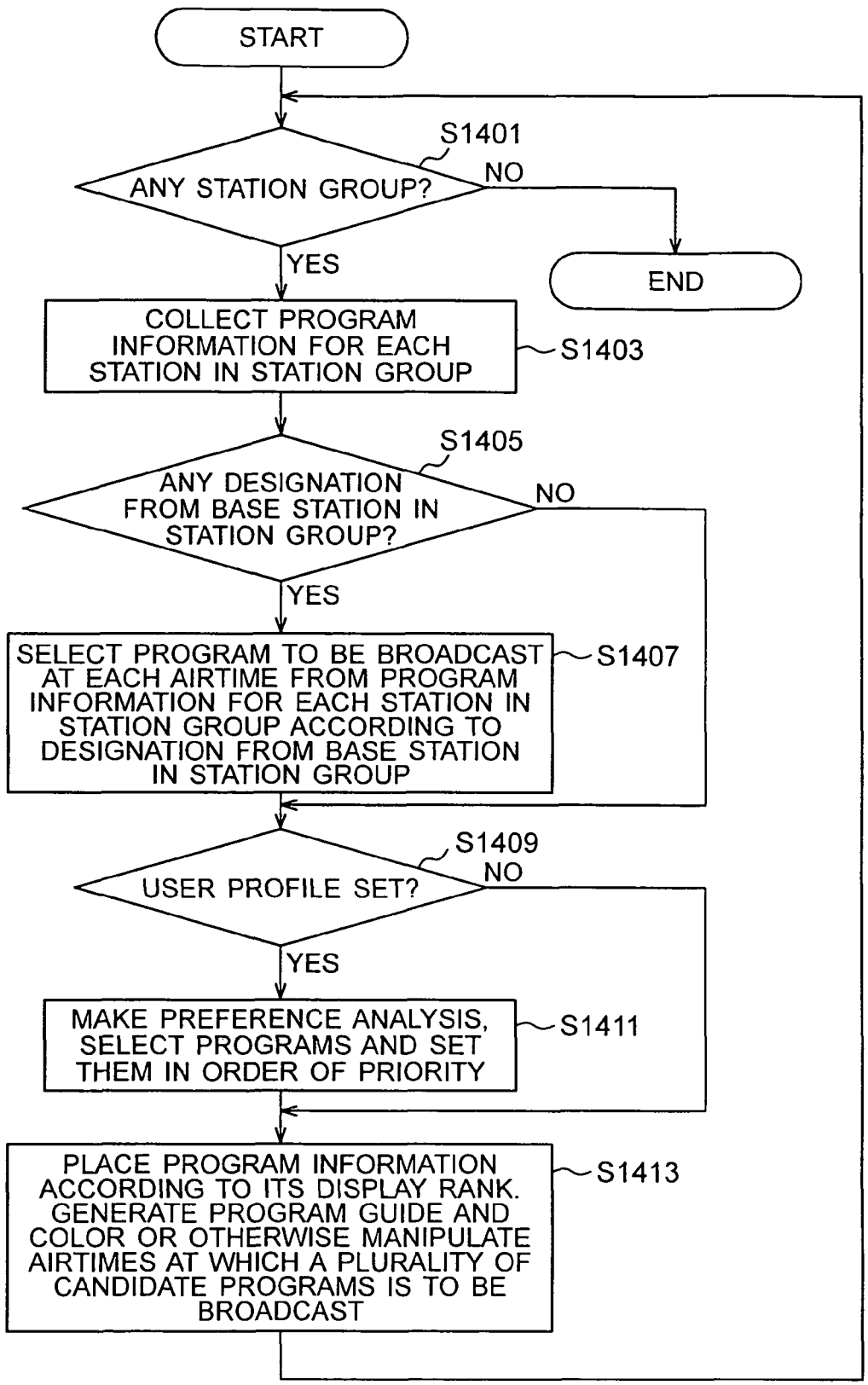
FIG. 14 is a schematic flow diagram showing operations made in grouping group stations incorporated in this embodiment.

As shown in FIG. 14, the grouping begins with checking whether there exist group stations (in step S1401). A group station management table (not shown) that manages a plurality of group stations is read to check whether there exist group stations. This grouping will not be done with a single station 102 or the like, not belonging to any station group.

In case the station group management table includes a record that "Station group A includes XXX, YYY and ZZZ stations", for example, the record for the station group A is read to make sure that the above three stations exist in the station group A.

Note that the operations in the grouping shown in FIG. 14 are collectively by the grouping unit 122 that groups a plurality of group stations, for example. However, the present invention is not limited to this example but the grouping may be done by any other company using the grouping unit 122 to group all group stations or may be done by one of the stations belonging to a group and using the grouping unit 122, for example.

In case there exist group stations, program information from each of the stations included in the station group is collected (in step S1403). It should be noted that the program information may be EPG information, program meta information, content meta information or the like.

Also, to collect program information, reference is made to the aforementioned group station management table, access destination of each of the stations included in the registered station group is acquired, and access is made to the station 102 via the network 103.

In case the station group A including XXX, YYY and ZZZ stations is registered in the group station management table and the access destination of the XXX station is "http://www.xxx.co.jp/epg-data/", for example, the URL destination is accessed to acquire the EPG information ("epg-data"). It should be noted that the access destination indicates a destination where the EPG information is to be stored.

After the EPG information is thus acquired, it is checked whether there exists information designating any a group station (in step S1405). Such a designation may be made with information for a campaign to offer benefits to a user who preferentially views and listens to a designated program to be broadcast for a predetermined period from a designated station in the station group, for example. The information for designating the group station is pre-stored at a storage location, for the group station in consideration, in the group station management table.

Next, in case there exists information designating a group station (in step S1405), reference is made to the designation information stored in the group station management table and then selection is made of program information such as EPG information for the station 102 existent in the station group (in step S1407).

For a program to be broadcast at an airtime of 19:00, reference is made to the designation information in case the designation information for giving priority to the program from the XXX station in the station group A is stored in the group station management table, and EPG information on the program to display the program from the XXX station in the program guide is extracted for the airtime.

The present invention is not limited to this example, but for generating a sheet-form program guide or the like at the user terminal 101, for example, highest display-rank information is added to EPG information so that the program will be displayed more preferentially than a program guide such as a sheet-form program guide after generated.

Note that in case there exists no information designating any group station (in step S1405), no selection is made of program information such as EPG information and the procedure goes to a next step.

Next, in case the user manager 205 provided in the grouping unit 122 stores user profile information on the user utilizing the service (in step S1409), the preference analysis engine 203 analyzes the preference of each user to determine the priority of a program (in step S1411). The display rank whose priority has been thus determined is added to program information such as EPG information as display-rank information, for example.

Note that at the time of user registration, the user profile information is stored in the user manager 205 equipped at the station 102 or broadcasting consignee 121 and synchronously with station grouping, the user profile information is also stored into the user manager 205 equipped in the grouping unit 122.

Also, during the above preference analysis, each item of preference information included in the user profile information will be weighted for analysis, for example. In addition, in case user operation record information has been sent from the user terminal 101, it is also weighted. That is, preference analysis is made based on the preference information and user operation record information.

Next, program information is placed in the program guide correspondingly to the determined display rank of the program guide (in step S1413). In this embodiment, EPG information is placed in a sheet-form program guide or recommendable-program guide correspondingly to the display rank (in step S1413) but the present invention is not limited to this embodiment.

Also, in case airtimes of program information pieces overlap each other on the same when the program information pieces are placed in a program guide, the program information pieces are compared in display rank with each other. One of the program information pieces, given a higher priority, is placed in a cell of the program guide and the cell is changed in color to a gray or the like (in step S1413).

As above, when airtimes of program information pieces overlap each other, the program information piece at the highest display rank is displayed in a cell incorporation in this embodiment by way of example. However, the present invention is not limited to this embodiment. For example, another candidate program information piece may be displayed in each layer in a hierarchy of displayed program information pieces. In this case, a program information piece in the lowest layer is displayed in a cell and other program information pieces in lower layers are displayed in lighter color and in a state infinitely approximate to transparency.

Other program information pieces whose airtimes overlap each other are cached being linked with the program information placed as above. It should be noted that program information pieces whose display rank is not determined are placed in the order of the names of stations from which the program information pieces come, for example. With the above series of operations, a sheet-form program guide is generated for a station group.

The grouping incorporated in this embodiment has been described concerning the generation of a sheet-form guide program. The present invention is not limited to this embodiment but the grouping can be made down to acquisition of program information before the generation of a sheet-form program guide. The sheet-form program guide may also be generated by operating the user terminal 101.

5.4 Program Guide Generation by the User Terminal 101

A program guide is generated by the user terminal 101 incorporated in this embodiment as will be described below with reference to FIG. 15 which is a schematic flow diagram showing operations made in generation of a program guide by the user terminal 101 incorporated in this embodiment.

Figure 15:
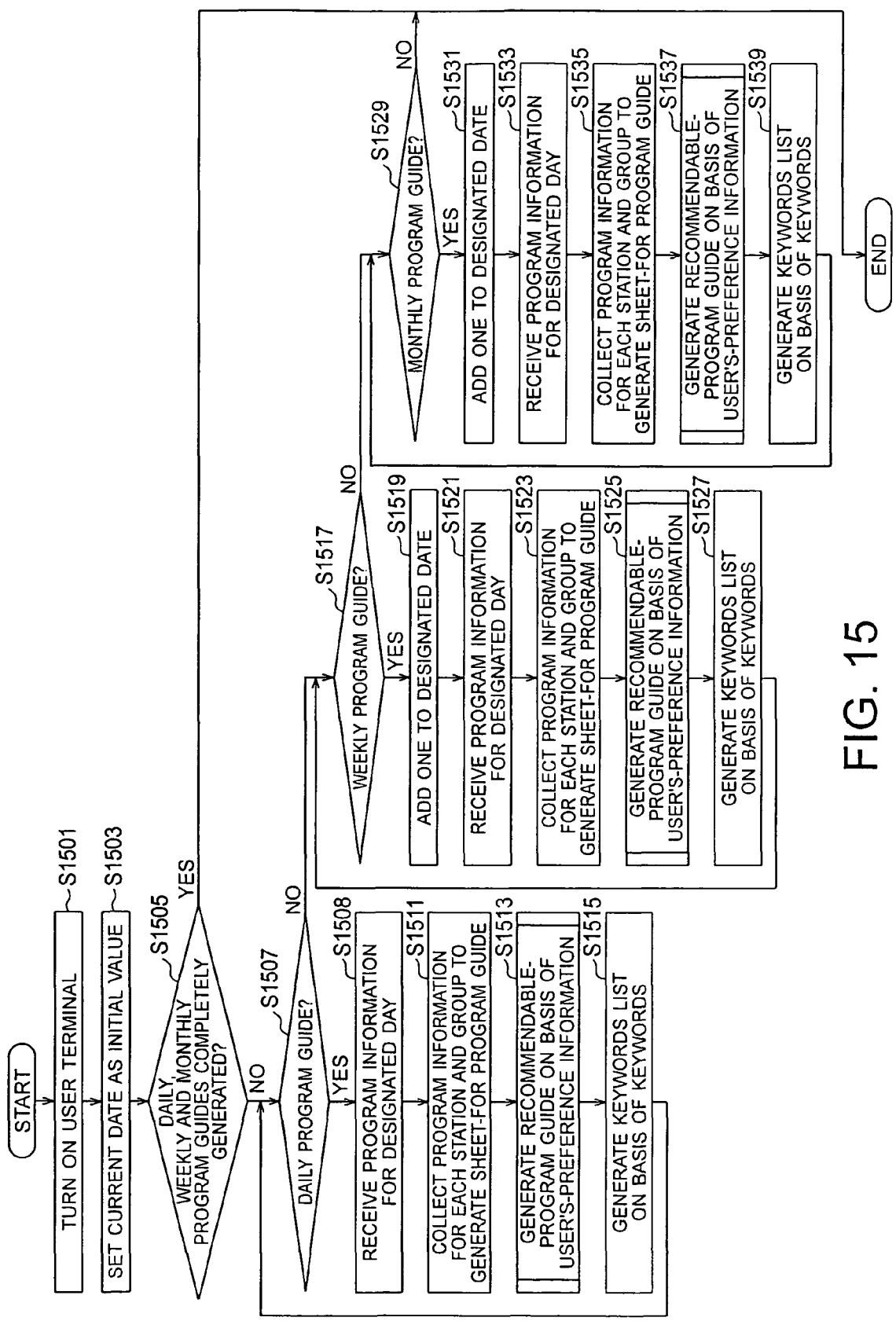
FIG. 15 is a schematic flow diagram showing operations made in creating a program guide at the user terminal incorporated in this embodiment.

As shown in FIG. 15, when the user terminal 101 is turned on (in step S1501), the controller 240 will refer to an inner timer (not shown) and set a current date as an initial value (in step S1503).

Note that after turning on the user terminal 101 (in step S1501), the user will log in the user terminal 101, station 102 or the like. Once a user ID and password have been written to the log-in window, the user terminal 101 or station 102 may be logged in using a user ID and password entered automatically, not manually. Also, a program guide can be generated without logging in the user terminal 101 or station 102.

Next, in case a program guide for the day, weekly program guide and monthly program guide have not completely been generated (in step S1505), generation of the program guide for the day is first started (in step S1507) and the storage unit 236 is accessed to acquire program information for the designated day (in step S1509). The designated day refers to the current day herein. In case there is no program information for the program guide for the day in the storage unit 236, the program information is received by accessing the station 102 via the network 103 (in step S1509). It should be noted that the access is made to the logged-in station 102. However, the present invention is not limited to this example but program information for other stations 102 can also be acquired by registering a list of accesses to the station 102 in an access management table (not shown) or the like. EPG information is received as program information herein.

Also, access for receiving program information incorporated in this embodiment is not limited to the access by the user terminal 101 to the station 102 via the network 103 but the user terminal 101 can also receive such program information by sending the program information on a broadcast wave from the station 102 by the carrousel method or the like.

Next, the sheet-form program guide generator 248 groups the received or stored EPG information when the station is any group station. When the station is not any group station, the sheet-form program guide generator 248 will generate a sheet-form program guide on the basis of the EPG information (in step S1511). It should be noted that in case the station is a group station and the programs to be broadcast on the current day include ones whose airtimes overlap each other, such programs will be changed in presentation in the cell as having previously been described.

Then, the preference analysis engine 256 will analyze the preference of the user on the basis of the user profile information stored in the storage unit 236, determine the priority of each program and select EPG information to be placed in a recommendable-program guide, thereby generating the recommendable-program guide (in step S1513).

Here, generation of a recommendable-program guide incorporated in this embodiment will be described with reference to FIG. 16 which is a schematic flow diagram showing operations made in generating the recommendable-program guide.

Figure 16:
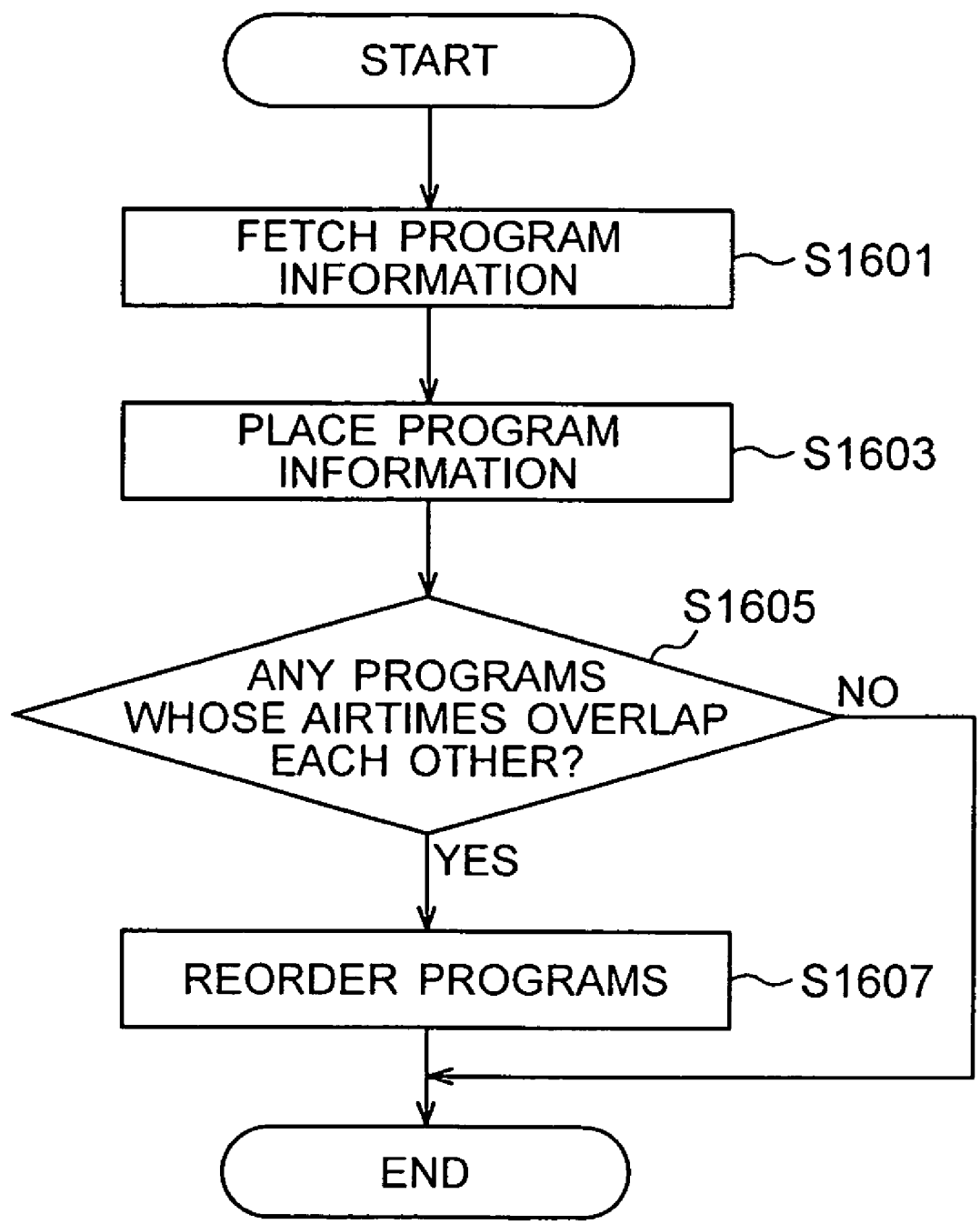
FIG. 16 is a schematic flow diagram showing operations made in creating a recommendable-program guide incorporated in this embodiment.

As shown in FIG. 16, program information for a program to be broadcast on a designated day is acquired from the storage unit 236 (in step S1601). In case a sheet-form program guide has already been generated, program information may be acquired from the sheet-form program guide. It should be noted that the program information is EPG information herein but it may be program meta information or the like.

As in the foregoing, the preference analysis engine 256 analyzes the user's preference on the basis of the user profile information stored in the storage unit 236. Based on the result of analysis from the preference analysis engine 256, the recommendable-program guide generator 250 will select a program in which the user is most likely to be interested.

The recommendable-program guide generator 250 defines data on a recommendable-program guide so that EPG information on the selected program will be displayed in a cell in the recommendable-program guide, corresponding to the current day and airtime (in step S1603).

In case the EPG information pieces for all the selected programs are placed in appropriate cell of the recommendable-program guide (in step S1603), the recommendable-program guide generator 250 will check if airtimes of EPG information pieces placed in the cell overlap each other. In case there exist programs whose airtimes overlap each other (in step S1605), EPG information to actually be displayed in the recommendable-program guide is determined. The EPG information to be displayed is determined based on the display rank information on the program, for example.

Once the EPG information to be displayed in the recommendable-program guide is determined, data on the recommendable-program guide is redefined so that EPG information whose display rank is highest will be displayed in a corresponding cell of the recommendable-program guide, and the EPG information will be reordered (in step S1607).

For example, in case a plurality of EPG information pieces is defined in the same cell and only the EPG information thus defined is displayed in the top cell because of the data structure of the recommendable-program guide information, the EPG information will be reordered for the EPG information at the highest display rank to be displayed in the top cell.

Also, in case a plurality of program information exist in the same cell because airtimes of the programs overlap each other as above, changing the cell color to gray or the like will permit the user to find the programs quickly and efficiently. Here, a series of operations for generating a recommendable-program guide is complete.

After the generation of a recommendable-program guide is over (in step S1513) as shown in FIG. 15, the operation goes to generation of a keywords list on the basis of keywords (in step S1515). It should be noted that the user pre-selects more than one or two appropriate keywords at the time of user registration or selects such keywords after completion of the user registration, which will be described in detail later, and the keywords thus selected are stored in the storage unit 236. Here, the generation of a program guide for the current day is complete.

When the generation of the program guide for the day is complete, one is added to the initially set current day and program information for a designated date resulted from the addition of the initially set current day and one day is acquired from the storage unit 236. In case the program information is already stored in the storage unit 236, it is used.

In case the program information for the designated date is not stored in the storage unit 236, access is made to the station 102 holding program information via the network 103 to receive program information for the designated date (in step S1521).

Next, the sheet-form program guide generator 248 groups the received or stored EPG information in case the station is any a group station. When the station is not any group station, the sheet-form program guide generator 248 will generate a sheet-form program guide on the basis of the EPG information (in step S1523). It should be noted that in case the station is a group station and the programs to be broadcast on the current day include ones whose airtimes overlap each other, such programs will be changed in presentation in the cell as having previously been described.

Then, the preference analysis engine 256 will analyze the preference of the user on the basis of the user profile information stored in the storage unit 236, determine the priority of each program and select EPG information to be placed in a recommendable-program guide, thereby generating the recommendable-program guide (in step S1525). It should be noted that generation of a recommendable-program guide incorporated in this embodiment as shown in FIG. 16 is generally the same as described above and so it will not be described in detail.

After the generation of a recommendable-program guide is over (in step S1525), the operation goes to generation of a keywords list on the basis of keywords (in step S1527) and generation of a program guide for one day of a week.

Thereafter, steps S1519 to S1527 will be repeated until a program guide for one week is completely generated (in step S1517). In case the user terminal 101 has received corresponding program information and generated a program guide in advance, generation of the weekly program guide may be ended when a program guide for the current day is completely generated, for example.

Next, to generate a monthly program guide (in step S1529), one is added to the initially set current day upon completion of the generation of a weekly program guide (in step S1531), and program information for a designated date resulted from the addition of the initially set current date and one day is acquired from the storage unit 236. In case the program information is already stored in the storage unit 236, it is used.

In case the program information for the designated date is not stored in the storage unit 236, access is made to the station 102 holding program information via the network 103 to receive program information for the designated date (in step S1533).

Next, the sheet-form program guide generator 248 groups the received or stored EPG information in case the station is any a group station. When the station is not any group station, the sheet-form program guide generator 248 will generate a sheet-form program guide on the basis of the EPG information (in step S1535). It should be noted that in case the station is a group station and the programs to be broadcast on the current day include ones whose airtimes overlap each other, such programs will be changed in presentation in the cell as having previously been described.

Then, the preference analysis engine 256 will analyze the preference of the user on the basis of the user profile information stored in the storage unit 236, determine the priority of each program and select EPG information to be placed in a recommendable-program guide, thereby generating the recommendable-program guide (in step S1537). It should be noted that generation of a recommendable-program guide incorporated in this embodiment as shown in FIG. 16 is generally the same as described above and so it will not be described in detail.

After the generation of a recommendable-program guide is over (in step S1537), the operation goes to generation of a keywords list on the basis of keywords (in step S1539) and generation of a program guide for one day of a week.

Thereafter, steps S1531 to S1539 will be repeated until a program guide for one week is completely generated (in step S1529). In case the user terminal 101 has received corresponding program information and generated a program guide in advance, generation of the weekly program guide and monthly program guide may be ended when a program guide for the current day is completely generated, for example. Here, a series of operations for generation of program guides by the user terminal 101 is over.

In the above, an example in which a sheet-form program guide is generated at the user terminal 101 has been described. However, note that the present invention is not limited to this example but a sheet-form program guide already generated at the station 102 may be send to the user terminal 101 on a broadcast wave or via the network 103, for example.

6. Program Guide Manipulation and Edition

Next, manipulation and edition of a program guide by the user terminal 101 incorporated in this embodiment will be described with reference to FIG. 17 which is a schematic flow diagram showing operations made in the program guide manipulation and edition by the user terminal 101.

When the user terminal 101 is ready for reception of program information after completion of the user registration, the user can make reference to, and manipulate and edit, any of a sheet-form program guide, recommendable-program, keywords list and My-program guide by operating the user terminal 101.

Figure 17:
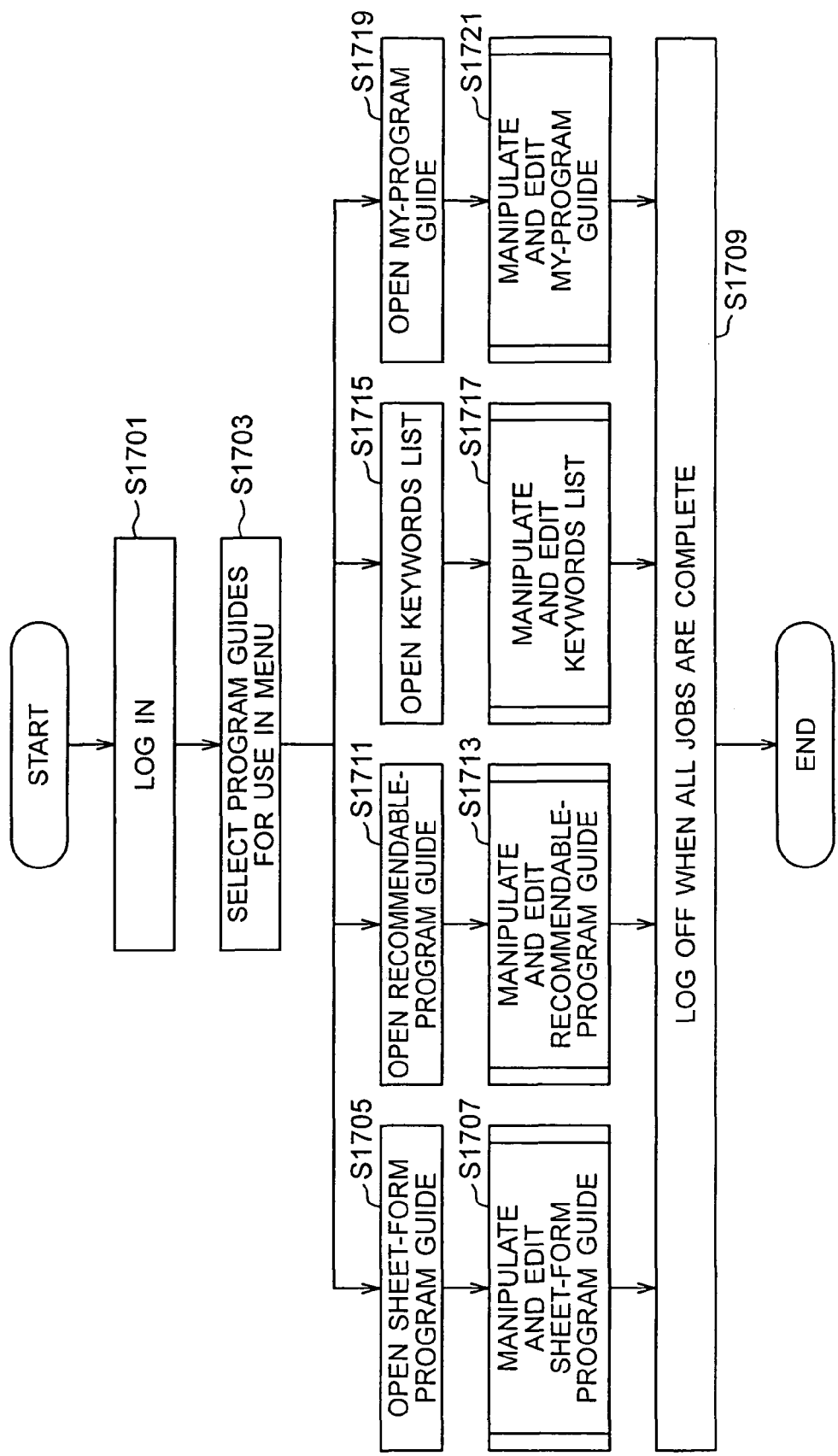
FIG. 17 is a schematic flow diagram showing operations made in manipulating and editing a program guide at the user terminal incorporated in this embodiment.

To use the information providing service 100 incorporated in this embodiment, the user will first log in the user terminal 101 as shown in FIG. 17 (in step S1701). It should be noted that in case the user terminal 101 has already been logged in by turning on as having been described in the above, this log-in operation is omitted.

Then, a program guide select menu (not shown) will be displayed on the display screen of the display unit 235 of the user terminal 101. The program guide select menu will show thereon, for example, title of a sheet-form program guide, recommendable-program guide, keywords list or My-program guide and a selectable check box, radio box, etc.

The user will select the check box from an object program guide to be referred to or manipulated and edited, displayed in the program guide select menu, and press a button such as "Set" or the like at the input unit 237 or the like (in step S1703).

In case a sheet-form program guide is selected in the program guide select menu (in step S1703), the program information reproduction unit 246 provided at the user terminal 101 will acquire an already generated sheet-form program guide from the storage unit 236 and display it on the display screen of the display unit 235 (in step S1705).

The sheet-form program guide thus displayed at the display unit 235 (in step S1705) can be manipulated and edited (in step S1707). The manipulation and edition of the sheet-form program guide will be described in detail below.

6.1 Manipulation and Edition of Sheet-Form Program Guide

Figure 18:
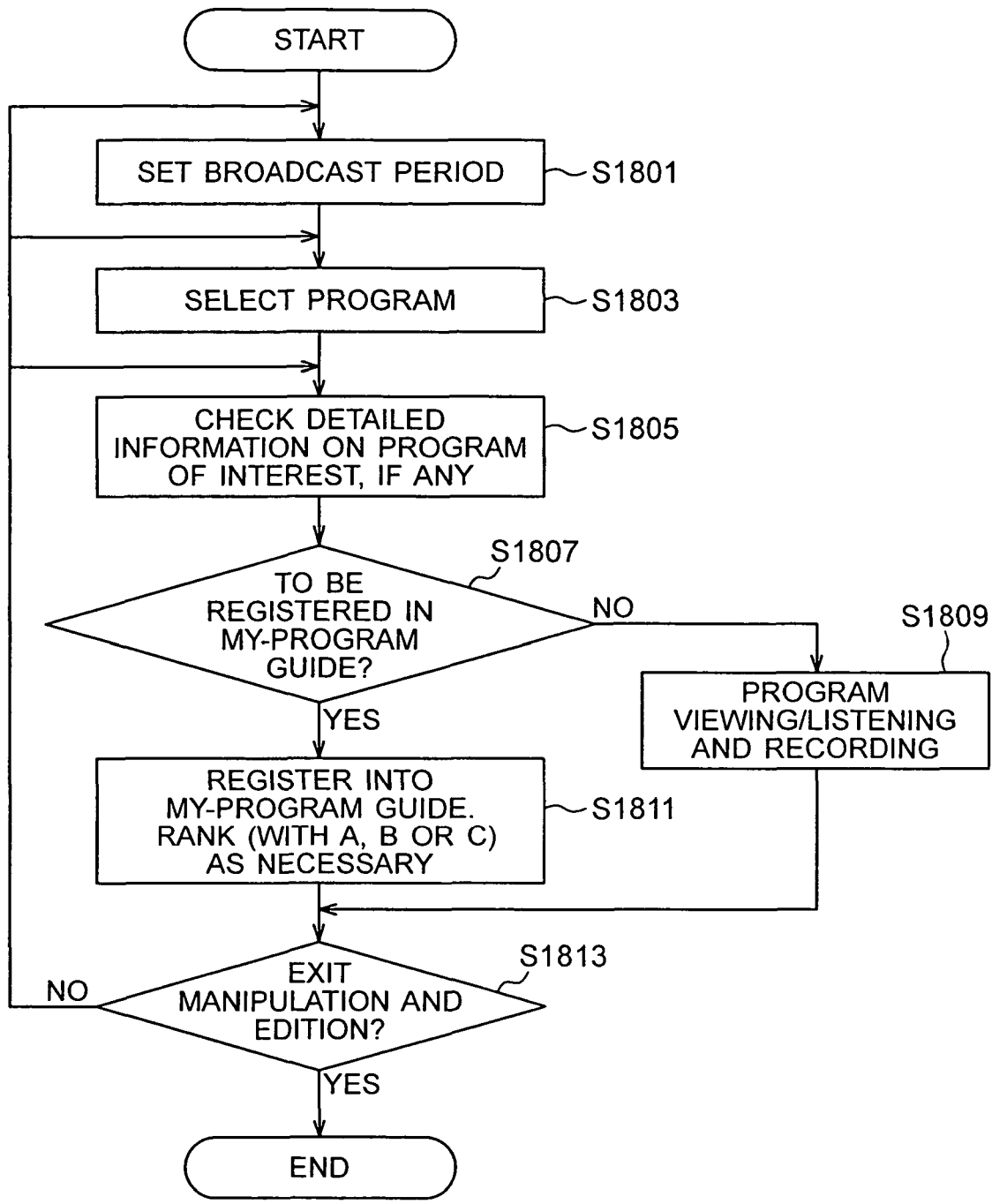
FIG. 18 is a schematic flow diagram showing operations made in manipulating and editing a sheet-form program guide incorporated in this embodiment.

The sheet-form program guide manipulation and edition incorporated in this embodiment will be described with reference to FIG. 18 which is a schematic flow diagram showing operations made in manipulating and editing the sheet-form program guide.

The sheet-form program guide will be displayed on the display screen of the display unit 237, and also a request table 290 for requesting to display a program guide to be broadcast on a designated date on the display screen will be displayed on the display screen. It should be noted that the request table 290 has already been described with reference to FIG. 3.

When the user operates the input unit 237 or the like to select "Sep. 30, 2003", for example, among dates displayed in the request table 290 (in step S1801) as a broadcasting period, the sheet-form program guide generator 248 will generate a sheet-form program guide for one week from the date "Sep. 30, 2003" thus designated, and the program information reproduction unit 246 will display on the display screen of the display unit 235.

Note that the present invention is not limited to the above example but a sheet-form program guide for two weeks or one month may be generated and displayed on the display screen. Also, in the default state in which no date is designated in the request table 290, a sheet-form program guide for one week including the current date will be displayed.

Then, the user can select a program in which he is interested from the program information displayed in a cell of the sheet-form program guide being displayed (in step S1803). For this purpose, EPG information related to the selected program has to be displayed in the cell of the sheet-form program guide.

Especially in case the sheet-form program guide is one for a group station, however, there exist programs for a plurality of stations belonging to the group, whose airtimes overlap each other. To select any other program than one displayed in the cell, a separate program selection to select the other program is required (in step S1803). Program selection having to be done in case a plurality of programs whose airtimes overlap each other will be described herebelow.

6.1.1 Program Selection

First, a sheet-form program guide incorporated in this embodiment and intended for a plurality of programs whose airtimes overlap each other will be described with reference to FIG. 19 which schematically illustrates the sheet-form program guide.

Figure 19:
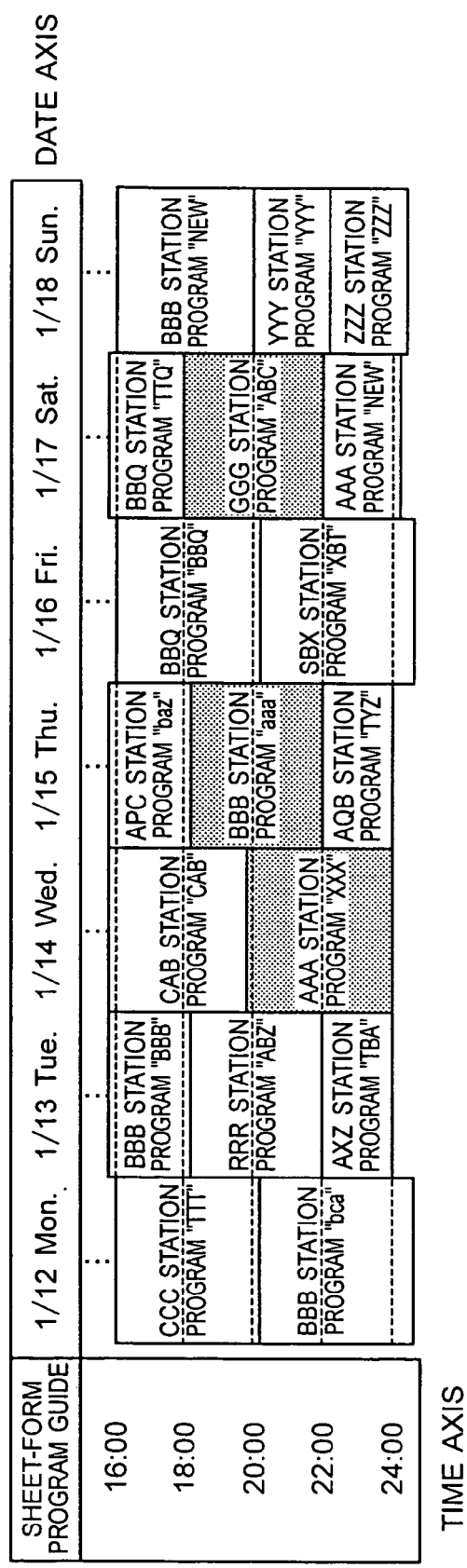
FIG. 19 schematically illustrates a sheet-form program guide for a plurality of programs whose airtimes of day overlap each other in the present invention.

As shown in FIG. 19, in a plurality of cells in a sheet-form program guide including a vertical along which times are indicated and a horizontal axis along which dates are indicated, there are displayed EPG information such as "CCC station, program "TTT"" at every airdate and airtime. A cell in which a plurality of programs whose airtimes overlap each other is displayed in gray or the like, for example. In the sheet-form program guide shown in FIG. 19, such cells are those in which there are displayed "AAA station, program "XXX"", "BBB station, program "aaa"" and "GGG station, program "ABC"".

As shown in FIG. 19, the sheet-form program guide includes airdates and airtimes and has one piece of program information in each cell. Therefore, since one piece of program information is displayed in a cell even if there exists a plurality of programs which are to be broadcast from a plurality of stations 102 and whose airtimes overlap each other, the amount of information in the entire sheet-form program guide can be made smaller than that in a program guide in which a plurality of programs whose airtimes overlap each other is all displayed in a cell. Thus, the sheet-form program guide incorporated in the present invention is less complicated and easier to view.

In the foregoing, there has been described an example in which a cell including a plurality of programs is displayed in gray or the like. However, the present invention is not limited to this example but the cell may be formed such that characters in it are italic or bold ones, an icon indicating that there exists a plurality of programs in the cell or a tab is displayed to indicate that there exists a plurality of programs whose airtimes overlap each other.

In case it is desired to replace, with another program, any of programs in cells displaying "AAA station, program "XXX"", "BBB station, program "aaa"" and "GGG station, program "ABC"", respectively, a cell including the program can be selected at the input unit 237, control terminal 118 or the like to display EPG information on the program in the cell as well as EPG information on the other program.

A plurality of program information pieces whose airtimes overlap each other is displayed as will be described below with reference to FIG. 20 which schematically illustrates how the plurality of program pieces is displayed according to the present invention.

Figure 20:
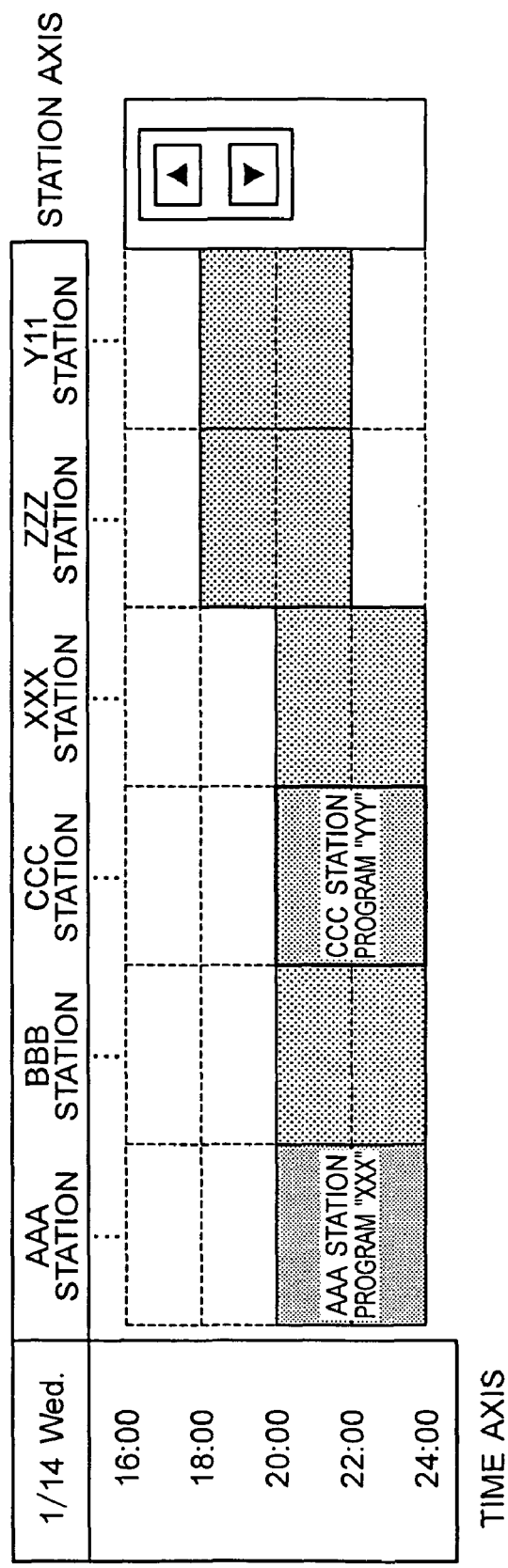
FIG. 20 schematically illustrates a displayed program guide containing information on a plurality of programs whose airtimes of day overlap each other in the present invention.

As shown in FIG. 20, when a cell including a plurality of program information pieces whose airtimes overlap each other is selected, the plurality of program information pieces will be displayed in a line for each station 102. It should be noted that different from the sheet-form program guide, stations are indicated along a horizontal axis while airtimes are indicated along a vertical axis.

Since program information such as EPG information or the like is displayed in a cell for each station 102, programs to be broadcast at the same airtime can be searched quickly and efficiently. Also, by pressing a button with a small black triangle or an inverted small black triangle, pieces of program information from other stations 102, which cannot be displayed in one screen, can be searched by scrolling.

Since a program from other station 102 can be selected from the list of the plurality of program information pieces being displayed, the frame of an appropriate cell (cell "CCC station, program "YYY"") selected at the input unit 237 or the like can be changed to a thicker one as shown in FIG. 20. The thicker frame indicates an active state in which a cell is selected. It should be noted that the active state is not always indicated by such a thick frame.

When an appropriate cell "CCC station, program "YYY"", for example, is selected as shown in FIG. 20, a sheet-form program guide will automatically be displayed and the content of the cell will be replaced with the program information previously selected as above. However, the present invention is not limited to this example but a sheet-form program guide can be displayed by pressing "Set" button.

Figure 21:
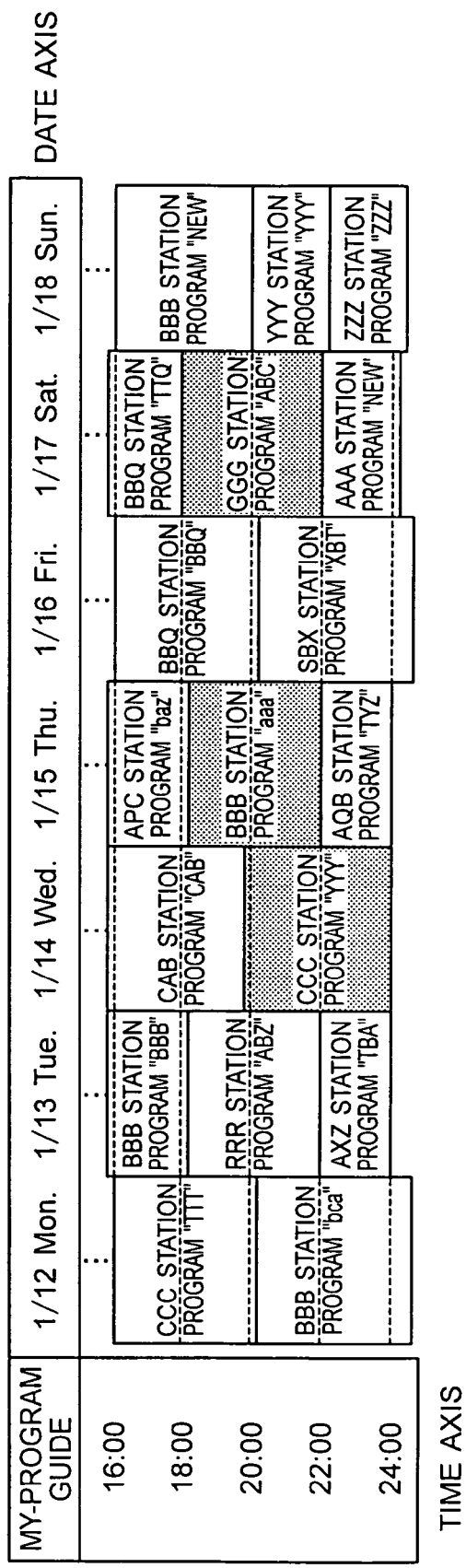
FIG. 21 schematically illustrates a displayed program guide containing information on a plurality of programs whose airtimes of day overlap each other in the present invention.

When the list of program information pieces whose airtimes overlap each other shown in FIG. 20 is replaced with the sheet-form program guide, the content of cell has been replaced with another selected program information. That is, "AAA station, program "XXX"" can be changed to "CCC station, program "YYY"" as shown in FIG. 21.

As will be known from the above description, even in case a single program information is displayed in a cell, program information pieces to be broadcast at the same airtime can efficiently be changed to another program information without having to change the information amount of the sheet-form program guide.

6.1.2 List Display of Program Information Pieces whose Airtimes Overlap each Other In the above, the list display of a screen showing program information pieces whose airtimes overlap each other, having been explained with reference to FIG. 20, has been described. Further, variants of the list display of program information pieces whose airtimes overlap each will be explained herebelow with reference to FIGS. 22 to 25, respectively, which schematically illustrate the variants of the list display of program information pieces whose airtimes overlap each other, shown in FIG. 20.

Figure 22:
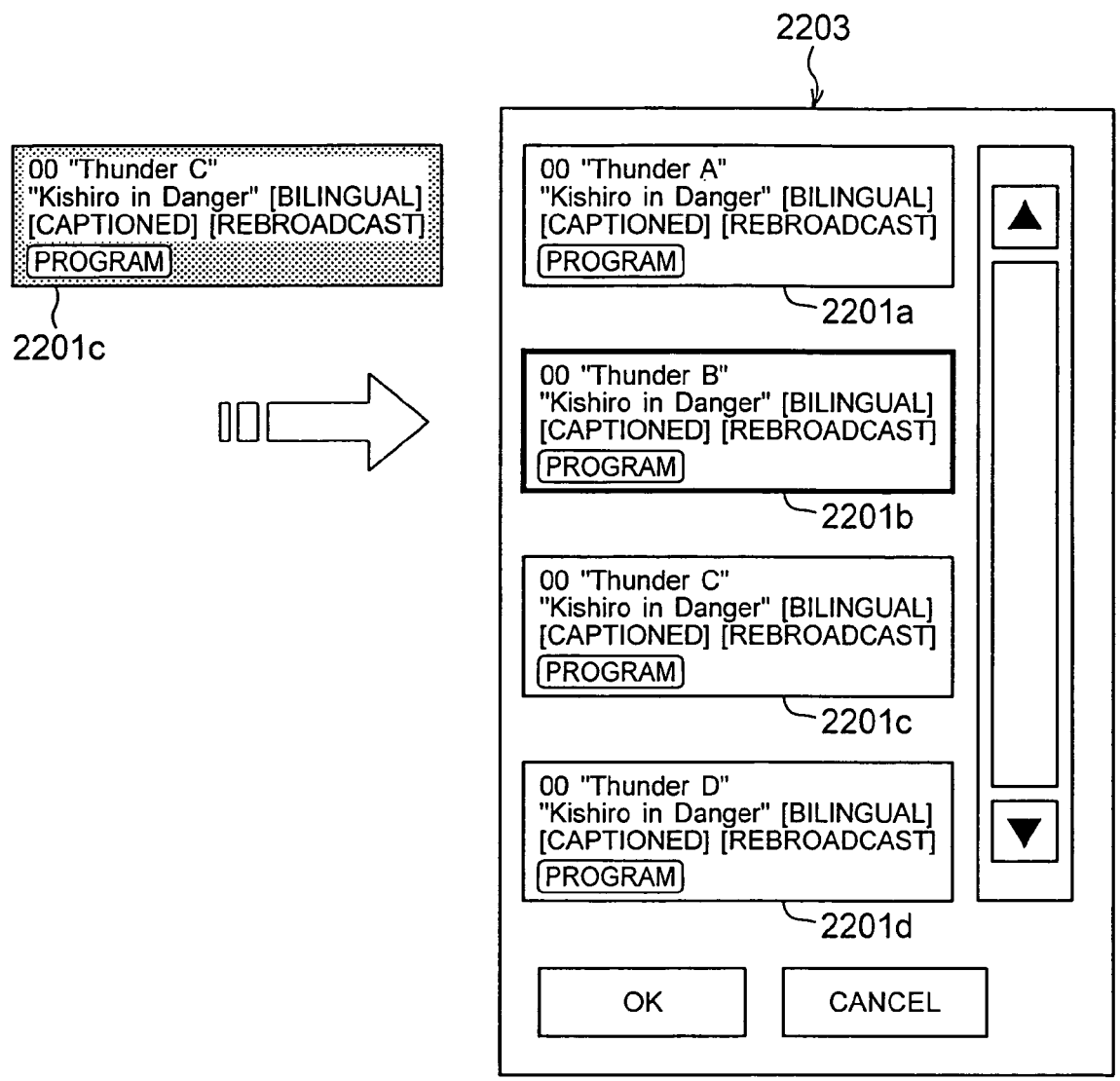
FIG. 22 explains a variant of a guide display window for information on the programs whose airtimes of day overlap each other, shown in FIG. 20.

Referring now to FIG. 22, a variant of the list display of program information pieces whose airtimes overlap each other will be described. FIG. 22 shows a cell 2201c of a sheet-form program guide in which there exists a plurality of EGP information pieces whose airtimes overlap each other. It should be noted that other cells of the sheet-form program guide are formed generally identical to the cell shown in FIG. 20 and hence they will not be described.

When the cell 2201c is selected at the input unit 237 or the like, a list-display window 2203 displaying program information pieces whose airtimes overlap each other is popped up and displayed separately from the sheet-form program guide as shown in FIG. 22.

Note that the program information displayed in the cell 2201 is EPG information. In the cell 2201, there are displayed a program whose title is "Thunder C" and attributes "bilingual", "captioned", "rebroadcast", etc. as well.

Also, in the cell 2201, there is displayed a "Program" button. When the "Program" button is pressed, programmed-recording information is generated by the controller 240 or the like, and sent to an external VTR 117a or PVR 117b via the peripheral-device controller 258 so that a preselected program can be recorded at a designated time. Further, an electronic mail including the programmed-recording information is sent from the user terminal 101 to the transaction server 127 via the network 103, and stored in a mail server 125 until the user is to be advised of the recording.

When the user selects an appropriate one of the cells 2201 (2201a, 2201b, 2201c and 2201d) of a list-display window 2203 displayed on the display screen and presses an "OK" button, program information in the cell 2201c yet to be selected is changed to program information in a selected cell 2201b. It should be noted that when a cell is selected, the frame cell is displayed to be thicker as shown in FIG. 22. However, the present invention is not limited to this example. Also, when program information cannot be displayed in one window, scrolling can be made through other program information pieces by pressing the small black triangle or the like.

Figure 23:
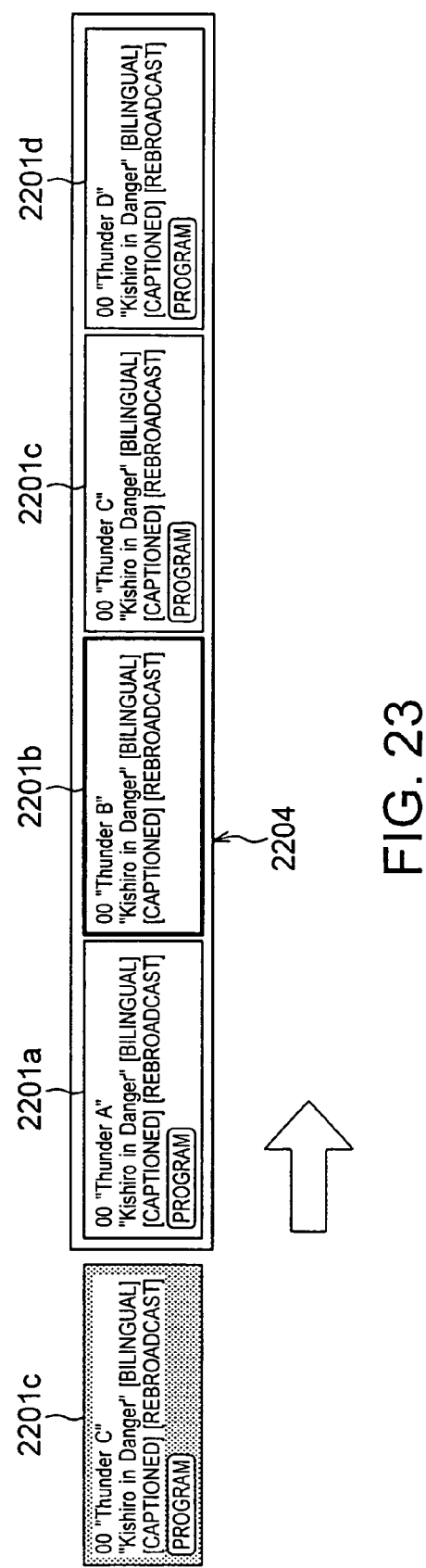
FIG. 23 explains another variant of a guide display window for information on the programs whose airtimes of day overlap each other, shown in FIG. 20.

Referring now to FIG. 23, another variant of the list display of program information pieces whose airtimes overlap each other will be described. FIG. 23 shows a cell 2201c of a sheet-form program guide in which there exists a plurality of EPG information pieces whose airtimes overlap each other. It should be noted that other cells of the sheet-form program guide are formed generally identical to the cell shown in FIG. 20 and hence they will not be described.

When the cell 2201c is selected at the input unit 237 or the like, a list-display window 2204 which displays program information pieces whose airtimes overlap each other is displayed in a linear horizontal direction to be adjacent to the right of a selected cell 2201c of the sheet-form program guide as shown in FIG. 23.

Note that the list-display window 2204 displaying information pieces whose airtimes overlap each other and which is displayed in a linear horizontal direction to be adjacent to the right of a selected cell 2201 according to this embodiment has been explained by way of example above. However, the present invention is not limited to this example but the list-display window 2204 may be displayed in any direction, vertically or obliquely, or curvilinearly, not linearly, to be adjacent to the left or adjacent to the top or bottom of the selected cell 2201.

When the user selects an appropriate one of the cells 2201 (2201a, 2201b, 2201c and 2201d) of a list-display window 2204 displayed on the display screen and presses an "OK" button, program information in the cell 2201c yet to be selected is changed to program information in a selected cell 2201b, for example. It should be noted that when a cell is selected, the frame cell is displayed to be thicker as shown in FIG. 23. However, the present invention is not limited to this example.

Figure 24:
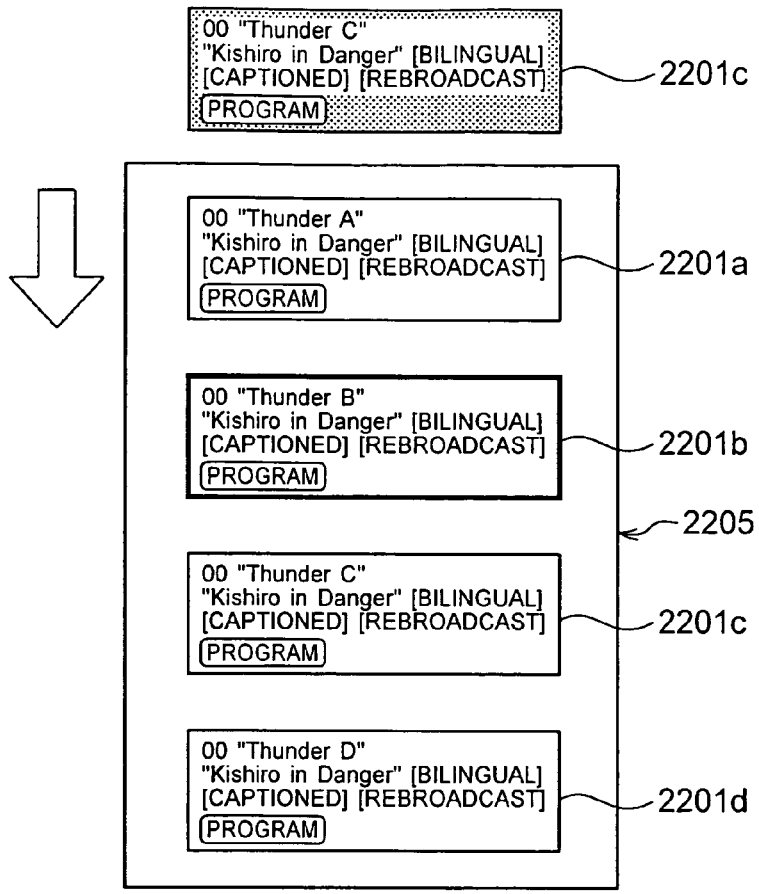
FIG. 24 explains a still another variant of a guide display window for information on the programs whose airtimes of day overlap each other, shown in FIG. 20.

Referring now to FIG. 24, a still another variant of the list display of program information pieces whose airtimes overlap each other will be described. FIG. 24 shows a cell 2201c of a sheet-form program guide in which there exists a plurality of EPG information pieces whose airtimes overlap each other. It should be noted that other cells of the sheet-form program guide are formed generally identical to the cell shown in FIG. 20 and hence they will not be described.

When the cell 2201c is selected at the input unit 237 or the like, a list-display window 2205 which displays program information pieces whose airtimes overlap each other is displayed in a linear vertical direction to be adjacent to the bottom of a selected cell 2201c of the sheet-form program guide as shown in FIG. 24.

Note that the list-display window 2205 displaying information pieces whose airtimes overlap each other and which is displayed in a linear vertical direction to be adjacent to the right of a selected cell 2201 according to this embodiment has been explained by way of example above. However, the present invention is not limited to this example but the list-display window 2205 may be displayed horizontally or obliquely to be adjacent to the left, or adjacent to the top or bottom, of the selected cell 2201.

When the user selects an appropriate one of the cells 2201 (2201a, 2201b, 2201c and 2201d) of a list-display window 2205 displayed on the display screen and presses an "OK" button, program information in the cell 2201c yet to be selected is changed to program information in a selected cell 2201b, for example. It should be noted that when a cell 2201 is selected, the frame cell is displayed to be thicker as shown in FIG. 22. However, the present invention is not limited to this example.

Finally, a yet another variant of the list-display window displaying program information pieces whose airtimes overlap each other will be described below with reference to FIG. 25. First, there is displayed a cell of a sheet-form program guide in which there exists a plurality of EPG information pieces whose airtimes overlap each other. This cell is displayed in gray, for example.

Figure 25:
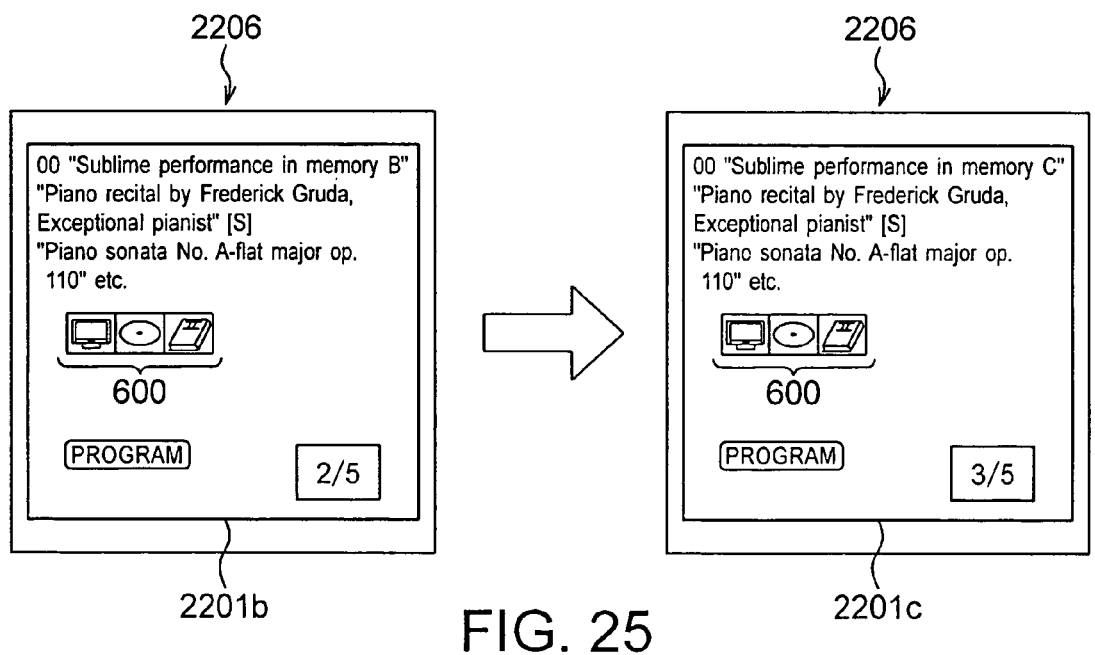
FIG. 25 explains a yet another variant of a guide display window for information on the programs whose airtimes of day overlap each other, shown in FIG. 20.

Next, when an appropriate cell is selected at the input unit 237 or the like, a list-display window 2206 displaying program information pieces whose airtimes overlap each other is displayed in a window frame separate from the sheet-form program guide as shown in FIG. 25. It should be noted that the list-display window may be displayed adjacent to a selected cell 2201c of the sheet-form program guide.

When the user clocks the display area of the cell 2201b in the list-display window 2206 displayed on the display screen or press a cursor button at the control terminal 117 or the like, a cell 2201c shown in FIG. 25 will be selected instead.

When the user selects a "Set" button at the input unit 237, control terminal 117 or the like when a cell 2201 displaying appropriate program information is being displayed, the content of the cell in the sheet-form program guide will be changed from the program information in the cell 2201c before selected to that in the selected cell 2201b.

Note that in the cell 2201 shown in FIG. 25, there are displayed, in addition to the program information indicating the title of a program, detailed information on the program and an icon 600 representing the contents such as music, book or the like. The icon 600 is generated at the station 102 or user terminal 101 on the basis of content meta information used especially in the ECG service. Also, the present invention is not limited to this icon 600 but the latter may be displayed in a cell of a program guide such as a sheet-form program guide.

Here, explanation will be made with reference to FIG. 18 again. By changing the program information displayed in ca cell of the sheet-form program guide to another program information and discriminating it, the user can limit the program information displayed in the cell of the sheet-form program guide to information on a program in which he is interested (in step S1803).

Then, when such a program of interest exists, the user will click the corresponding cell of the sheet-form program guide. A detailed information window for the selected program will appear and the user can check the detailed information (in step S1805). It should be noted that the detailed information may be checked as necessary in parallel with the selection of the program information (as in step S1803).

Next, when the program information displayed in the cell of the sheet-form program guide is completely selected and displayed program is checked, the display in the sheet-form program guide can be registered as a My-program guide. Therefore, when a "Register" button is selected when a My-program guide is used (in step S1807), the sheet-form program guide from which the program information has been made is stored as a My-program guide into the storage unit 236. It should be noted that the remaining program information pieces whose airtimes overlap each other will not be so saved but they may be saved along with the My-program guide as necessary.

Also, when the display of the sheet-form program guide is registered as a My-program guide, program information displayed in the cell of the sheet-form program guide can be ranked (as A, B and C). For example, programs the user is to view can be ranked in priority. A program having the rank A is given the highest priority.

Note that when registering a My-program guide, programming or advising of the recording of each program is possible in addition to the above-mentioned program ranking. It should also be noted that by registering the advice of recording for each a program in advance, the advice can be sent by electronic mail from the main server 125 to each of the user terminals 101.

Also, when no My-program guide is used (in step S1807), it is possible to program recording of a program by pressing the "Program" button displayed in the cell of the sheet-form program guide (in step S1809). Further, it can be programmed that the above-mentioned advice of a program recording (recording advice) will be given a predetermined time before the program is started being broadcast. The information that the advice of recording has been set is accumulated in a user operation record file or the like of the storage unit 236 and saved in a server in the broadcasting/communication sender 306 provided in the station 102.

Next, when continuously manipulating and editing a sheet-form program guide still being displayed on the display screen (in step S1813), an appropriate one is selected from among setting of a broadcasting period, selection of program information (in step S1803) and checking of detailed information (in step S1805) in the request table 290.

With the above series of operations, the user can manipulate and edit a sheet-form program guide while the sheet-form program guide incorporated in this embodiment is being displayed on the display screen, and also register the sheet-form program guide thus manipulated and edited in a My-program guide.

An example in which a sheet-form program guide incorporated in this embodiment is registered in a My-program guide has been described in the above. However, the present invention is not limited to this example but each program information displayed in a cell of the sheet-form program guide can be registered in a My-program guide.

Also note that by displaying the tab 280b in a sheet-form program guide in manipulating and editing a sheet-form program guide incorporated in this embodiment, a program can be selected and registered into a My-program guide while switching to a sheet-form program guide for any other station.

Also, the sheet-form program guide manipulation and edition incorporated in this embodiment may be applied to any other than the sheet-form program guide. For example, a recommendable-program guide, keywords list, My-program guide can be manipulated and edited as above.

Next, explanation will be made with reference to FIG. 17 again. When a recommendable-program guide is selected (in step S1703) while a program guide select menu (not shown) is being displayed on the display screen, the program information reproduction unit 246 provided in the user terminal 101 acquires an existing recommendable-program guide from the storage unit 236 and displays it on the display screen of the display unit 235 (in step S1711).

The recommendable-program guide displayed at the display unit 235 (in step S1711) can be manipulated and edited (in step S1713). The manipulation and edition of the recommendable-program guide will be described in detail below, but aspects of the manipulation and edition of the recommendable-program guide, common to those of the manipulation and edition of the sheet-form program guide will not be described in detail.

6.2 Manipulation and Edition of Recommendable-Program Guide

First, the recommendable-program guide manipulation and edition incorporated in this embodiment will be described with reference to FIG. 26 which is a schematic flow diagram showing operations made in manipulating and editing a recommendable-program guide incorporated in this embodiment.

When a recommendable-program guide is displayed on the display screen of the display unit 237, a request table is displayed for request a program guide for a designated date. It should be noted that the request table 290 has previously been described with reference to FIG. 3.

When the user operates the input unit 237 to select "Sep. 30, 2003", for example, among dates displayed in the request table 290 as a broadcasting period (in step S2601), the program information reproduction unit 246 displays a recommendable-program guide for a week from Sep. 30, 2003, generated by the recommendable-program guide generator 250, on the display screen of the display unit 235.

The user can check the program information on a program recommended by the station 102 on the basis of the recommendable-program guide thus displayed (in step S2603). Especially, a recommendable-program guide for a station group include programs to be broadcast from a plurality of stations at the same airtime. In case the user wants to check any other programs than those displayed in the cell, he has to make a program inspection (in step S2603) for switching the program to one including the other programs. There will be explained a program inspection to be done when there exits a plurality of programs whose airtimes overlap each other.

6.2.1 Program Inspection

First, a recommendable-program guide including a plurality of programs whose airtimes overlap each other, incorporated in this embodiment, will be explained. Since such a recommendable-program guide is formed generally identical to the sheet-form program guide having already been described with FIG. 19 and the like, it will not be described in detail.

Note that the recommendable-program guide includes airdates and airtimes. When a program is selected for each user through the preference analysis, one of program information pieces included in a cell is displayed on the display screen. Therefore, all the program information pieces in the cell are ones the user is most likely to be interested in.

Figure 26:
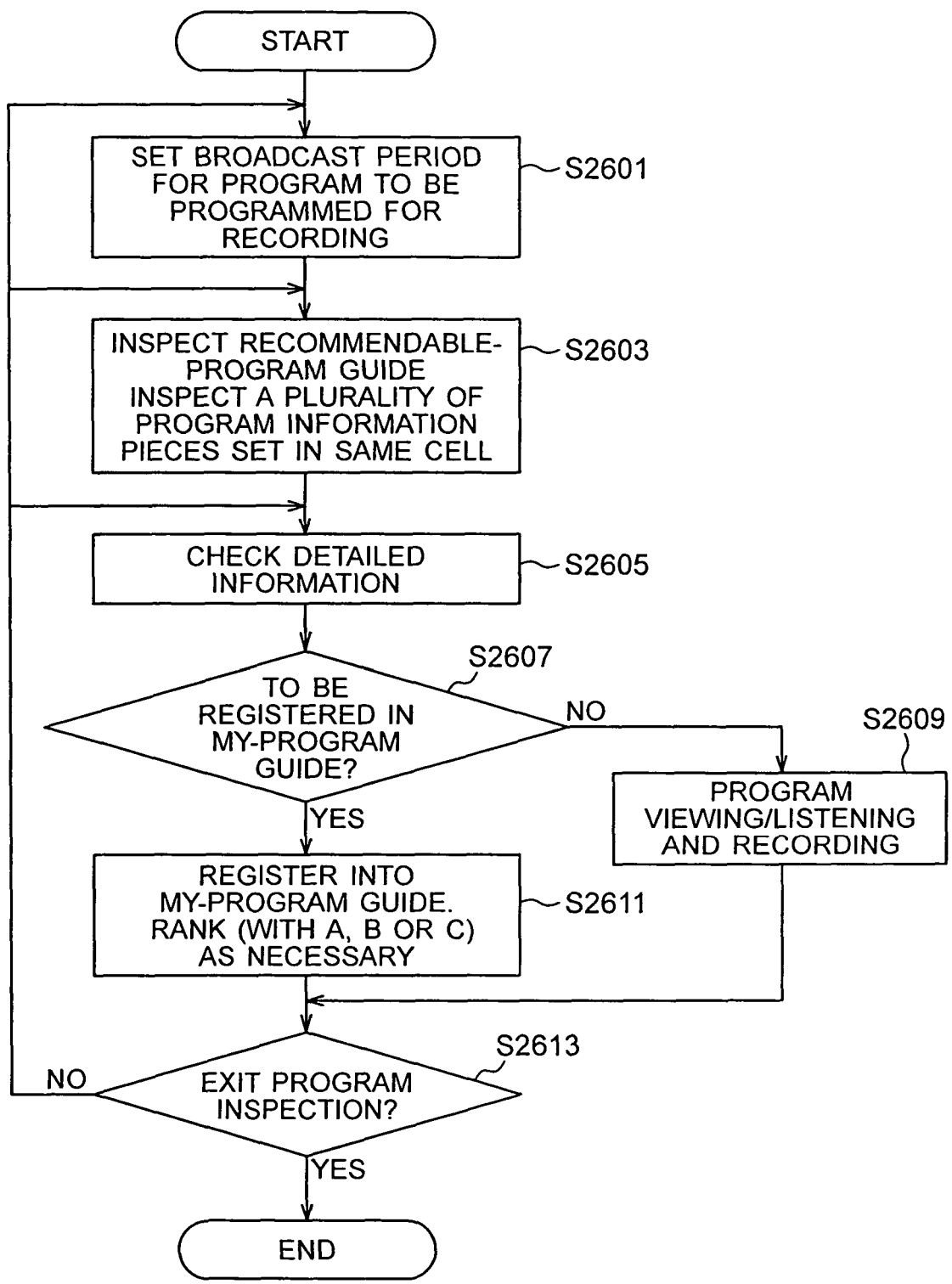
FIG. 26 is a schematic flow diagram showing operations made in manipulating and editing a recommendable-program guide incorporated in this embodiment.

Next, by making program inspection and checking of other program information pieces whose airtimes overlap each other through switching of the program information displayed in the cell of the recommendable-program guide to the other program information pieces as shown in FIG. 26, the amount of program information and the like displayed in the recommendable-program guide can be limited (in step S2603).

When the user selects a program of interest, if any, by making double-click of a cell of the recommendable-program guide, detailed information window of the selected program will appear. The user can thus check the detailed information (in step S2605). It should be noted that the detailed information may be checked as necessary in parallel with the checking of the program information (as in step S2603).

Next, when the program information displayed in the cell of the recommendable-program guide is completely is checked, the display in the recommendable-program guide can be registered as a My-program guide. Therefore, when a "Register" button is selected when a My-program guide is used (in step S2607), the recommendable-program guide from which the program information has been made is stored as a My-program guide into the storage unit 236. It should be noted that the remaining program information pieces whose airtimes overlap each other will not be so stored but they may be saved along with the My-program guide as necessary.

Also, when the display of the recommendable-program guide is registered as a My-program guide, program information displayed in the cell of the sheet-form program guide can be ranked (as A, B and C) (in step S2611). For example, programs the user is to view can be ranked in priority. A program having the rank A is given the highest priority.

Note that when registering a My-program guide, programming or advising of the recording of each program is possible in addition to the above-mentioned program ranking. It should also be noted that by registering the advice of recording for each program in advance, the advice can be given by electronic mail from the main server 125 to each of the user terminals 101.

Also, when no My-program guide is used (in step S2607), it is possible to program recording of a program by pressing the "Program" button displayed in the cell of the recommendable-program guide (in step S2609). Further, it can be programmed that the above-mentioned advice of a program recording (recording advice) will be given a predetermined time before the program is started being broadcast. The information that the advice of recording has been set is accumulated in a user operation record file or the like of the storage unit 236 and saved in a server in the broadcasting/communication sender 306 provided in the station 102.

Next, when continuously manipulating and editing a sheet-form program guide still being displayed on the display screen (in step S2609), an appropriate one is selected from among setting of a broadcasting period (in step S2601), inspection of program information (in step S2603) and checking of detailed information (in step S2605) in the request table 290.

With the above series of operations, the user can manipulate and edit a recommendable-program guide while the sheet-form program guide incorporated in this embodiment is being displayed on the display screen, and also register the recommendable-program guide thus manipulated and edited in a My-program guide.

An example in which a recommendable-program guide incorporated in this embodiment is registered in a My-program guide has been described in the above. It should be noted however the present invention is not limited to this example but each program information displayed in a cell of the recommendable-program guide can be registered in a My-program guide.

Also, in case a My-program guide is already saved when a recommendable-program guide incorporated in this embodiment is registered as a My-program guide, the saved My-program guide may be updated in units of a program information piece or in units of a recommendable-program guide.

Also note that by displaying the tab 280a in a recommendable-program guide in manipulating and editing a recommendable-program guide incorporated in this embodiment, program information related to a program and the program can be selected and registered into a My-program guide while switching to a recommendable-program guide for any other station.

Also, the recommendable-program guide manipulation and edition incorporated in this embodiment may be applied to any other than the recommendable-program guide. For example, a keywords list can be manipulated and edited as above.

Next, explanation will be made with reference to FIG. 17 again. When a keywords list is selected (in step S1703) with a program select menu (not shown) being displayed on the display screen, the keywords list generator 257 in the user terminal 101 will acquire already registered keywords from the storage unit 236, and displays a list of keywords on the display screen of the display unit 235 (in step S1715).

The keywords list displayed at the display unit 235 (as in step S1715) can be manipulated and corrected (in step S1717). Manipulation and edition of the keywords list will be described in detail, but aspects of the manipulation and edition of the keywords list, common to the aforementioned manipulation and edition of a sheet-form program guide or recommendable-program guide, will not be described in detail.

6.3 Manipulation and Edition of Keywords List

Figure 27:
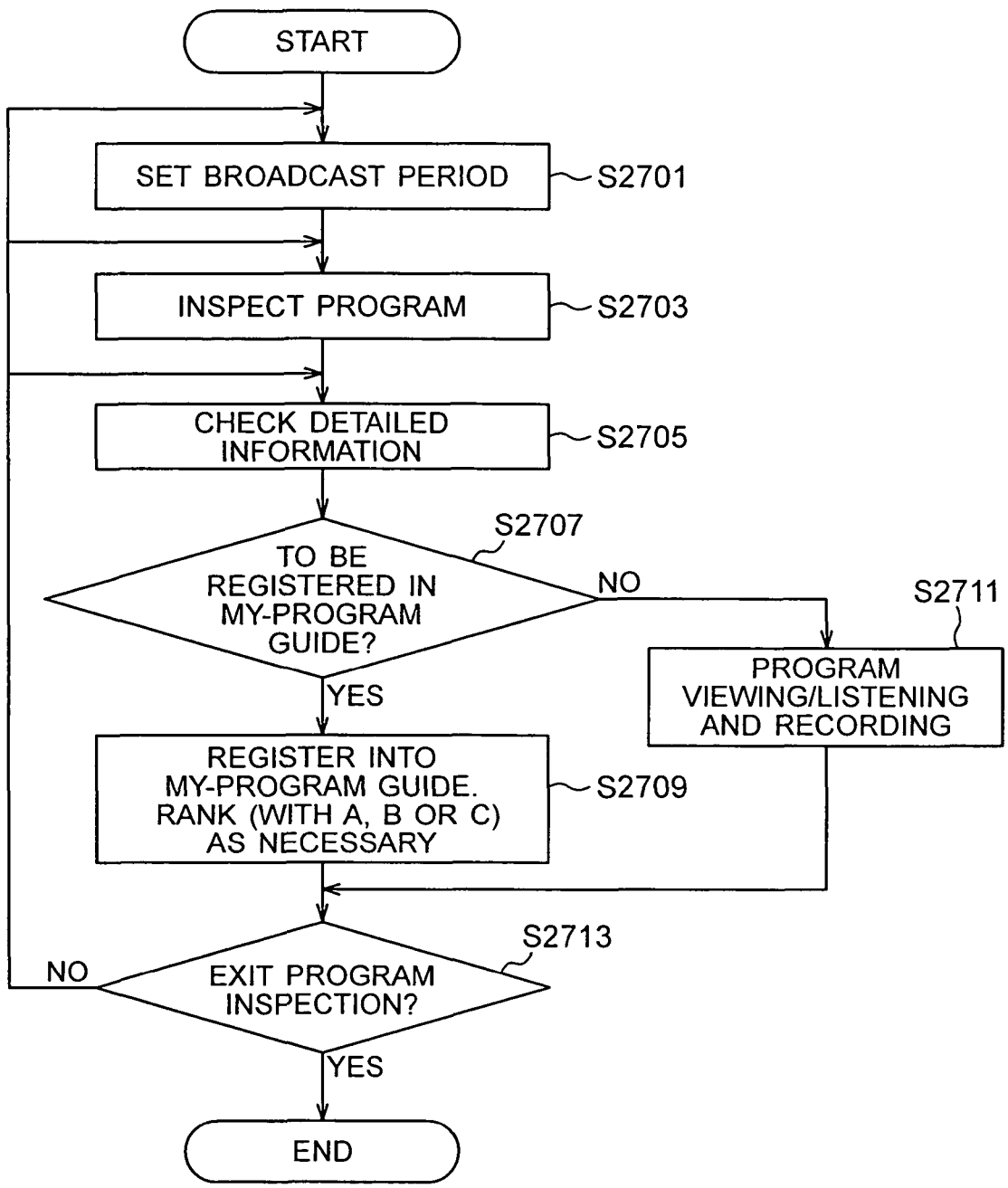
FIG. 27 is a schematic flow diagram showing operations made in manipulating and editing a keywords list incorporated in this embodiment.

First, the keywords list manipulation and edition incorporated in this embodiment will be described with reference to FIG. 27 which is a schematic flow diagram showing operations made in the keywords list manipulation and edition.

When a keywords list is displayed on the display screen of the display unit 237, a request table 290 for requesting a program guide for a designated date is displayed. It should be noted that the request table 290 has already been described with reference to FIG. 3. Also note that nothing is displayed in the keywords list until a designated date is set in the request table 290 or program information in which the current day is taken as a designated date is displayed.

When the user operates the input unit 237 or the like to select "Sep. 30, 2003", for example, among dates displayed in the request table 290 (in step S2701) as a broadcasting period, the program information reproduction unit 246 will display a keywords list for Sep. 30, 2003, generated by the keywords list generator 257, on the display screen of the display unit 235.

Keywords List

A keywords list incorporated in this embodiment will be explained herebelow with reference to FIG. 28 which schematically illustrates the keywords list.

Figure 28:
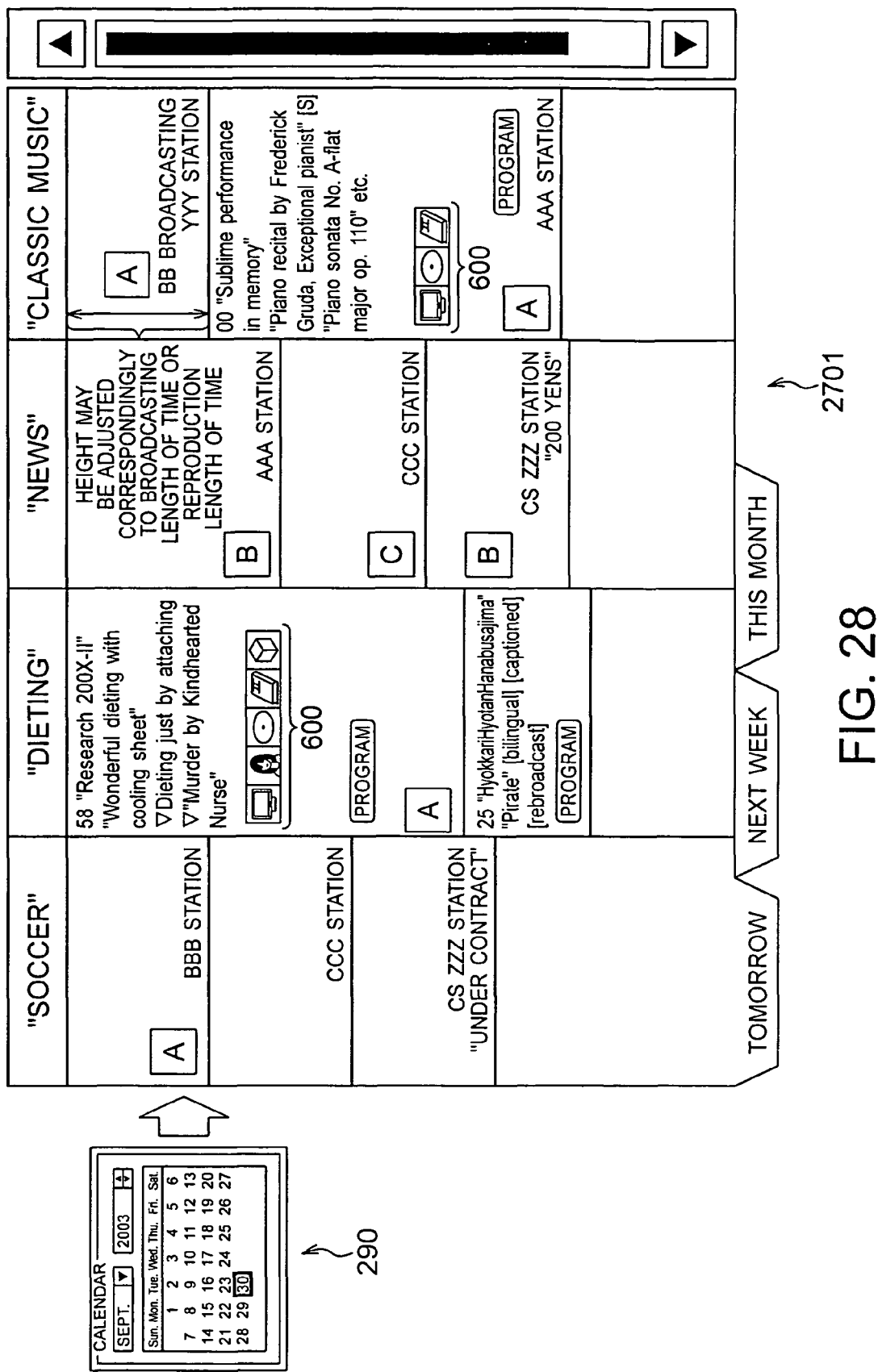
FIG. 28 schematically illustrates the keywords list incorporated in this embodiment.

As shown in FIG. 28, a keywords list 2701 is displayed along with the request table 290 on the display screen of the display unit 235. The keywords list 2701 is for the designated date "Sep. 30, 2003" set in the request table 290.

As shown, more than one or two cells as indicated as keywords along the horizontal axis of the keywords list 2701. The keywords along the horizontal axis may be "Soccer", "Dieting", "News", "Classic music", etc. for example as shown in FIG. 28.

In the cells of the keywords list, there are displayed, in addition to the title of a program, name of a station 102 such as "BBB station", message such as "CS ZZZ station "200 yens"", indicating that the program is a PPV (pay per view), ranks such as "A", "B" or "C", icon 600 and the like as shown in FIG. 28. It should be noted that the ranks are generally the same as those settable in a sheet-form program guide, recommendable-program guide and My-program guide by the user terminal 101.

The keywords list is characterized in that since information on a program corresponding to a keyword is displayed under the keyword, only the program information corresponding to a keyword in which the user is interested can be displayed.

Therefore, since it is possible to provide program information the user is most likely to be interested in and whose amount of information is smaller than that when all programs to be broadcast on the day are displayed in a program guide, the efficiency of using the keywords list as a program guide and that of search for a program can be improved.

Also, since each cell has the height thereof adjusted correspondingly to a broadcasting length of time or reproduction length of time, the user can visually know the broadcasting length of time from the keywords list even if no broadcasting length of time is indicated along a vertical or horizontal axis.

As shown in FIG. 28, "Tomorrow", "Next week", "This moth" and tabs are displayed. By selecting any of the tabs, it is possible to display a keywords list for tomorrow in addition to a keywords list for the day. A period indicated in the tab is not limited but may be any period.

Next, a variant of the keywords list incorporated in this embodiment will be explained with reference to FIG. 29 which shows a variant of the keywords list shown in FIG. 28. It should be noted that the keywords list shown in FIG. 29 is formed generally identical to that shown in FIG. 28, and so it will not be explained in detail.

Figure 29:
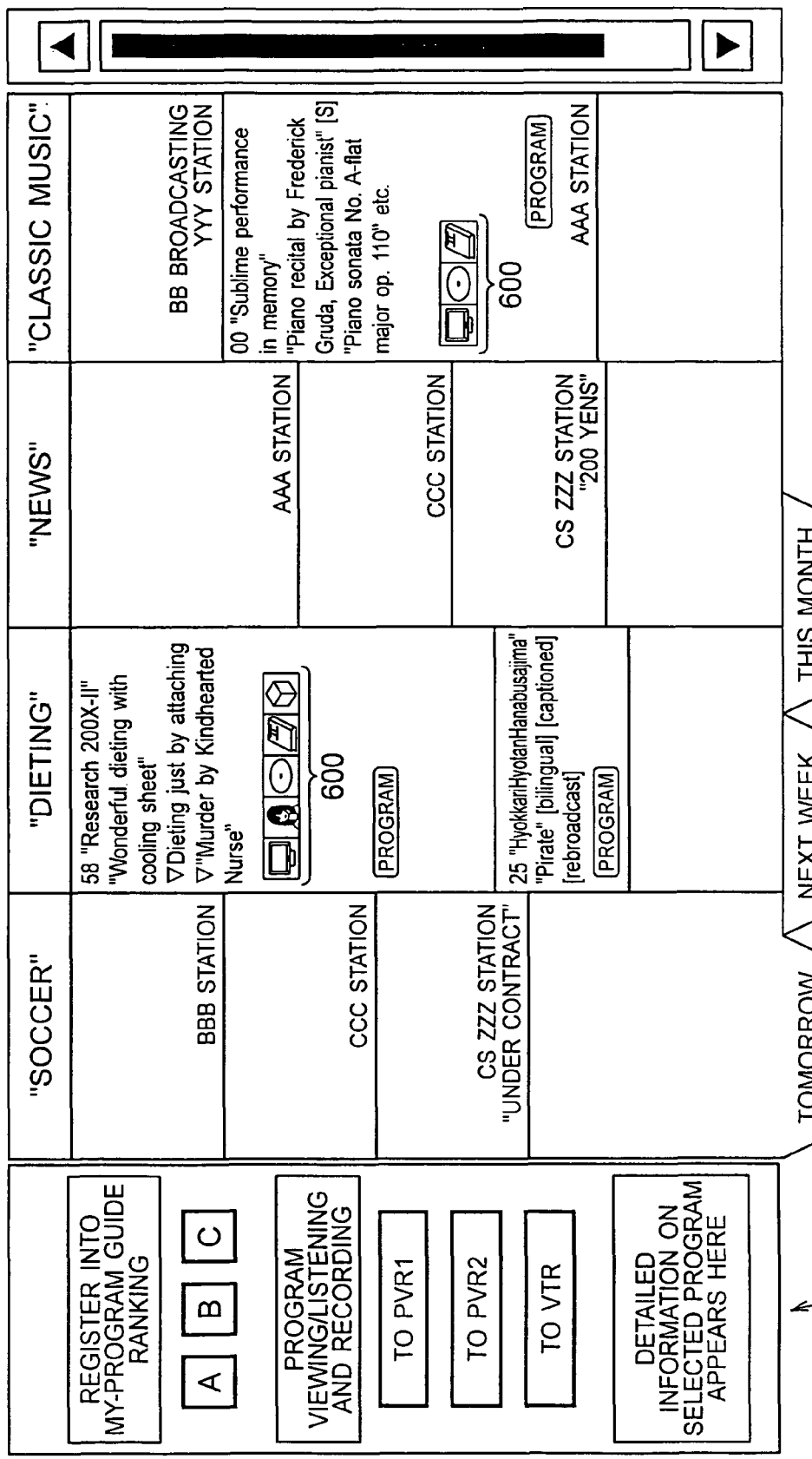
FIG. 29 explains a variant of the keywords list shown in FIG. 28.

As shown in FIG. 29, on the display screen of the display unit 235, there are displayed the keywords list 2701 and a manipulation/edition window 2703 for manipulating or editing the keywords list 2701. That is, the keywords list in FIG. 29 is different from that in FIG. 28 in that the manipulation/edition window 2703 is displayed on the display screen.

By selecting an "A" button, "PVR1" button or the like displayed in the manipulation/edition window 2703, the user can rank program information pieces displayed in a cell or program recording of a preselected program. It should be noted that the "Program" button in the cell and the "PVR1" button is nearly identical to each other.

For example, when the user selects an appropriate cell by the use of a cursor and presses a "B" button at the input unit 237 or the like after activating the cell, program information in the cell will be ranked and a rank "B" be displayed in the cell, for example. It should be noted that the selection may be done by any other than the cursor but it may be done using a pointer, for example. The cursor is a symbol such as an underline, rectangle or the like, which indicates an input position, designated position or selected position on the display screen of the display unit 235 or the like.

In addition, another variant of the keywords list incorporated in this embodiment will be explained below with reference to FIG. 30 which shows a variant of the keywords list shown in FIG. 28.

Figure 30:
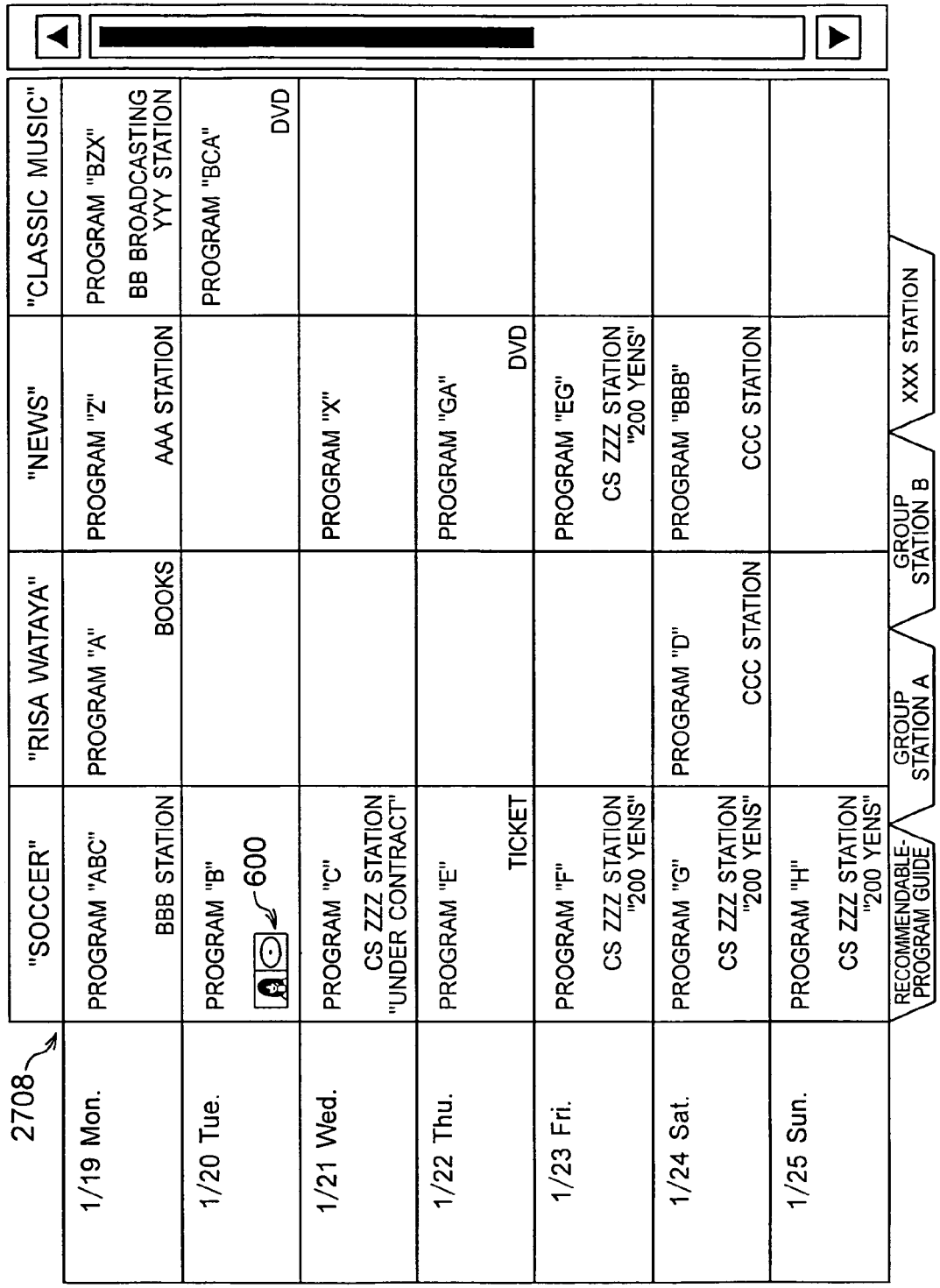
FIG. 30 explains another variant of the keywords list shown in FIG. 28.

As shown in FIG. 30, a keywords list 2708 is displayed on the display screen of the display unit 235. In the keywords list 2708, more than one or two dates are indicated along the horizontal axis (date axis) and more than one or two keywords are indicated along the vertical axis (keyword axis).

In the keywords list 2708, a plurality of cells is defined at intersections of the dates and keywords and the title of a program is displayed in each cell. It should be noted that information displayed in the cell is generally the same as having been described above with reference to FIG. 28, and so will not be described in detail here.

Note that in the keywords list 2708, a cell defined by a date and keyword includes a plurality of program information pieces, if any, will have the color thereof changed to any other color to indicate that fact and display a program information piece higher in display ranking. However, the present invention is not limited to this embodiment.

Also, the keywords list 2708 has tabs "Recommendable program", "Group station A", "Group station B" and "XXX station", but the present invention is not limited to this example. It should be noted that the "Recommendable program" is a keywords list generated by extracting only program information pieces including corresponding keywords from program information included in recommendable-program information and ordering them, for example.

Here, explanation will be made with reference to FIG. 27 again. When a keywords list for a date designed by means of the request table 290 is displayed (in step S2701), the user can inspect a keywords list displayed on the display screen of the display unit 235 (in step S2703).

When the keywords list is inspected, it will be possible that a plurality of program information pieces which are candidates to display program information in the cell of the keywords list 2708 shown in FIG. 30. Therefore, it will be necessary to switch the display from a program information piece being displayed to another program information piece as having been described above concerning the sheet-form program guide or recommendable-program guide. Since this operation is generally the same as the aforementioned program selection in the sheet-form program guide (as in step S1803) or program inspection (as in step S2603), it will not be described in detail.

Next, by selecting a cell displayed in the keywords list, information more detailed than the program information displayed in the cell can be displayed. For example, when the user having found a program of interest selects a cell including program information of the program at the input unit 237 or the like, a detailed-information window displaying detailed information is displayed on any other display screen and thus the user can check detailed information on the selected (in step S2705).

An example in which detailed information on a program is checked (in step S2705) after inspecting the keywords list (in step S2703) has been described. However, the present invention is not limited to this example but the checking of detailed information (as in step S2705) may be done in parallel with the inspection of keywords list (as in step S2703).

Next, when the checking of detailed information on program information displayed in a cell of the keywords list (in step S2705) is completed, the program information displayed in the cell of the keywords list can be registered into a My-program guide. Therefore, by selecting the "Register" button for registering a My-program guide (as in S2707), program information in the selected cell is stored into an area, where the My-program guide is located, of the storage unit 236. It should be noted that the remainder of program information pieces whose airtimes overlap each other are not so saved but they may be saved along with the My-program guide as necessary.

Also, when registering as a My-program guide, program information displayed in the cell of the keywords list can be ranked (with A, B and C) (in step S2611). For example, the priority of the programs the user views may be ranked. The rank A means the highest priority, but it is not limited to this example. For example, the ranking may be a display ranking of program information pieces displayed in a cell.

Note that when registering a My-program guide, programming or advising of the recording of each program is possible in addition to the above-mentioned program ranking. It should also be noted that by registering the advice of recording for each a program in advance, the advice can be given by electronic mail from the main server 125 to each of the user terminals 101.

Also, when no My-program guide is used (in step S2707), it is possible to program recording of a program by pressing the "Program" button displayed in the cell of the keywords list (in step S2709).

Further, it can be programmed that the above-mentioned advice of a program recording (recording advice) will be given a predetermined time before the program is started being broadcast. The information that the advice of recording has been set is accumulated in a user operation record file or the like of the storage unit 236 and saved in a server in the broadcasting/communication sender 306 or the like provided in the station 102.

Next, when continuously manipulating and editing a keywords list still being displayed on the display screen (in step S2713), an appropriate one is selected from among setting of a broadcasting period (in step S2701), selection of program information (in step S2703) and checking of detailed information (in step S2705) in the request table 290.

With the above series of operations, the user can manipulate and edit a keywords list while the keywords list incorporated in this embodiment is being displayed on the display screen, and also register the keywords list thus manipulated and edited in a My-program guide.

An example in which each of program information pieces displayed in a cell of a keywords list incorporated in this embodiment is registered in a My-program guide has been described in the above. However, the present invention is not limited to this example but the keywords list as a whole can be registered directly into a My-program guide.

Also, in case a My-program guide is already saved when registering a keywords list incorporated in this embodiment into a My-program guide, the saved My-program guide may be updated for each recommendable-program guide or keywords list.

Also, the keywords list manipulation and edition incorporated in this embodiment may be applied to any other than the keywords list. For example, it can applied to a sheet-form guide or recommendable-program guide.

Next, explanation will be made with reference to FIG. 17 again. When a My-program guide is selected (as in step S1703) while a program guide select menu (not shown) is being displayed on the display screen, the My-program guide editor 252 in the user terminal 101 acquires an existing My-program guide from the storage unit 236 and displays it on the display screen of the display unit 235 (in step S1719).

The My-program guide displayed at the display unit 235 (in step S1715) can be manipulated and edited (in step S1717). The manipulation and edition of the My-program guide will be described in detail below, but aspects of the manipulation and edition of the My-program guide, common to those of the manipulation and edition of the sheet-form program guide, recommendable-program guide and keywords list, will not be described in detail.

6.4 Manipulation and Edition of My-Program Guide

Figure 31:
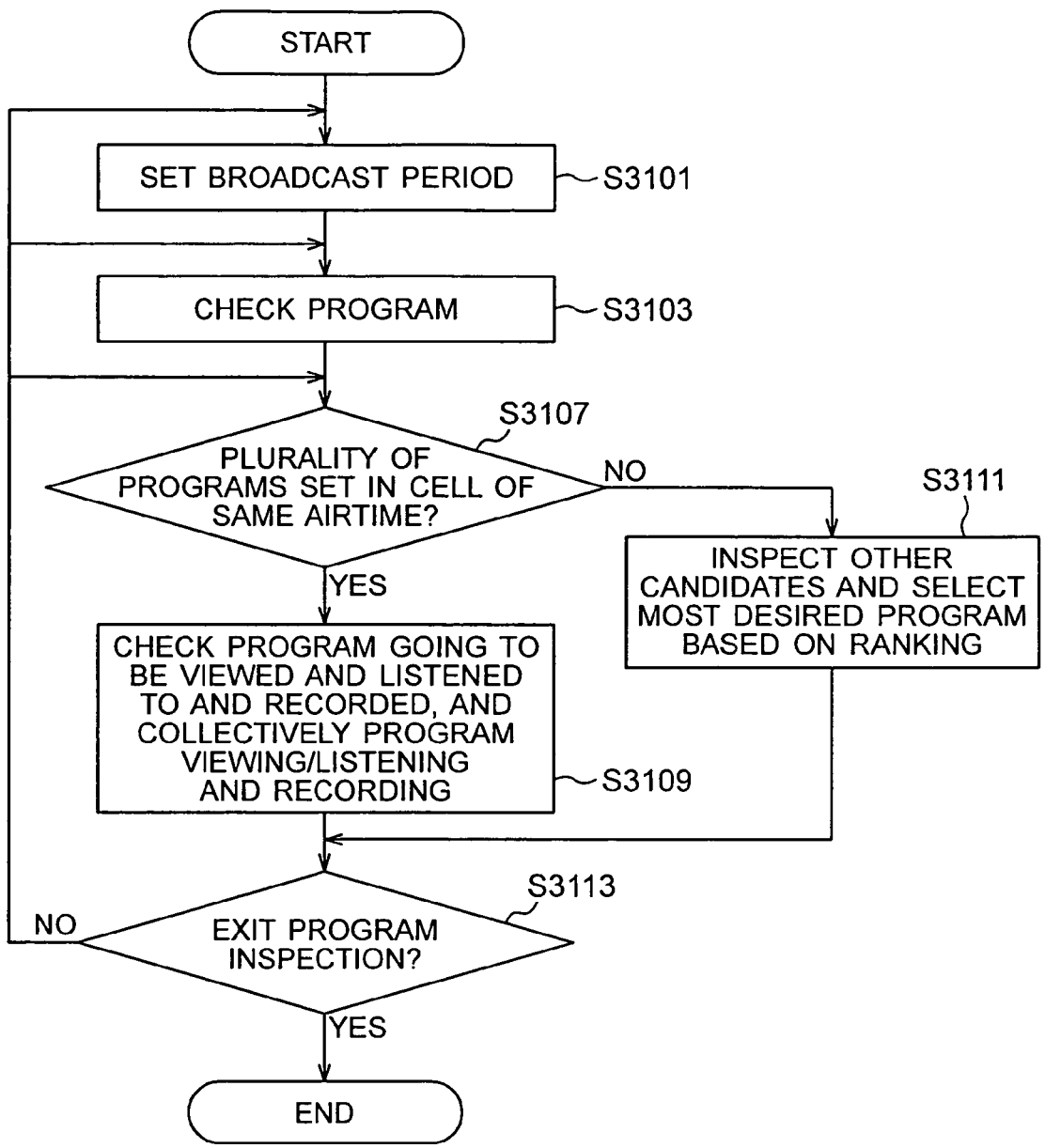
FIG. 31 is a schematic flow diagram showing operations made in manipulating and editing the My-program guide.

First, the My-program guide manipulation and edition incorporated in this embodiment will be described with reference to FIG. 31 which is a schematic flow diagram showing operations made in the My-program guide manipulation and edition.

When a My-program guide is displayed on the display screen of the display unit 237, a request table 290 for requesting a program guide for a designated date is displayed. It should be noted that the request table 290 has already been described with reference to FIG. 3. Also note that nothing is displayed in the My-program guide until a designated date is set in the request table 290 or program information in which the current day is taken as a designated date is displayed.

When the user operates the input unit 237 or the like to select "Sep. 30, 2003", for example, among dates displayed in the request table 290 (in step S3101) as a broadcasting period, the program information reproduction unit 246 will display a My-program guide for Sep. 30, 2003, generated by the My-program guide generator 257, on the display screen of the display unit 235. The My-program guide is as having previously been described.

Next, when a My-program guide for a date designated via the request table 290 (in step S3301), the user can check the program by inspecting program information displayed in the cell of the My-program guide displayed on the display screen of the display unit 235 (in step S3303).

Also, when the program information is inspected, a plurality of program information pieces may possibly exists as candidates for program information in each cell of the My-program guide shown in FIG. 10 or the like.

In case there is a plurality of pieces of information on programs whose airtimes overlap each other on the same airdate (in step S3107), it is necessary (in step S3111) to select a program by switching the program information displayed in each cell is switched to another program information as having previously been described concerning the sheet-form program guide or recommendable-program guide. However, since this operation (as in step S3111) is generally similar to the selection of program (as in step S1803) or inspection of program (as in step S2603) in the sheet-form program guide as having previously been described, it will not be explained in detail.

Also, in case there exists a plurality of candidates for program information in the same cell of the My-program guide, selection of this cell will lead to display of a list of the plurality of program information pieces. Since the rank "A", "B" or "C" the user has set is also displayed for each program information in the list, it will be a measure for the user when selecting program information.

In case there is no plurality of pieces of information on programs whose airtimes overlap each other on the same airdate (in step S3109), the user can program recording of a program by checking the program information displayed in the cell and pressing the "Program" button as necessary and display information more detailed than the program information displayed in the cell by selecting the cell through clicking. It should be noted that in a program having the "Program" button displayed in the cell, all the programs on the screen can collectively be programmed for recording.

Also, in case a program of interest is found in the program information displayed in the cell, for example, selection, at the input unit 237 or the like, of the cell having the information on that program will permit to display a detailed information window having detailed information displayed on any other display screen and thus permit the user to check the detailed information on a selected program.

Note that program information displayed in the My-program guide can be ranked and the user can program recording of each program or can be advised of recording. It should also be noted that by registering the advice of recording for each a program in advance, the advice can be sent by electronic mail from the main server 125 to each of the user terminals 101. The information that the advice of recording has been set is accumulated in a user operation record file or the like of the storage unit 236 and saved in a server in the broadcasting/communication sender 306 provided in the station 102.

Next, in case inspection or recording programming is set for the My-program guide still displayed on the display screen and the My-program guide is continuously edited (in step S3113), an appropriate one is selected from among setting of a broadcasting period (in step S3101), selection of program information (in step S3103), and checking of detailed information (in step S3107) in the request table 290.

With the above series of operations, the user can customize a My-program guide while the My-program guide incorporated in this embodiment is being displayed on the display screen, and also program recording of a program displayed in the My-program guide.

The My-program guide is used by each user. For scheduling viewing of/listening to a program, the user makes the most of the My-program guide. For listing and managing programs meeting the users' preference or for activating the viewing of or listening to media, the user also makes the most of the My-program guide.

Finally, after completion of any of the sheet-form program guide manipulation/edition (as in step S1707), recommendable-program guide manipulation/edition (as in step S1713), keywords list manipulation/edition (as in step S1717) and My-program guide manipulation/edition (as in step S1721) as shown in FIG. 17, the user terminal 101 is logged off (in step S1709). Here, the series of operations is complete.

ECG-Type Program Guide:

A program guide displayed at the display unit 235 of the user terminal 101 when the ECG service is used will be explained herebelow with reference to FIG. 32 which shows the configuration of the ECG-type program guide incorporated in this embodiment.

Figure 32:
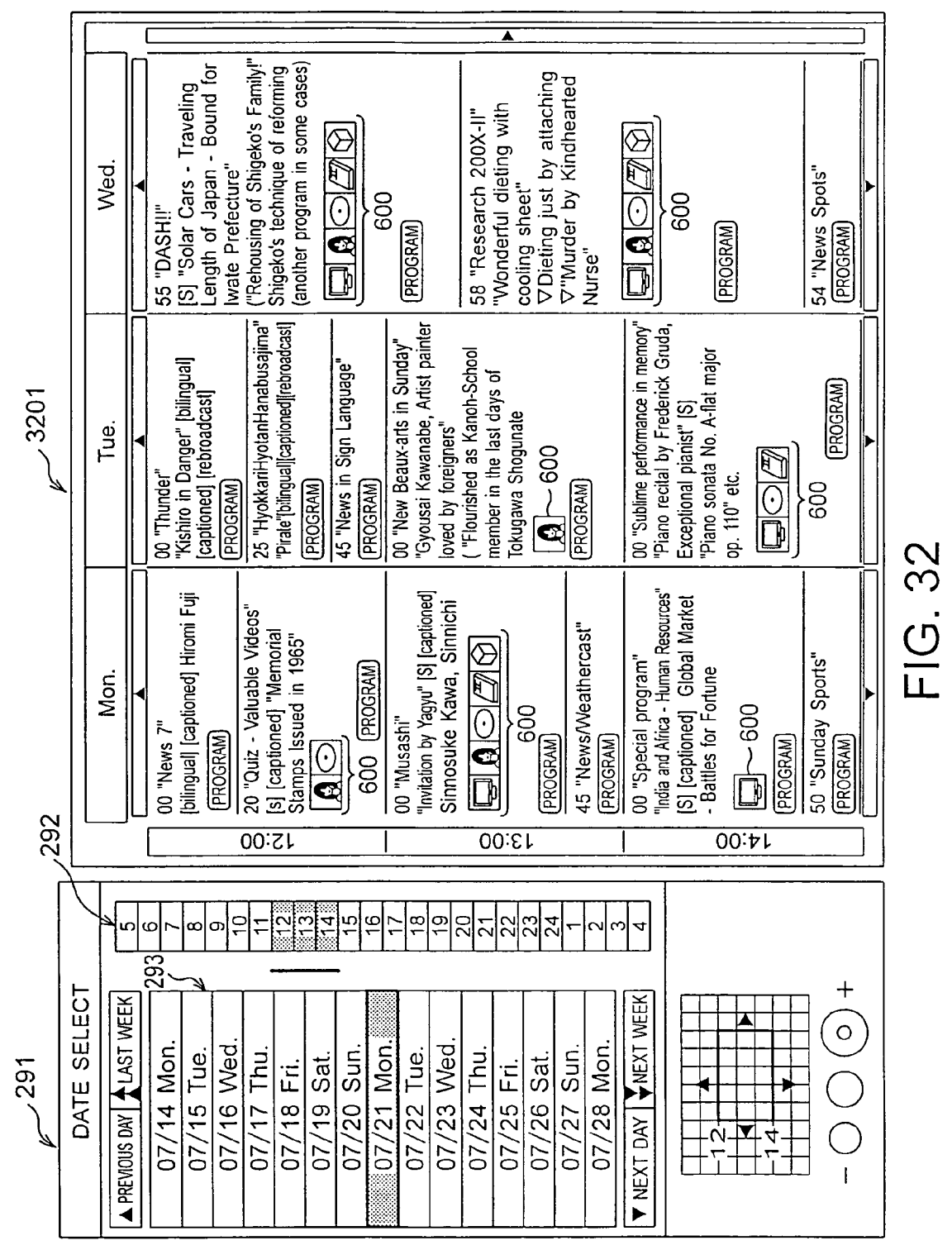

As shown in FIG. 32, the display unit 235 provided at the user terminal 101 displays an ECG-type program guide 3201 incorporated in this embodiment (will be referred to as "ECG program guide" hereunder) and a date/time select window 291 for selection of a due date of the ECG program guide 3201.

In the date/time select window 291, there are displayed at least an airtime select menu bar 292 for selection of a due airtime of a program and an airdate select menu bar 293 for selection of a due airdate of the program. In cells of the airtime select menu bar 292, numerals indicating airtimes are indicated in units of one hour or two hours. By operating the control terminal 118 such as a remote commander, the input unit 237 or the like to move the cursor vertically through the airtime numerals, an appropriate airtime can be selected.

Also, in cells of the airdate select menu bar 293, dates are indicated in units of a day. By operating the control terminal 118 such as the remote commander, the input unit 237 or the like to move the cursor vertically through the airtime numerals, an appropriate airdate can be selected.

Note that in case no desired date is displayed in the airdate select menu bar 293, a desired date can be selected by pressing any of "Previous day" button, "Last week" button, "Next day" button and "Next week" button displayed in the date/time select window 291.

When an airdate and airtime are selected in the date/time select window 291, program information for the selected date and time is correspondingly selected in the ECG program guide 3201 as well. In the ECG program guide 3201, days of week or dates are indicated along the horizontal axis and times are indicated along the vertical axis. Also, program information or the like is displayed in a plurality of cells as in the aforementioned sheet-form program guide.

In cells of the ECG program guide 3201, there are displayed "Program" button, icons 600 and the like are displayed in addition to program information such as a program title. The icons 600 include more than one or two types for various categories. They include a detailed information icon which indicates the existence of detailed information on a program, a performer icon which indicates the existence of information on performers in the program, music icon which indicates the existence of sales/reference information on a music CD (compact disk) related to the program and the like icons.

The user can check the icons 600 displayed in cells of the ECG program guide 3201 and know the availability of contents such as detailed information on each program. As will be known, the larger the number of icons, the richer the program information is.

When the user operates the input unit 237 or the like to select an icon 600 displayed in the cell of a program of interest, the user terminal 101 will make reference to content meta information related to program meta information including the icon 600. Thus, profile information or the like about the performers in the program can be displayed on a separate display screen.

Next, an ECG program select window which would be when there is a plurality of program information pieces whose airtimes overlap each other will be explained with reference to FIG. 33 which schematically illustrates the ECG program select window.

For inspecting other program information that those displayed in the cell in case there exists a plurality of program information pieces whose airtimes overlap each other, it is necessary to switch the displayed program information to any other one.

When a cell having displayed therein program information to be switched is selected in the ECG program guide 3201 for switching the program information to any other program information, an ECG program select window 3301 will be displayed at the display unit 235 as shown in FIG. 33.

In the ECG program select window 3301, there will be displayed near the program information included in the cell a plurality of program information candidates whose airtimes overlap each other. Therefore, when the user selects any one of the program information candidates and presses the "Set" button at the control terminal 118 such as a remote commander, the display in the cell will change to the selected program information.

Note that in the ECG program select window 3301 incorporated in this embodiment, the program information candidates are displayed in list to the right of the program information displayed in the cell. However, the present invention is not limited to this example but the ECG program select window 3301 may be formed as having previously been described with reference to FIGS. 22 to 25.

As will be known from the foregoing description, the program guide providing system 100 according to the present invention can provide EPG information from a single station 102 via the network 103, and also can provide program information collectively by grouping a plurality of stations 102.

Also, by grouping the plurality of stations 102, it is possible to manage the program information and manage the order of priority of the program information displayed in a program guide in case the program information includes a plurality of programs whose airtimes overlap each other because they are broadcast by a digital, analog, satellite, BB (broadband) broadcasting system or the like system.

The sheet-form program guide as one of the program guides displayed at the user terminal 101 includes a vertical axis as the airtime axis and a horizontal axis as the airdate axis (a plurality of dates for a week, for example, can be indicated) even if there exists a plurality of stations 102, and displays only one piece of program information in a cell at an airdate and airtime. Therefore, the user can view the program information more easily and can search a desired program with a higher efficiency. However, the amount of information displayed in the sheet-form program guide can be limited.

At the user terminal 101, a recommendable-program guide which is managed with one sheet meeting a user's preference can be generated from a plurality of program information pieces included in a sheet-form program guide through analysis of the user's preference. This recommendable-program guide is more convenient than the sheet-form program guide.

In case a plurality of programs whose airtimes overlap each other and which meets the user's preference exists in addition to program information displayed in a cell of a recommendable-program guide or My-program guide, the user can easily check other candidate program information. Thus, the user can efficiently search and check a program, and view and listen to the program.

By extracting a desired program from a program guide according to a keyword registered by the user and displaying it in a keywords list, the user can check the number of programs and interesting programs from the standpoint of the keywords without being aware of the airtime of the program. Further, since the programs displayed in the keywords list can be registered in the My-program guide based on the concept of airtimes, or vice versa, the program guide can be used for multiple purposes.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

According to the aforementioned embodiment of the present invention, EPG information is received as program information and an EPG-type program guide is displayed on the display screen of the user terminal 101. However, the present invention is not limited to this embodiment but an ECG-type program information or the like may be displayed on the display screen of the user terminal 101 by receiving program meta information and content meta information, for example.

Also, according to the embodiment, the user terminal 101 accesses a station 102 via the network 103 to receive program information. However, the present invention is not limited to this embodiment but the user terminal 101 may receive program information by the carrousel method or the like from the station 102, for example.

Also, according to the embodiment, the components of the user terminal 101 are hardware. However, the present invention is not limited to this embodiment. At least one of the video stream generator 241, data broadcasting reproduction unit 243, program information reproduction unit 246, etc. may be a program composed of more than one or more modules or components.

Also, according to the embodiment, user's preference is analyzed and program information is provided from a station 102 to the user terminal 101. However, the present invention is not limited to this embodiment. Units generally identical to those provided in the broadcasting facility 126 in the station 102 may be provided in the broadcasting consignee 121 to provide program from the broadcasting consignee 121 as well.

The present invention is applicable to a program guide displaying method and apparatus, capable of displaying a program guide, and a computer program for controlling a computer to carry out the program guide displaying method.

What is claimed is:

1. A method of displaying program information having contents of programs to be broadcast from at least one or more than one stations in a program guide of a computer, method comprising the steps of:
   receiving information on programs to be broadcast at the computer on at least one day from a plurality of stations, each of the programs having content; and
   placing a plurality of cells in which pieces of the program information are to be displayed, respectively, in a first two-dimensional program guide having a chronological time axis and a date axis and indicating when one of the pieces of the program information is overlapped by another one of the pieces of the program information, at least one first cell including a plurality of icons, each icon indicating an existence of further accessible information describing a distinct portion of the content included in a respective program of the programs to be broadcast on at least one day from the plurality of stations; and
   displaying, in response to a selection of any of the pieces of the program information which is indicated as being overlapped, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

2. The method according to claim 1, further comprising:
   a step of at least accepting more than one or two designated airdates on which the first two-dimensional program guide is to be displayed.

3. The method according to claim 2, further comprising:
   a step of acquiring program information to be broadcast on a designated airdate from a plurality of broadcasting stations.

4. The method according to claim 2, wherein the airdate can be designated in units of a week or month.

5. The method according to claim 1, wherein the first cell displays any one of the plurality of the program information pieces.

6. The method according to claim 1, wherein the first cell displays only a piece of the program information whose display rank is highest.

7. The method according to claim 1, wherein the first cell automatically displays the program information acquired based on the a result of analysis of user's personal preference.

8. The method according to claim 7, wherein the first cell displays only a piece of the program information whose display rank is highest.

9. The method according to claim 1, wherein a preference analysis information is generated from at least user operation record or personal history.

10. The method according to claim 1, wherein the first cell displays information tied to a program.

11. The method according to claim 1, wherein the first cell displays an index for starting designating programming of program recording.

12. The method according to claim 2, wherein the step of at least accepting is to accept the airdate designated on a setting window.

13. The method according to claim 1, wherein on the date axis of the first two-dimensional program guide, there are assigned dates in at least units of a day or a week.

14. An apparatus for displaying program information having contents of programs to be broadcast from more than at least one or two stations in a program guide of a computer, the apparatus comprising:
   a receiver configured to receive information on programs to be broadcast at the computer on at least one day from a plurality of stations, each of the programs having content; and
   a display controller configured to place a plurality of cells in which pieces of the program information are to be displayed, respectively, in a first two-dimensional program guide having a chronological time axis and a date axis and indicate when one of the pieces of the program information is overlapped by another one of the pieces of the program information, at least one first cell including a plurality of icons, each icon indicating an existence of further accessible information describing a distinct portion of the content included in a respective program of the programs to be broadcast on at least one day from the plurality of stations and to display, in response to a selection of any of the pieces of the program information which is indicated as being overlapped, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

15. The apparatus according to claim 14, wherein each icon of the plurality of icons corresponds to a different category of accessible information corresponding to the respective program of the programs to be broadcast on at least one day from the plurality of stations.

16. The apparatus according to claim 15, wherein the airdate can be designated in units of a week or month.

17. The apparatus according to claim 14, wherein the first cell in the first two-dimensional program guide displays only a piece of the program information whose display rank is highest.

18. The apparatus according to claim 14, wherein the first cell automatically displays the program information acquired based on a result of analysis of user's personal preference.

19. The apparatus according to claim 14, wherein the first cell displays information tied to a program.

20. The apparatus according to claim 14, wherein the first cell displays an index for starting designating programming of program recording.

21. The apparatus according to claim 20, wherein in the index is a PROGRAM button.

22. The apparatus according to claim 14, wherein a display unit provided therein displays a setting window for setting information on a request for display of a program guide.

23. A non-transitory computer readable hardware medium having stored thereon a program used to control a computer to carry out a program guide displaying method, the method including the steps of:
receiving information on programs to be broadcast on at least one day from a plurality of stations, each of the programs having content; and
placing a plurality of cells in which pieces of the program information are to be displayed, respectively, in a first two-dimensional program guide having a chronological time axis and a date axis and indicating when one of the pieces of the program information is overlapped by another one of the pieces of the program information, at least one first cell including a plurality of icons, each icon indicating an existence of further accessible information describing a distinct portion of the content included in a respective program of the programs to be broadcast on at least one day from the plurality of stations; and
displaying, in response to a selection of any of the pieces of the program information which is indicated as being overlapped, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

24. A method of displaying program information having contents of programs to be broadcast from more than at least one or two stations in a program guide of a computer, the method comprising the steps of:
receiving information on programs to be broadcast at the computer on at least one day from a plurality of stations, each of the programs having content;
placing a plurality of cells in which pieces of the program information are to be displayed, respectively, in a first two-dimensional program guide having a chronological time axis and a date axis and displaying, in the cells, program information pieces, at least one first cell including a plurality of icons, each icon indicating an existence of further accessible information describing a distinct portion of the content included in a respective program of the programs to be broadcast on at least one day from the plurality of stations;
highlighting a displayed cell when there exists a plurality of program information pieces whose airtimes overlap each other on at least the same date; and
displaying, in response to a selection of a highlighted cell, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

25. The method according to claim 24, wherein in the further comprising:
a cell display changing step in which the cell display is changed by changing at least one of saturation, brightness and chromaticity.

26. The method according to claim 24, wherein in the further comprising:
a cell display changing step in which the cell display is changed by additionally displaying, in the first cell, an index showing the a number of the program information pieces whose airtimes overlap each other.

27. The method according to claim 24, wherein in the further comprising:
a cell display changing step in which the cell display is changed by changing the presentation of the program information in the first cell.

28. The method according to claim 24, wherein in the further comprising:
a cell display changing step in which the program information displayed in the first cell is turned on and off.

29. The method according to claim 24, wherein only one of the program information piece pieces is displayed in the first cell.

30. The method according to claim 29, further comprising a step of displaying a plurality of the selected program information pieces whose airtimes overlap each other on at least the same airdate in the form of a list.

31. The method according to claim 24, further comprising a step of selecting, from the second two-dimensional program guide, any one of a plurality of the selected program information pieces whose airtimes overlap each other on at least the same airdate.

32. The method according to claim 30, wherein in the displaying the plurality of program information pieces step, all of the plurality of the selected program information pieces whose airtimes overlap each other on at least the same airdate are displayed in a line in at least one of vertical and horizontal directions.

33. The method according to claim 31, wherein in the program selecting step, there is selected the program information displayed in the cell of the second two-dimensional program guide to which at least a cursor is moved is selected.

34. An apparatus for displaying program information having contents of programs to be broadcast from more than at least one or two stations in a program guide of a computer, the apparatus comprising:
- a receiver to receive information on programs to be broadcast at the computer on at least one day from a plurality of stations, each of the programs having content;
- a display controller to place a plurality of cells in which pieces of the program information are to be displayed, respectively, in a first two-dimensional program guide having a chronological time axis and a date axis and display, in the cells, program information pieces, at least one first cell including a plurality of icons, each icon indicating an existence of further accessible information describing a distinct portion of the content included in a respective program of the programs to be broadcast on at least one day from the plurality of stations; and
- a display changing unit to highlight a displayed cell when there exists a plurality of program information pieces whose airtimes overlap each other on at least the same date,
- wherein the display controller is further configured to display, in response to a selection of a highlighted cell, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

35. The apparatus according to claim 34, wherein the display changing unit changes the cell display by changing at least one of saturation, brightness and chromaticity.

36. The apparatus according to claim 34, wherein the display changing unit changes the cell display by additionally displaying, in the first cell, an index showing a number of the program information pieces whose airtimes overlap each other.

37. The apparatus according to claim 34, wherein the display changing unit changes the cell display by changing the a presentation of the program information in the first cell.

38. The apparatus according to claim 34, wherein the display changing unit turns on and off the program information displayed in the first cell.

39. The apparatus according to claim 34, wherein only one of the program information piece pieces is displayed in the first cell.

40. The apparatus according to claim 39, further comprising a display controller to display a plurality of the selected program information pieces whose airtimes overlap each other on at least the same airdate in the form of a list.

41. The apparatus according to claim 34, further comprising a program selector to select any one of a plurality of the selected program information pieces whose airtimes overlap each other on at least the same airdate.

42. The apparatus according to claim 40, wherein the display controller displays all of the plurality of the selected program information pieces whose airtimes overlap each other on at least the same airdate in a line in at least one of vertical and horizontal directions.

43. The apparatus according to claim 41, wherein the program selector selects the program information displayed in the cell of the second two-dimensional program guide to which at least a cursor is moved.

44. A computer readable hardware medium having stored thereon a program which controls a computer to carry out a program guide displaying method, the method including the steps of:
- receiving information on programs to be broadcast on at least one day from a plurality of stations, each of the programs having content;
- placing a plurality of cells in which pieces of the program information are to be displayed, respectively, in a first two-dimensional program guide having a chronological time axis and a date axis and displaying, in the cells, program information pieces, at least one first cell including a plurality of icons, each icon indicating an existence of further accessible information describing a distinct portion of the content included in a respective program of the programs to be broadcast on at least one day from the plurality of stations;
- highlighting a displayed cell when there exists a plurality of program information pieces whose airtimes overlap each other on at least the same date; and
- displaying, in response to a selection of a highlighted cell, a second two-dimensional program guide having the chronological time axis and a station axis, the second two-dimensional program guide including the selected program information pieces whose airtimes overlap each other on the same airdate, in such a manner that start and end times of the selected program information pieces are indicated but cells of the second two-dimensional program guide do not overlap each other.

* * * * *